United States Patent
Adachi et al.

(10) Patent No.: US 6,930,800 B1
(45) Date of Patent: Aug. 16, 2005

(54) HALFTONE GENERATION SYSTEM AND HALFTONE GENERATION METHOD

(75) Inventors: Koji Adachi, Ashigarakami-gun (JP); Koki Uwatoko, Ashigarakami-gun (JP); Masahiko Koyanagi, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/389,048

(22) Filed: Sep. 2, 1999

(30) Foreign Application Priority Data

| Sep. 9, 1998 | (JP) | 10-254785 |
| Nov. 27, 1998 | (JP) | 10-336760 |
| Feb. 12, 1999 | (JP) | 11-033890 |

(51) Int. Cl.$^7$ .............. H04N 1/405; G06F 9/28
(52) U.S. Cl. .............. 358/3.13; 358/3.23; 382/270; 382/304
(58) Field of Search .............. 358/1.9, 3.06, 358/3.09, 3.1, 3.13, 3.23; 382/237, 304, 270, 271, 272, 273; 365/78, 189.12

(56) References Cited

U.S. PATENT DOCUMENTS

| 4,414,581 A | * | 11/1983 | Kato et al. ............ 358/2.1 |
| 4,698,690 A | * | 10/1987 | Tanioka ............ 358/3.1 |
| 4,802,232 A | * | 1/1989 | Altes ............ 382/239 |
| 5,073,966 A | * | 12/1991 | Sato ............ 382/237 |
| 5,128,748 A | * | 7/1992 | Murakami et al. ............ 358/500 |
| 5,150,429 A | * | 9/1992 | Miller et al. ............ 382/275 |
| 5,159,471 A | * | 10/1992 | Satou et al. ............ 358/466 |
| 5,161,036 A | * | 11/1992 | Mannichi et al. ............ 358/466 |
| 5,179,640 A | * | 1/1993 | Duffy ............ 345/596 |
| 5,299,030 A | * | 3/1994 | Kim ............ 358/462 |
| 5,389,948 A | * | 2/1995 | Liu ............ 345/691 |
| 5,581,372 A | * | 12/1996 | Kerz ............ 358/3.14 |
| 5,594,839 A | * | 1/1997 | Shu ............ 358/1.9 |
| 5,771,105 A | * | 6/1998 | Rust et al. ............ 358/2.99 |
| 5,778,158 A | * | 7/1998 | Fujii et al. ............ 358/1.2 |
| 5,781,308 A | * | 7/1998 | Fujii et al. ............ 358/451 |
| 5,796,411 A | | 8/1998 | Cyman et al. ............ 345/502 |
| 5,812,744 A | * | 9/1998 | Allebach et al. ............ 358/1.9 |
| 5,953,459 A | * | 9/1999 | Ueda et al. ............ 382/237 |
| 6,064,359 A | * | 5/2000 | Lin et al. ............ 345/89 |
| 6,088,512 A | * | 7/2000 | Ancin et al. ............ 358/1.9 |
| 6,512,596 B1 | * | 1/2003 | Lapstun ............ 358/1.9 |
| 6,519,055 B1 | * | 2/2003 | Curry et al. ............ 358/2.1 |

FOREIGN PATENT DOCUMENTS

| JP | 6-6606 | 6/1992 | H04N/1/40 |
| JP | 8-305839 | 5/1995 | H04N/1/21 |
| JP | 9-247466 | 3/1996 | H04N/1/41 |

* cited by examiner

Primary Examiner—Scott A. Rogers
(74) Attorney, Agent, or Firm—Oliff & Berridge, PLC

(57) ABSTRACT

All threshold data applied to processing is read into a register so that threshold data read from threshold matrix memory can be recycled until the end of a scanning line for processing, and is selectively output to a plurality of comparison means for executing parallel comparison processing. The threshold data set in the register is shifted in order for repetitive use. The threshold data of the next scanning line is read into the register during the comparison processing, and upon completion of processing of one scanning line, comparison processing on the next scanning line is executed as pipeline processing. Threshold data read from the memory needs to be executed only once for each scanning line for processing, and threshold data can also be read during halftone data generation of the preceding line.

33 Claims, 47 Drawing Sheets

BINARY DECODER TRUTH TABLE

| INPUT (3bit) | OUTPUT (8bit) |
|---|---|
| 000 | 10000000 |
| 001 | 01000000 |
| 010 | 00100000 |
| 011 | 00010000 |
| 100 | 00001000 |
| 101 | 00000100 |
| 110 | 00000010 |
| 111 | 00000001 |

Fig. 17

HALFTONE GENERATION SYSTEM AND HALFTONE GENERATION METHOD

BACKGROUND OF THE INVENTION

This invention relates to a halftone generation system and a halftone generation method for electronically converting multilevel (continuous-tone) image data into binary image data and in particular to a halftone generation system and a halftone generation method for supplying halftone data to a high-definition print processing system at high speed and a high-speed color print processing system of high image quality at high speed.

A print processing system for printing a color image generally is separated into four plates of C (cyan), M (magenta), Y (yellow), and K (black) and multilevel image data is stored on the color plates. The multilevel image data on each color plate is compared with threshold matrix data and is converted into binary image data. Halftone printing is performed based on the binary image data for each color and a color image is generated.

To form a halftone image digitally in conventional offset printing, etc., it is a common practice to form a halftone image on a photosensitive film with a high-resolution laser recorder called an image setter, then print it on a PS (presensitized plate), etc. In the image setter technique, halftone formation is executed offline as mentioned above and a high speed is not required for halftone formation, thus generally halftone formation is handled using a CPU (central processing unit) contained in the image setter. That is, a comparison operation is performed on multilevel image data and threshold matrix data by the CPU and the result is recorded in memory in the image setter. Upon completion of halftone formation in page units or job units, the halftone data recorded in the memory is read in sequence and is recorded on a photosensitive film in a laser.

On the other hand, in electrophotographic print processing systems, it is also becoming a common practice to digitally form a halftone image with electronization of information and colorization and high resolution of recorders in recent years. In the electrophotograpy, unlike general printing mentioned above, it is necessary to form a halftone image continuously from multilevel image data matching output of a recorder. Thus, it is a common practice to perform hardware processing rather than CPU processing with respect to halftone formation of electrophotographic print processing systems.

FIG. 2 shows the hardware configuration for representative halftone formation in a related art. In FIG. 2, an address generation section 8p calculates an address of threshold matrix data for comparison in response to the pixel position of input-multiple-valued image data 1p and outputs the address to threshold matrix data memory 2'p storing threshold matrix data. From the threshold matrix data memory 2'p, threshold data 9p corresponding to the input multiple-valued image data is output to a comparator 6'p, which then compares the input multiple-valued image data with the threshold data and outputs halftone data as binary image data 7'p.

As the threshold matrix data for the electrophotographic print processing systems mentioned above, a technique called rational tangent is generally used and threshold data is formed of a comparatively small matrix; the flexibility of the angle and the number of lines of each color plate for color printing is comparatively small. However, also in the electrophotographic print processing system, it has been made possible to form a halftone according to a supercell technique or a multiunit area technique wherein the matrix size formerly used with an image setter is large and the flexibility of the angle and the number of lines is high with a recorder put into high resolution as high image quality has been required in recent years.

In the halftone formation in FIG. 2, it is common practice to generate multilevel image data in print processing of the print processing system in the related art and convert the multilevel image data into halftone data just before laser exposure in a recorder; however, the costs of memory for storing multilevel image data introduce a problem in a low-priced electrophotographic print processing system as compared with the image setter as the recorder is put into high-resolution. Further, fast transfer of a large amount of multilevel image data from a print processing section to a recorder and fast halftone data generation in response to the recording speed of a fast recorder also introduce problems.

Converting multilevel image data into halftone data in the print processing section is designed as one resolution means to the first two problems. That is, multilevel image data is previously converted into halftone data and the halftone data is stored in memory as binary data and is output to the recorder, whereby both the memory capacity and the data transfer rate are reduced to one eighth. However, the last problem, fast halftone data generation, remains unsolved.

A document disclosing a technology of generating halftone data at high speed is the Unexamined Japanese Patent Application Publication No. Hei 6-6606, which describes the technology wherein one line of threshold matrix data is transferred a plurality of high-speed memories alternately apart from threshold matrix data memory and halftone processing is executed by reading the threshold data from the high-speed memories. However, the Unexamined Japanese Patent Application Publication No. Hei 6-6606 aims at execution of halftone generation at high speed with high-speed memories of a small capacity; basically it is the same as the configuration shown in FIG. 2 and dramatic speeding up of processing cannot be expected. Particularly, for painting objects with an average drawing run length for each painting object such as text or graphics, access to low-speed memory storing the whole threshold matrix data occurs frequently and benefit from high-speed memory can be little received.

Another idea for generating halftone data at high speed is as follows: A plurality of pieces of halftone data generation hardware as shown in FIG. 2 are provided and are operated in parallel, thereby executing halftone processing. In such a parallel operation technique, a large-scaled and high-speed circuit is provided for a logical operation section such as a comparator owing to the recent advance of the ASIC technology and the logical operation section can be realized easily. However, reading of threshold data involves problems such that generally the memory access time is slow as compared with simple logical operation performed as in a comparator and that a large number of data lines for reading a plurality of threshold data pieces at the same time are required; speeding up of reading threshold data is not achieved, causing a bottleneck in the technique.

It is therefore an object of the invention to provide an art of enabling high-speed threshold data output otherwise causing a bottleneck in hardware for generating a plurality of halftone data pieces.

Previous applications of using a crossbar switch to sort image data in an image processing system include the Unexamined Japanese Patent Application Publication No. Hei 8-305839, etc. The method shown in the Unexamined Japanese Patent Application Publication No. Hei 8-305839 is as follows: As 16-bit image data for one color per pixel, the high-order eight bits of each of R, G, B, and dummy (D) are first stored at consecutive addresses of memory, then the low-order eight bits of each of R, G, B, and D are stored at consecutive addresses following those addresses and to transfer the data to a display device, only the high-order eight bits at a time are transferred, thereby transferring the data at high speed. A crossbar switch is used to sort image data when image processing is performed by a CPU. However, the method disclosed in the Unexamined Japanese Patent Application Publication No. Hei 8-305839 is specialized for display and assumes only two ways of using the crossbar switch; it cannot be applied to such a halftone generation system incorporating the invention.

Previous applications of using a barrel shifter to sort image data in an image processing system include the Unexamined Japanese Patent Application Publication Hei 9-247466, etc. In the Unexamined Japanese Patent Application Publication No. Hei 9-247466, a barrel shifter, a selector, a register, and the like are used to realize insertion of special code and its relevant operation when variable-length code data is concatenated in a coder for performing variable-length coding, thereby speeding up processing by hardware. However, the method disclosed in the Unexamined Japanese Patent Application Publication No. Hei 9-247466 is specialized for the coder for performing variable-length coding; it cannot be applied to such a halftone generation system incorporating the invention.

It is therefore another object of the invention to provide a halftone generation system and a halftone generation method capable of executing at high speed, threshold data read and threshold data sort processing otherwise causing a bottleneck in hardware for generating a plurality of halftone data pieces in parallel.

SUMMARY OF THE INVENTION

To the end, according to the invention, there is provided a halftone generation system for generating halftone data of a pixel based on comparison between multilevel image data of the pixel and threshold matrix data, the halftone generation system comprising threshold matrix data storage means for storing threshold matrix data, threshold data read means for reading all threshold data applied to halftone data generation processing for one scanning line from the threshold matrix data storage means, first register means for retaining all the read threshold data applied to halftone data generation processing for the scanning line, threshold data selection means for selecting a plurality of threshold data pieces from among all the threshold data applied to halftone data generation processing for the scanning line retained in the first register means and outputting the selected threshold data pieces, and a plurality of comparison means for performing comparison processing between the threshold data pieces selected by the threshold data selection means and multilevel image data of a plurality of pixels in parallel and executing parallel generation processing of halftone data of the pixels.

According to the invention, there is provided a halftone generation system for generating halftone data of a pixel based on comparison between multilevel image data of the pixel and threshold matrix data in painting object units, the halftone generation system comprising threshold matrix data storage means for storing threshold matrix data, threshold data read means for reading all threshold data applied to halftone data generation processing for one scanning line from the threshold matrix data storage means in response to the start position of a painting object, first register means for retaining all the read threshold data applied to halftone data generation processing for the scanning line, threshold data selection means for selecting a plurality of threshold data pieces from among all the threshold data applied to halftone data generation processing for the scanning line retained in the first register means and outputting the selected threshold data pieces, and a plurality of comparison means for performing comparison processing between the threshold data pieces selected by the threshold data selection means and multilevel image data of a plurality of pixels in parallel and executing parallel generation processing of halftone data of the pixels.

In the halftone generation system of the invention, the data read means comprises second register means for retaining all threshold data applied to halftone data generation processing for the scanning line to be processed next to the current scanning line where halftone data generation processing is being executed, the threshold data read means reads all threshold data applied to halftone data generation processing for the scanning line to be processed next to the current scanning line from the threshold matrix data storage means and outputs the read threshold data to the second register means, and the threshold data retained in the second register means is output to the first register means.

In the halftone generation system of the invention, the parallel generation processing of halftone data of the pixels in the plurality of comparison means and the reading of all threshold data applied to halftone data generation processing for the scanning line to be processed next to the current scanning line from the threshold matrix data storage means and the output processing of the read threshold data to the second register means in the threshold data read means are performed in parallel.

In the halftone generation system of the invention, the threshold data selection means comprises as many selector circuits as the number of halftone data pieces generated in parallel in the plurality of comparison means, and input of each of the selector circuits is connected to output of the first register means at intervals of as many as the number of halftone data pieces generated in parallel in the plurality of comparison means and output of each of the selector circuits is switched in response to the pixel position of halftone data generated in parallel.

In the halftone generation system of the invention, the first register means comprises a shift circuit for circularly shifting the retained threshold data, and the shift circuit shifts the retained threshold data by as many threshold data pieces as the number of threshold data pieces in the first register means not output through the selector circuits to the plurality of comparison means.

In the halftone generation system of the invention, the first register means is made up of a first register at the preceding stage and a first register at the following stage, input of each of the selector circuits is connected to output of the first register at the following stage at intervals of as many as the number of halftone data pieces generated in parallel in the plurality of comparison means, the first register at the preceding stage comprises a shift circuit for circularly shifting the retained threshold data, the shift circuit shifts the retained threshold data in the first register at the preceding stage by as many threshold data pieces as the number of threshold data pieces in the first register at the following stage not output through the selector circuits to the plurality of comparison means, and the threshold data shifted in the first register at the preceding stage is output to the first register at the following stage.

In the halftone generation system of the invention, the parallel generation processing of halftone data of the pixels in the plurality of comparison means and the threshold data shift processing in the first register at the preceding stage are performed in parallel.

In the halftone generation system of the invention, the threshold data read means outputs a shift signal for specifying a threshold data shift amount for the second register means, and the shift signal indicates the shift amount for causing the start position of a painting object and the threshold data storage location to match.

In the halftone generation system of the invention, the second register means is made up of a second register at the preceding stage and a second register at the following stage, the threshold data read from the threshold matrix data storage means is retained in the second register at the preceding stage, then is output to the second register at the following stage, the threshold data read means outputs a shift signal for specifying a threshold data shift amount for the second register at the following stage, the second register at the following stage shifts the retained threshold data in response to the shift signal, and the threshold data shifted in the second register at the following stage is output to the first register means.

In the halftone generation system of the invention, the parallel generation processing of halftone data of the pixels in the plurality of comparison means and the threshold data shift processing in the second register at the following stage are performed in parallel.

In the halftone generation system of the invention, the threshold data read means controls the number of threshold data pieces to be read from the threshold matrix data storage means in response to the number of pixels of a painting object on a scanning line to which processing is applied.

In the halftone generation system of the invention, the threshold data read means reads a plurality of threshold data pieces at the same time from the threshold matrix data storage means.

According to the invention, there is provided a halftone generation method for generating halftone data of a nickel based on comparison between multilevel image data of the pixel and threshold matrix data, the halftone generation method comprising the threshold data read step of reading all threshold data applied to halftone data generation processing for one scanning line from threshold matrix data storage means, the step of retaining all the read threshold data applied to halftone data generation processing for the scanning line in first register means, the threshold data selection step of selecting a plurality of threshold data pieces from among all the threshold data applied to halftone data generation processing for the scanning line retained in the first register means and outputting the selected threshold data pieces, and the comparison step in a plurality of comparison means for performing comparison processing between the threshold data pieces selected at the threshold data selection step and multilevel image data of a plurality of pixels in parallel and executing parallel generation processing of halftone data of the pixels.

According to the invention, there is provided a halftone generation method for generating halftone data of a pixel based on comparison between multilevel image data of the pixel and threshold matrix data in painting object units, the halftone generation method comprising the threshold data read step of reading all threshold data applied to halftone data generation processing for one scanning line from threshold matrix data storage means in response to the start position of a painting object, the step of retaining all the read threshold data applied to halftone data generation processing for the scanning line in first register means, the threshold data selection step of selecting a plurality of threshold data pieces from among all the threshold data applied to halftone data generation processing for the scanning line retained in the first register means and outputting the selected threshold data pieces, and the comparison step in a plurality of comparison means for performing comparison processing between the threshold data pieces selected at the threshold data selection step and multilevel image data of a plurality of pixels in parallel and executing parallel generation processing of halftone data of the pixels.

In the halftone generation method of the invention, the threshold data read means reads all threshold data applied to halftone data generation processing for the scanning line to be processed next to the current scanning line where halftone data generation processing is being executed from the threshold matrix data storage means and outputs the read threshold data to second register means, and the threshold data retained in the second register means is output to the first register means.

In the halftone generation method of the invention, the parallel generation processing of halftone data of the pixels in the plurality of comparison means and the reading of all threshold data applied to halftone data generation processing for the scanning line to be processed next to the current scanning line from the threshold matrix data storage means and the output processing of the read threshold data to the second register means in the threshold data read means are performed in parallel.

To the end, according to the invention, there is provided a halftone generation system for comparing pixel data forming a multilevel image with threshold matrix data, thereby generating halftone data based on the pixel data of the multilevel image, the halftone generation system comprising threshold data read means for reading all threshold data applied to a scanning line for generating a halftone in batch from threshold matrix data storage means for storing threshold matrix data, threshold data selection means for selecting a plurality of threshold data pieces corresponding to positions of a plurality of pixels for which a halftone is to be generated from among the threshold data pieces read by the threshold data read means and outputting the selected threshold data pieces, and comparison means for performing comparison processing between the pixel data pieces for which a halftone is to be generated and the threshold data pieces selected by the threshold data selection means in parallel and generating a plurality of halftone data pieces at the same time.

According to the invention, there is provided a halftone generation system for comparing pixel data forming a multilevel image with threshold matrix data, thereby generating halftone data based on the pixel data of the multilevel image, the halftone generation system comprising threshold data read means for reading all threshold data applied to a scanning line for generating a halftone in batch from threshold matrix data storage means for storing threshold matrix data, first register means for temporarily retaining all threshold data corresponding to the scanning line read by the threshold data read means, threshold data selection means for selecting a plurality of threshold data pieces corresponding to positions of a plurality of pixels for which a halftone is to be generated from among all the threshold data pieces corresponding to the scanning line retained in the first register means and outputting the selected threshold data pieces, second register means for temporarily retaining the selected and output threshold data pieces, and comparison means for performing comparison processing between the pixel data pieces for which a halftone is to be generated and the threshold data pieces retained in the second register means in parallel and generating a plurality of halftone data pieces at the same time, characterized in that the threshold data read processing performed by the threshold data read means, the threshold data selection processing performed by the threshold data selection means, and the halftone data generation processing performed by the comparison means are executed in parallel as pipeline processing in units of pixels.

According to the invention, there is provided a halftone generation method for comparing pixel data forming a multilevel image with threshold matrix data, thereby generating halftone data based on the pixel data of the multilevel image, the halftone generation method comprising the threshold data read step of reading all threshold data applied to a scanning line for generating a halftone in batch from threshold matrix data storage means for storing threshold matrix data, the threshold data selection step of selecting a plurality of threshold data pieces corresponding to positions of a plurality of pixels for which a halftone is to be generated from among the threshold data pieces read at the threshold data read step and outputting the selected threshold data pieces, and the comparison step of performing comparison processing between the pixel data pieces for which a halftone is to be generated and the threshold data pieces selected at the threshold data selection step in parallel and generating a plurality of halftone data pieces at the same time.

According to the invention, there is provided a halftone generation method for comparing pixel data forming a multilevel image with threshold matrix data, thereby generating halftone data based on the pixel data of the multilevel image, the halftone generation method comprising the threshold data read step of reading all threshold data applied to a scanning line for generating a halftone in batch from threshold matrix data storage means for storing threshold matrix data, the step of temporarily retaining all threshold data corresponding to the scanning line read at the threshold data read step in first register means, the threshold data selection step of selecting a plurality of threshold data pieces corresponding to positions of a plurality of pixels for which a halftone is to be generated from among all the threshold data pieces corresponding to the scanning line retained in the first register means and outputting the selected threshold data pieces, the step of temporarily retaining the selected and output threshold data pieces in second register means, and the comparison step of performing comparison processing between the pixel data pieces for which a halftone is to be generated and the threshold data pieces retained in the second register means in parallel and generating a plurality of halftone data pieces at the same time, characterized in that the threshold data read processing performed at the threshold data read step, the threshold data selection processing performed at the threshold data selection step, and the halftone data generation processing performed at the comparison step are executed in parallel as pipeline processing in units of pixels.

According to the configuration, it is made possible to perform parallel comparison processing for a high-speed color print processing system of high image quality, and halftone data can be supplied at high-speed. Threshold data read from the memory, selection of threshold data required for parallel comparison, and parallel comparison processing performed by a plurality of comparators are executed as pipeline processing, whereby it is made possible to supply threshold data to the comparison processing means at high speed.

Referring now to the accompanying drawings, there are shown halftone generation systems and halftone generation methods according to the invention.

BRIEF DESCRIPTION OF THE DRAWINGS

In the accompanying drawings:

FIG. 17 is an illustration to show a truth table of a binary decoder;

DETAILED DESCRIPTION OF THE PREFERRED EMBODIMENTS (First Embodiment)

Figure 1:
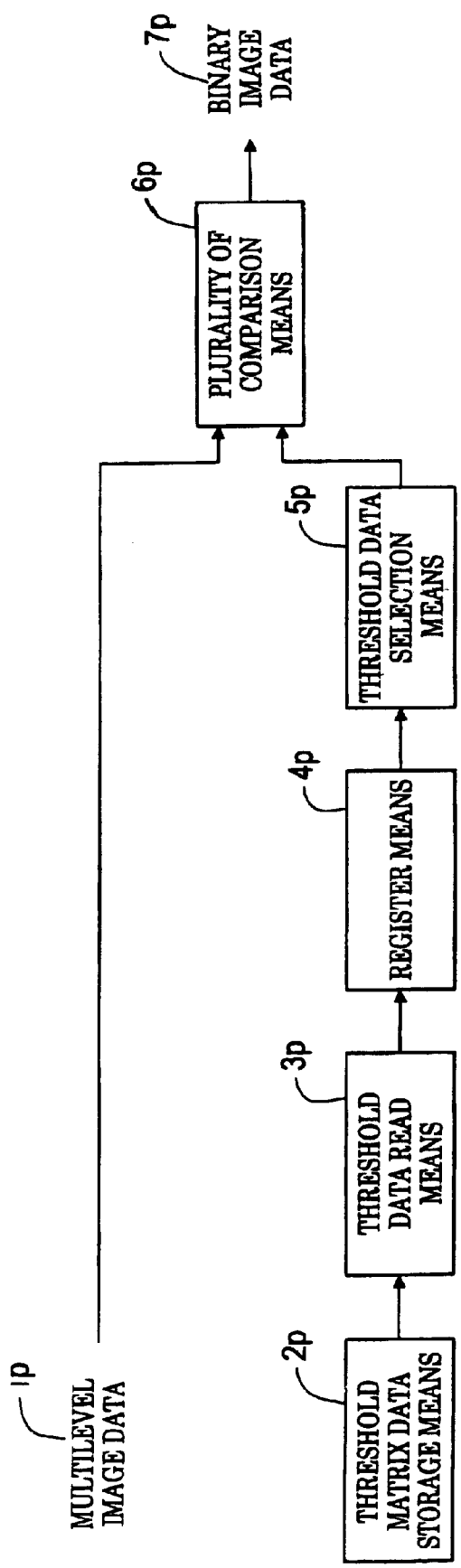
FIG. 1 is a block diagram to show the principle configuration of a halftone generation system of the invention.
Figure 2:
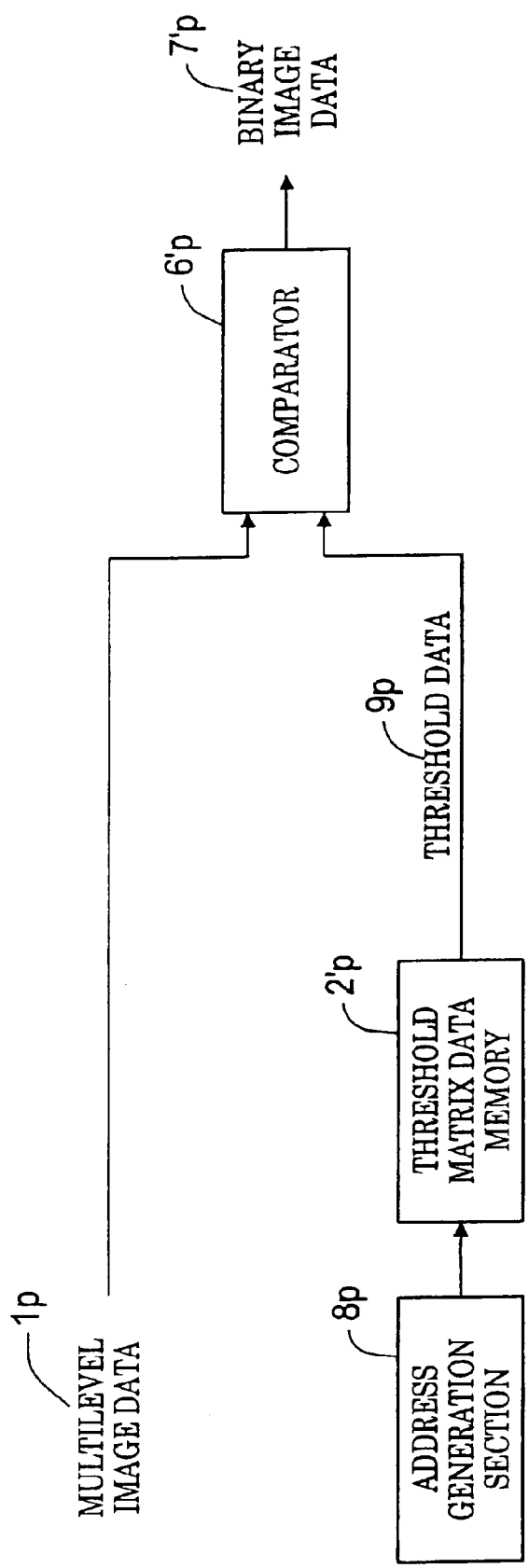
FIG. 2 is a hardware block diagram for representative halftone formation in a related art.

FIG. 1 is a block diagram to show the principle configuration of a halftone generation system according to the invention. In the figure, the halftone generation system according to the invention is made up of threshold matrix data storage means 2p, threshold data read means 3p, register means 4p, threshold data selection means 5p, and a plurality of comparison means 6p for converting input multilevel image data 1p into binary image data 7p and outputting the binary image data.

The threshold matrix data storage means 2p is memory for storing threshold data to binarize the input multilevel image data 1p. The threshold matrix data to which the invention is applied is, for example, matrix data of a large size corresponding to a high-resolution recorder and is data made up of halftone dot cells prepared in, for example, a supercell technique or a multiunit area technique. The supercell technique is described in "Postscript screening" written by Peter Fink, published by Kabushikikaisha MDN Corporation. The multiunit area technique is described in Nippon Insatsu Gakkaishi, Vol 31, pp 31–39 (1994). The threshold matrix data is stored in memory so that a plurality of threshold data pieces are output at the same time, for example, in 32-bit units or 64-bit units in response to the number of threshold data pieces accessed at the same time.

The threshold data read means 3p reads all threshold data for the scanning line from the threshold matrix data storage means 2p based on a scan signal of the input multilevel image data 1p, namely, reads all threshold data applied to halftone data generation processing of one scanning line and retains the threshold data in sequence so that the threshold data can be transferred to the register means 4p at the following stage at the same time. After transferring the threshold data to the register means 4p, the threshold data read means 3p reads all threshold data for the next scanning line, namely, all threshold data applied to halftone data generation processing of the next scanning line.

The register means 4p retains all threshold data for a scanning line output from the threshold data read means 3p until completion of binarization processing of the scanning line. Further, in the invention, binarization processing is performed for a plurality of pixels at the same time in the plurality of comparison means 6p and the threshold data retained in the register means 4p is also output to the plurality of comparison means 6p at the same time; the data in the register means 4p is shifted by the number of remaining threshold data pieces resulting from repeating the output. That is, as many threshold data sets as the number of comparators forming the comparison means are output from the register means 4p to the comparators forming the comparison means via the selector circuits forming the threshold data selection means 5p following the register means 4p, and the sum total of the output threshold data sets becomes a multiple of the number of the comparison means. Resultantly, threshold data not output to the comparators via the selector circuits remain at the end of the register means 4p as remaining data. The whole threshold matrix data set in the register means 4*p* is shifted circularly so that the remaining data is placed at the top of the register means. The threshold matrix data is repeatedly used by shifting the whole data in the register means. The shift processing will be described later in detail.

The threshold data selection means 5*p* selects predetermined threshold data out of all threshold data for the scanning line retained in the register means 4*p* and outputs the selected threshold data to the comparison means. Threshold data to binarize the multilevel image data 1*p* in the plurality of comparison means 6*p* is selectively taken out from the threshold data set in the register means 4*p* in response to the scan position of the multilevel image data 1*p*. The threshold data selection means 5*p* is a selector for selecting a plurality of threshold data blocks and outputting the selected data blocks to the plurality of comparison means 6*p*. For example, in a configuration in which eight comparison means perform parallel processing, eight consecutive threshold data pieces are placed in one block corresponding to eight consecutive pieces of multilevel image data 1*p* and are output to the plurality of comparison means 6*p* in sequence for each block.

The plurality of comparison means 6*p* compare as many pieces of multilevel image data 1*p* as the number of the comparison means 6*p* with the corresponding threshold data pieces and binarize the multilevel image data 1*p*. For example, if the multilevel image data 1*p* is greater than the threshold data, the bit of the pixel is set to 1; if the multilevel image data 1*p* is less than the threshold data, the bit of the pixel is set to 0. The comparison processing is performed in parallel. The binary image data 7*p* output from the plurality of comparison means 6*p* is stored in buffer memory, for example, in predetermined processing units, namely, scanning line units, band units, or page units, then is output to an electrophotographic recorder.

Next, a first embodiment of the invention will be discussed.

Figure 3:
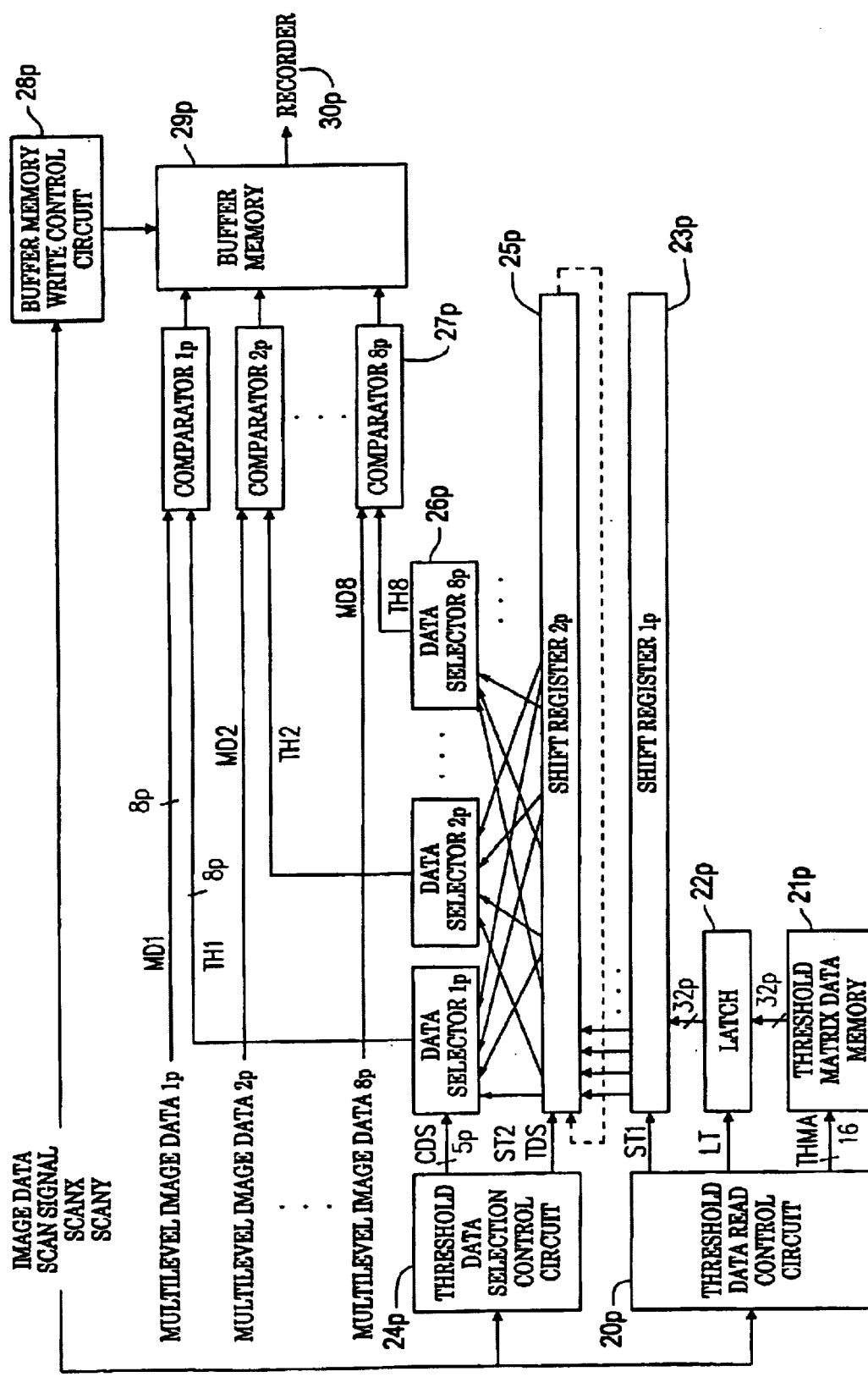
FIG. 3 shows a hardware configuration example of a halftone generation system in a first embodiment of the invention.

FIG. 3 shows a hardware configuration example of a halftone generation system of the embodiment. In FIG. 3, the threshold matrix data storage means 2*p* previously described with reference to FIG. 1 corresponds to threshold matrix data memory 21*p*, the threshold data read means 3*p* in FIG. 1 corresponds to a threshold data read control circuit 20*p*, a latch 22*p*, and a shift register 1*p*, 23*p*, the register means 4*p* in FIG. 1 corresponds to a shift register 2*p*, 25*p*, the threshold data selection means 5*p* in FIG. 1 corresponds to a threshold data selection control circuit 24*p* and a plurality of data selectors 1*p* to 8*p*, 26*p*, and the plurality of comparison means 6*p* in FIG. 1 correspond to eight comparators 1*p* to 8*p*, 27*p*. In addition, the hardware configuration shown in FIG. 3 contains buffer memory 29*p* for temporarily storing binarized image data in the comparators 1*p* to 8*p*, 28*p* forming the plurality of comparison means 6*p* and a buffer memory write control circuit 28*p* although the buffer memory 29*p* and the buffer memory write control circuit 28*p* are not directly related to the invention. The hardware configuration will be discussed.

First, the threshold matrix data memory 21*p* in FIG. 3 in the embodiment forming the threshold matrix data storage means 2*p* in FIG. 1 will be discussed. Threshold matrix data stored in the threshold matrix data memory 21*p* is prepared according to the multiunit area method, for example. The embodiment assumes that the resolution of a recorder is, for example, 2400 dpi and that the number of screen lines is, for example, about 177. For these conditions, the matrix size becomes 210×210 and assuming that each threshold data piece consists of eight bits (one byte), the data size per color of C, M, Y, and K becomes 210×210=44100 [Kbytes]. In the multiunit area technique, threshold matrix data to generate halftone at screen angles 15 degrees, 75 degrees, and 45 degrees is generated to prevent a more from occurring. The number of halftone dot cells contained in a 210×210 matrix is 241 as 15-degree, 75-degree cells and is 242 as 45-degree cells. In the conditions, the length of halftone generated in one line of the matrix (210 threshold data pieces) is only about 2.2 [mm] and it is self-evident that it is desirable to recycle the threshold data as described in the invention.

Figure 5:
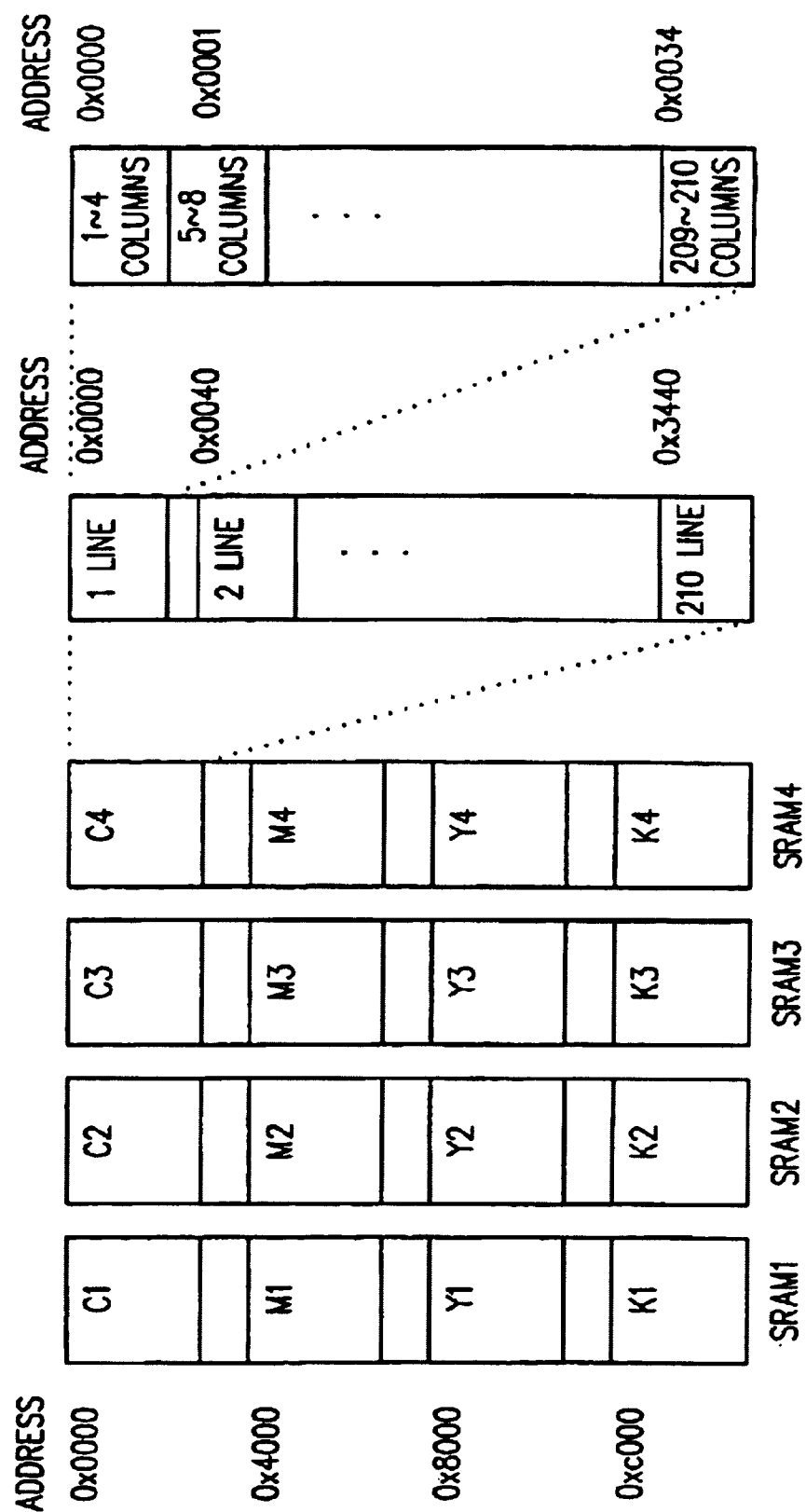
FIG. 5 is a schematic representation to show the memory configuration and how threshold matrix data is stored in the halftone generation system in the first embodiment of the invention.

In the embodiment, for example, SRAM is used as the threshold matrix data memory 21*p* for storing the threshold matrix data. FIG. 5 shows the memory configuration and how the threshold matrix data is stored. As shown here, in the embodiment, four 8-bit memory devices are placed in parallel at the same address, so that four threshold data pieces are output at the same address. The threshold matrix data for each color of C, M, Y, and K is stored in the memory and is addressed in response to the color recorded in the recorder. Therefore, as shown in FIG. 5, the address line becomes 16 bits in all and the data line of threshold data becomes 32 bits in all. The threshold matrix data is addressed by a threshold data address signal THMA of the threshold data read control circuit 20*p*.

Next, the threshold data read control circuit 20*p*, the latch 1*p*, 22*p*, and the shift register 1*p*, 23*p* in FIG. 3 in the embodiment making up the threshold data read means 3*p* in FIG. 1 will be discussed. The threshold data read control circuit 20*p* outputs a threshold data address signal THMA for accessing the threshold matrix data memory based on an image data scan signal SCANY for representing the position of multilevel image data undergoing halftone processing, and outputs a latch timing signal LT for retaining threshold data in the latch 1*p*, 22*p* in response to the timing at which threshold data is output from the threshold matrix data memory. It also outputs a shift signal ST1 for shifting data so that the data can be output simultaneously to the register means at the following stage at the same time as the latched threshold data is read in the shift register 1*p*, 23*p*.

Figure 6:
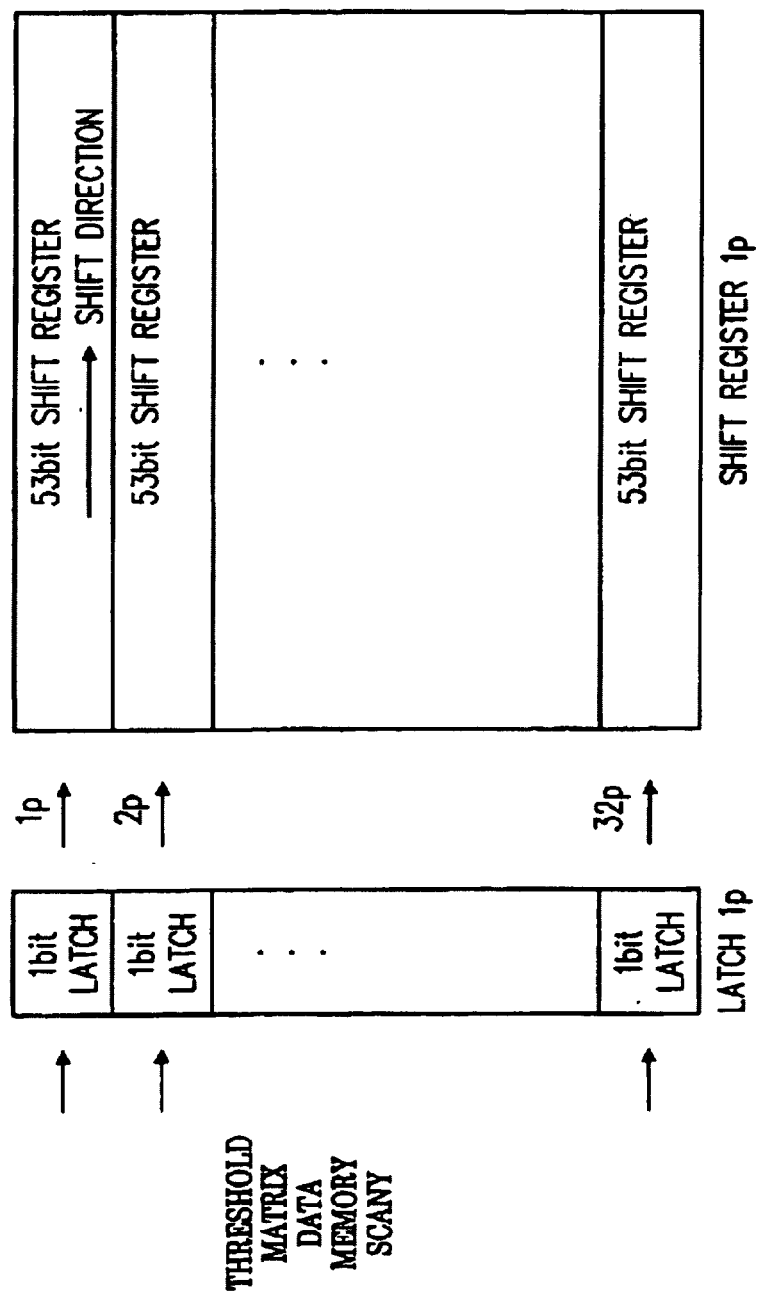
FIG. 6 is a schematic representation to show how a latch $1p$ and a shift register $1p$ are connected in the halftone generation system in the first embodiment of the invention.

The latch 1*p*, 22*p* is provided for temporarily storing 32-bit data output from the threshold matrix data memory 21*p*; for example, it is formed of a circuit comprising an input gate placed preceding an RS flip-flop circuit and holds data while the latch timing signal LT is low. The shift register 1*p*, 23*p* is formed of a circuit comprising 53 JK flip-flop circuits connected in series, for example, and shifts data 32 bits at a time at the same time as it inputs the threshold data-held in the latch 1*p*, 22*p* at the clock timing of the shift signal ST1. FIG. 6 shows how the latch 1*p*, 22*p* and the shift register 1*p*, 23*p* are connected. From the threshold matrix data memory, 32-bit data is temporarily stored in the latch 1*p*, then the stored data is input to the shift register 1*p*, 23*p*.

Figure 7:
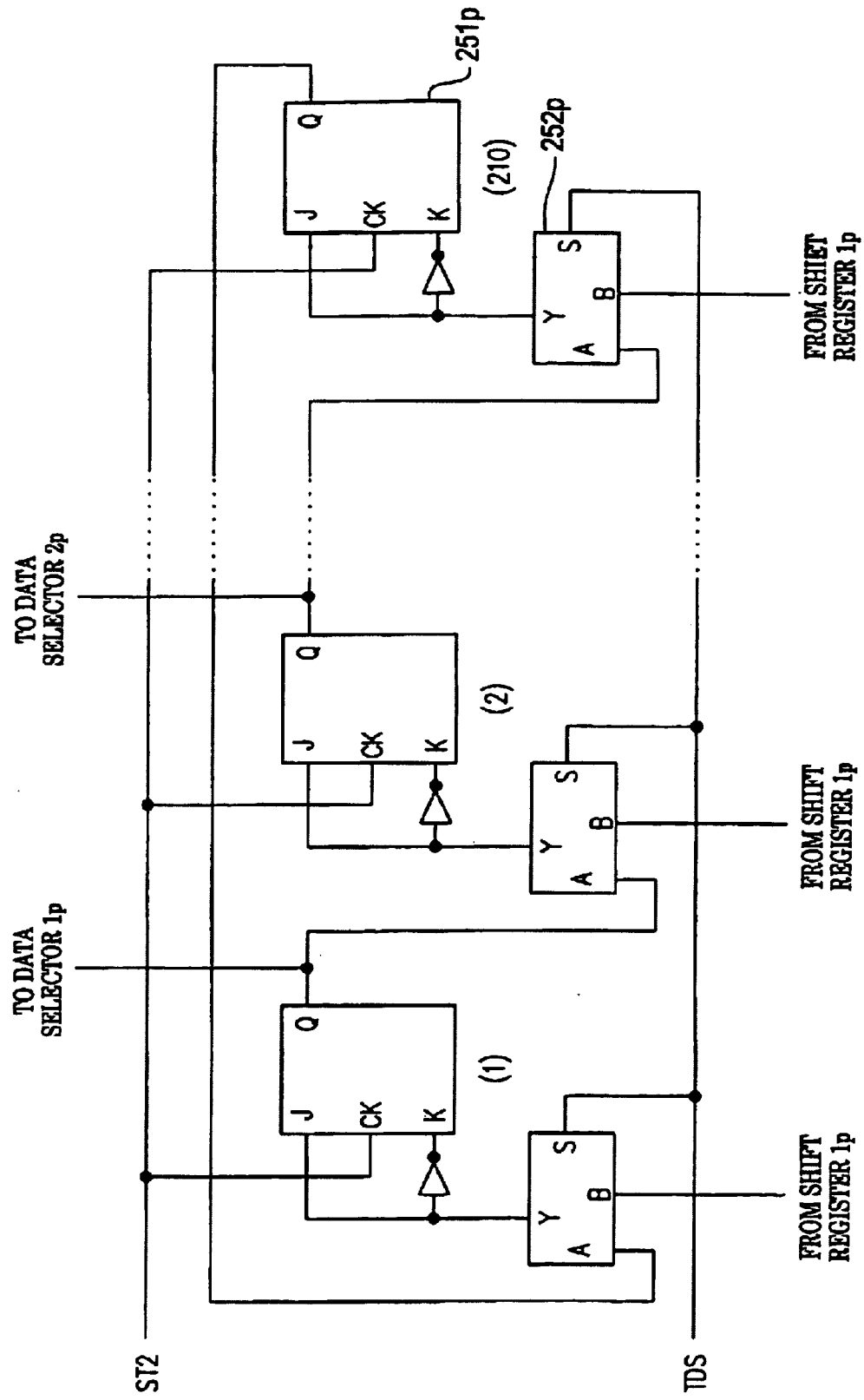
FIG. 7 is a schematic representation of the hardware configuration of a shift register $2p$ in the halftone generation system in the first embodiment of the invention.

Next, the shift register 2*p*, 25*p* shown in FIG. 3 in the embodiment corresponding to the register means 4*p* in FIG. 1 will be discussed. FIG. 7 shows the configuration of the shift register 2*p*, 25*p*. For example, the shift register 2*p*, 25*p* is made up of a circulating register comprising 210×8 JK flip-flop circuits 251*p* which correspond to all data of one line of the threshold matrix in the embodiment and are connected circularly, and 210×8 2 to 1 data selectors 252*p* for controlling input of the JK flip-flop circuits 251*p*. To input all threshold data in the shift register 1*p*, 23*p* to the shift register 2*p*, 25*p* at the same time, each output of the shift register 1*p*, 23*p* and one input of each of the 2 to 1 data selectors 252*p* corresponding to the JK flip-flop circuits 251*p* in the shift register 2*p*, 25*p* are connected on a one-to-one basis. Further, shifting of the data already input into the shift register 2p, 25p is controlled by a shift signal ST2 output from the threshold data selection control circuit 24p, and threshold data input from the shift register 1p, 23p is controlled by a threshold data select signal TDS.

Figure 8:
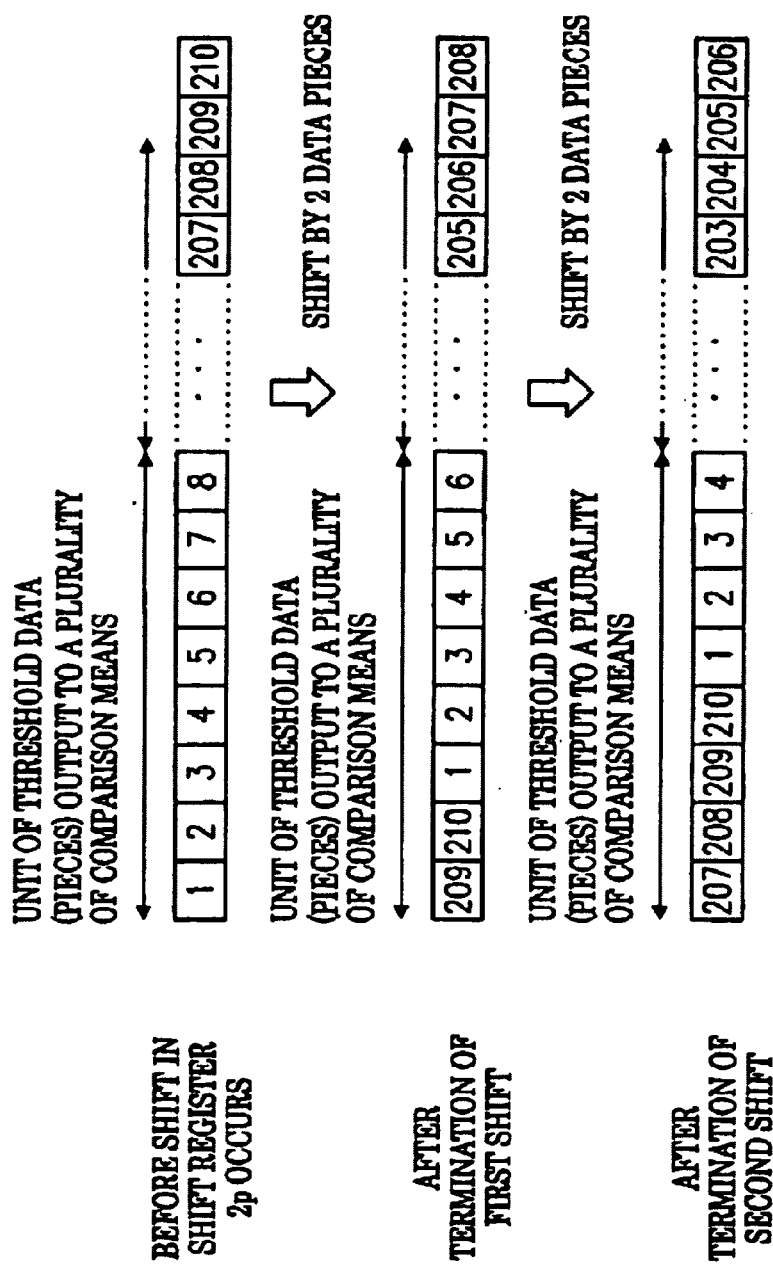
FIG. 8 is a schematic representation of placement of threshold data in the shift register $2p$ before and after shift of threshold data in the halftone generation system in the first embodiment of the invention.

In the configuration of the embodiment previously described with reference to FIG. 3, required scanning line threshold data is all read into the shift register 1p, 23p through the latch 1p, 22p from the threshold matrix data memory 21p under the control of the threshold data read control circuit 20p, then the threshold data select signal TDS output from the threshold data selection control circuit 24p is set in the shift register 2p, 25p to which the threshold data is to be input, and all the threshold data in the shift register 1p, 23p is input to the shift register 2p, 25p at the same time at the clock timing of the shift signal ST2. Further, threshold data is transferred to the eight comparators 1p to 8p, 27p through the eight data selectors 1p to 8p, 26p as many times as a predetermined number, then threshold data pieces in the register are shifted circularly by a predetermined number (of data pieces) based on the shift signal ST2. In the embodiment, the predetermined number of times the threshold data is transferred is 210/8=26 because the number of threshold data pieces input to the register is 210 and the number of threshold data pieces undergoing comparison processing at the same time in the comparators 1p to 8p, 27p of the plurality of comparison means is eight. The predetermined number (of data pieces) by which the threshold data in the register is shifted is two (data pieces) because 210%8=2. FIG. 8 shows placement of threshold data before and after shift, and the shift processing will be discussed.

The initial state of the shift register 2p in which threshold data is set is shown at the top stage of FIG. 8. Threshold data 1p to threshold data 210p are set in the shift register 2p in order starting at the top of the register. In this register set state, threshold data 1p is input through the selector 1p to the comparator 1p and comparison processing with the top pixel of the scanning line is performed for executing halftone generation. Likewise, threshold data 2p is input through the selector 2p to the comparator 2p for processing and threshold data 3p to threshold data 8p are input through the selectors 3p to 8p to the comparators 3p to 8p for processing. Following the processing, comparison processing between the data corresponding to threshold data 9p to threshold data 16p, 17p to 24p, . . . , 201p to 208p and multilevel image data in the comparators is executed.

When the comparison processing is thus executed, threshold data 209p and threshold data 210p in the register 2p are not output to the selectors, the comparators and become remaining data as shown at the top stage of FIG. 8. The two data pieces are shifted to the top of the register as shown at the intermediate stage of FIG. 8, then threshold data sets each consisting of eight data pieces, 209p–6p, 7p–15p, . . . , and 199p–206p starting at the top of the register in the register state shown at the intermediate stage of FIG. 8 are output through the selectors to the eight comparators for executing parallel comparison processing. Further, when the threshold data is thus transferred 26 times and comparison processing is complete, threshold data 207p and threshold data 208p shown at the intermediate stage of FIG. 8 are shifted to the top of the register as shown at the bottom stage of FIG. 8, and threshold data sets each consisting of eight data pieces are output in order starting at the top of the register. The transfer and shifting are repeated until completion of halftone processing of the current scanning line.

Next, the threshold data selection control circuit 24p and the eight data selectors 1p to 8p, 26p in FIG. 3 in the embodiment making up the threshold data selection means 5p in FIG. 1 will be discussed. The threshold data selection control circuit 24p outputs the shift signal ST2 and the threshold data select signal TDS for controlling threshold data input and data shift in the shift register 2p, 25p based on image data scan signals SCANX and SCANY representing the position of multilevel image data undergoing halftone processing, and also outputs a 5-bit comparison data select signal CDS for selectively outputting threshold data in the shift register 2p, 25p to the eight comparators 1p to 8p, 27p. The eight data selectors 1p to 8p, 26p are each a 26 to 1 data selector connected to 26 output lines of the register 2p, 25p. The shift register 2p, 25p and the eight data selectors 1p to 8p, 26p are connected in such a manner that output of the first JK flip-flop circuit 251p of the shift register 2p, 25p is connected to the data selector 1p, that output of the second JK flip-flop circuit 251p is connected to the data selector 2p, . . . that output of the eighth JK flip-flop circuit 251p is connected to the data selector 8p, that output of the ninth JK flip-flop circuit 251p is connected to the data select or 1p . . .

In the configuration, as the 5-bit comparison data select signal CDS, 0x00 to 0x19 are output in sequence and the threshold data is shifted, then output of 0x00 to 0x19 is repeated in a similar manner. Eight threshold data pieces selected through the eight data selectors 1p to 8p are output to the eight comparators 1p to 8p, 27p respectively.

Next, the eight comparators 1p to 8p, 27p will be discussed. Each of the eight comparators 1p to 8p, 27p are an 8-bit magnitude comparator for comparing multilevel image data with threshold data. If the multilevel image data is greater than the threshold data, 1 is output; if the multilevel image data is less than the threshold data, 0 is output, so that the multilevel image data is binarized. The eight comparators 1p to 8p, 27p can be operated in parallel. The image data binarized in the eight comparators 1p to 8p, 27p is written into the buffer memory 29p eight bits at a time under the control of the buffer memory write control circuit 28p.

The hardware configuration of the halftone generation system of one embodiment of the invention has been described. The logic section except the threshold matrix data memory 21p or the buffer memory 29p can be easily put into an LSI as a semicustom LSI called a gate array, for example.

Next, the general processing in the hardware configuration of the embodiment will be discussed with reference to FIG. 3.

First, before conversion of input multilevel image data to a halftone, the image data scan signal SCANY is read into the threshold data read control circuit 20p. The threshold data read control circuit 20p outputs the threshold data address signal THMA to the threshold matrix data memory 21p for outputting any desired threshold data four data pieces at a time, namely, 32 bits at a time from the threshold matrix data memory 21p through the latch 1p, 22p to the shift register 1p, 23p. The threshold data read control circuit 20p repeats output of the threshold data address signal THMA until completion of input of all threshold data for the scanning line, namely, 53 times.

All threshold data for the scanning line is input to the shift register 1p, 23p, then is set in the shift register 2p, 25p based on the threshold data select signal TDS and the shift signal ST2 output from the threshold data selection control circuit 24p.

After all threshold data for the scanning line is set in the shift register 2p, 25p, binarization is started based on comparison between the threshold data selected by the comparison data select signal CDS output from the threshold data selection control circuit 24p and predetermined multilevel image data with respect to the greater-than or less-than relationship. The comparison between the selected threshold data and predetermined multilevel image data with respect to the greater-than or less-than relationship is executed in parallel by the comparators 1p to 8p, 27p.

In the embodiment, the number of comparators that can be operated in parallel is eight and eight threshold data pieces set in the register 2p, 25p are set in the comparators at a time for executing comparison processing. In the embodiment, as previously described with reference to FIG. 8, 210 threshold data pieces are set in the register 2p, 25p at a time and comparison with eight threshold data pieces is executed at a time in the comparators 1p to 8p, 27p. Thus, if the comparison processing is repeated 26 times, 8×26=208 threshold data pieces are used and the data in the register needs to be shifted to the state shown at the intermediate stage of FIG. 8 for further comparison processing. Therefore, after repeating output of the comparison data select signal CDS 26 times, the threshold data selection control circuit 24p outputs the shift signal ST2 twice to the shift register 2p, 25p for circulating the threshold data for placing the register in the register state shown at the intermediate stage of FIG. 8. The threshold data selection control circuit 24p repeats the processing until the end of the scanning line to which the threshold data read from the threshold matrix is applied, so that comparison processing with multilevel image data is performed for conversion to a halftone. On the other hand, when the conversion of predetermined multilevel image data to a halftone is started, read of the threshold data for the next scanning line is started in the threshold data read control circuit 20p.

The process is repeated, whereby conversion to a halftone is executed.

Therefore, according to the embodiment, threshold data read formerly executed for each process pixel is recycled until the end of the scanning line to which the threshold data read from the threshold matrix is applied, and thus read processing needs to be performed only once for each scanning line processed. Further, it is made possible to execute read of threshold data for the next scanning line and threshold data output for conversion to a halftone as pipeline processing, so that it is made possible to reduce the threshold data read time to an ignorable level as compared with the conventional technique wherein threshold data is read for each process pixel.

(Second Embodiment)

Figure 4:
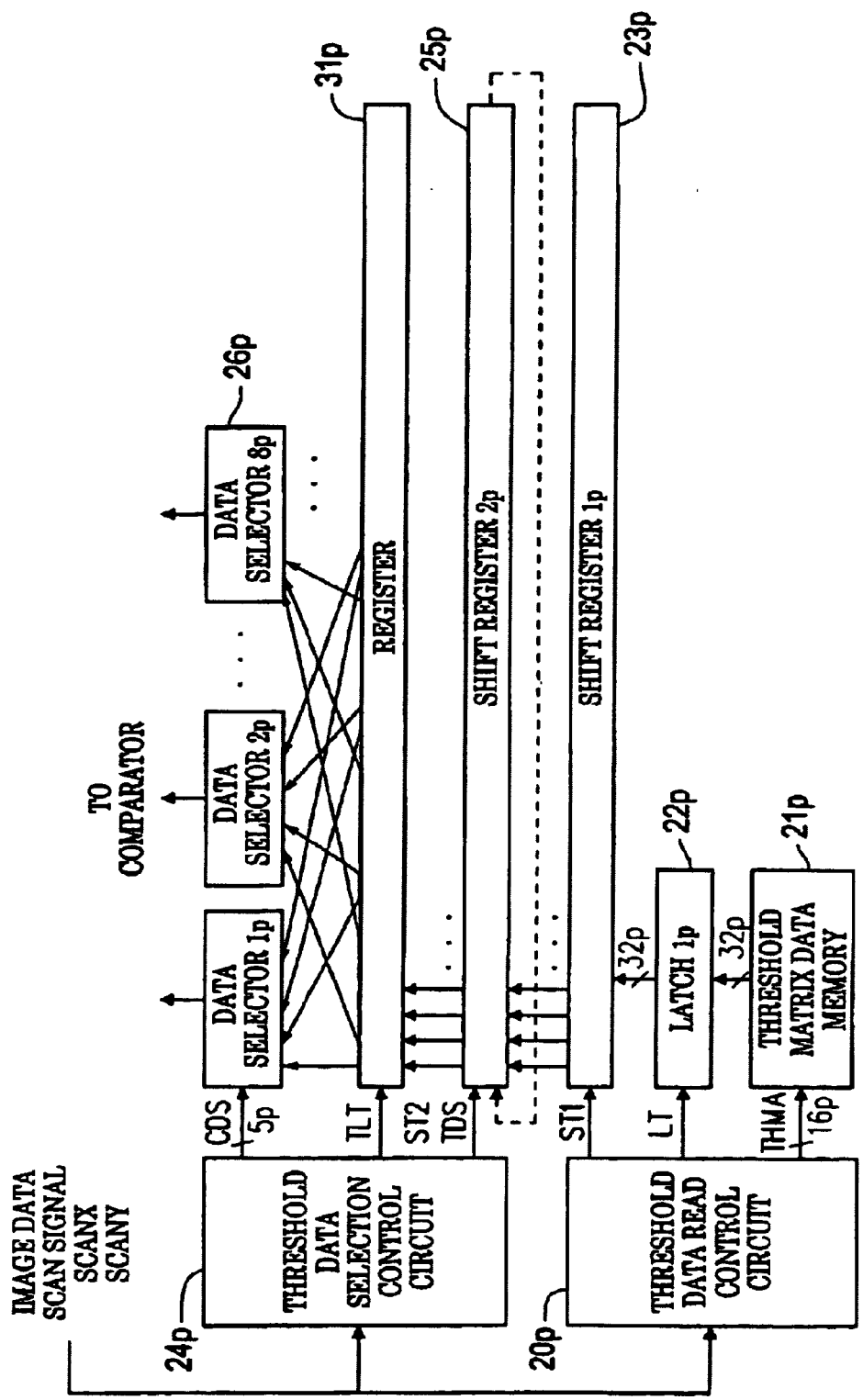
FIG. 4 is a peripheral hardware block diagram of register means in a halftone generation system in a second embodiment of the invention.

Next, a second embodiment of the invention will be discussed. The second embodiment has a configuration wherein the register means in the hardware configuration of the first embodiment (see FIG. 3) is changed. Basically, it has the basic configuration in FIG. 1 and the configuration of the register means 4p in FIG. 1 differs from that of the first embodiment shown in FIG. 3. FIG. 4 shows the peripheral hardware configuration of register means 4p in a halftone generation system of the second embodiment. In FIG. 4, the register means 4p is made up of a shift register 2p, 25p and a register 31p. The shift register 2p, 25p is similar to the shift register 2p in the hardware configuration of the first embodiment. It is made up of a circulating register comprising 210×8 JK flip-flop circuits 251p which correspond to all data of one line of a threshold matrix in the embodiment and are connected circularly, and 210×8 2to 1 data selectors 252p for controlling input of the JK flip-flop circuits 251p, for example, as shown in FIG. 7. On the other hand, the register 31p is similar to a latch 1p, 22p; for example, it is formed of a circuit comprising an input gate placed preceding an RS flip-flop circuit and holds data while a latch timing signal TLT output from a threshold data selection control circuit 24p is low. However, unlike the latch 1p, 22p, the register 31p is adapted to retain 210 8-bit data pieces to retain all threshold data.

In the first embodiment, as many threshold data pieces as the predetermined number (in the first embodiment, 8×26= 208 (data pieces)) are transferred through the eight data selectors 1p to 8p, 26p to the eight comparators 1p to 8p, 27p, then threshold data in the register is shifted circularly by the predetermined number (of data pieces) (in the first embodiment, 210–(8×26)=2 (data pieces)) based on the shift signal ST2; in the second embodiment, threshold data transfer and circular shifting of threshold data can be executed as pipeline processing. That is, after required scanning line threshold data is all read into a shift register 1p, 23p, all the threshold data in the shift register 1p, 23p is set in the register 31p at the same time as all the threshold data is input to the shift register 2p, 25p at a time. Therefore, in the initial state, the same data is set in the register 31p and the register 2p, 25p in the same manner.

Threshold data transfer to comparators 1p to 8p, 27p through data selectors 1p to 8p, 26p is executed starting at the threshold data set in the register 31p, and circular shifting of threshold data based on a shift signal ST2 is executed in the register 2p, 25p in parallel with the threshold data transfer to the comparators 1p to 8p, 27p. Therefore, threshold data shifting after as many threshold data pieces as predetermined number are transferred from the register 31p through the data selectors 1p to 8p, 26p to the eight comparators (not shown in FIG. 4) is already complete in the shift register 2p, 25p, so that the shift processing time loss as in the first embodiment can be eliminated and it is made possible to perform processing with a delay of one CLK.

Thus, according to the second embodiment, threshold data transfer and circular shifting of threshold data can be executed as pipeline processing, thus the delay caused by the circular shifting can be absorbed. Although the delay caused by the circular shifting in the first and second embodiments is small (two data pieces, namely, two CLKs), the delay caused by the circular shifting grows depending on the combination of the number of binarization processes executed in parallel and the threshold matrix data size. For example, to generate threshold matrix data of about 166 screen lines in the multiunit area technique as in the first embodiment, the threshold matrix data size becomes 165× 165. If eight comparators are used for binarization as in the first and second embodiments, the threshold data must be circularly shifted by 165%8=5 (data pieces), and the shift processing time as long as five CLKs becomes necessary. That is, to use eight comparators as in the first and second embodiments, threshold data needs to be shifted by five data pieces every 20 repetitions of threshold data transfer because 8×20=160. Since threshold data is shifted by five data pieces every 20 repetitions of threshold data transfer, threshold data transfer processing: shift processing becomes the necessary time of 20:5; the shift processing requires the 25% processing time relative to the threshold data transfer processing. Resultantly, a large delay occurs. According to the embodiment, the delay becomes 5%.

(Third Embodiment)

Next, a third embodiment of the invention will be discussed.

In general print processing according to the invention, drawing instructions for representing text, graphics, photo are interpreted in sequence and are overwritten on each other in drawing memory in order, then raster expansion is executed. To reduce the drawing memory in the print processing, a technique is known wherein each drawing instruction is converted into an intermediate format (intermediate data) between the drawing instruction and raster data, then division is executed into a number of areas making up one page of the intermediate data (band division), then raster expansion of the intermediate data is executed in the drawing memory in band units and sequential overwriting is performed. The drawing instructions are interpreted in sequence and the intermediate data is generated as a cluster representing a plurality of painting objects representing text, graphics, photo. The third embodiment of the invention relates to a halftone generation system according to the above-mentioned configuration for converting multilevel image data undergoing raster expansion in painting object units into a halftone and overwriting in buffer memory.

Therefore, the multilevel image data converted into a halftone in the third embodiment differs from that in the first and second embodiments in that the multilevel image data is input to the halftone generation system for each painting object and that the start position of the multilevel image data varies from one painting object to another and from one scanning line to another. Thus, threshold data read means $3p$ in the third embodiment is adapted to set read threshold data to the top pixel position of multilevel image data to be processed.

Figure 9:
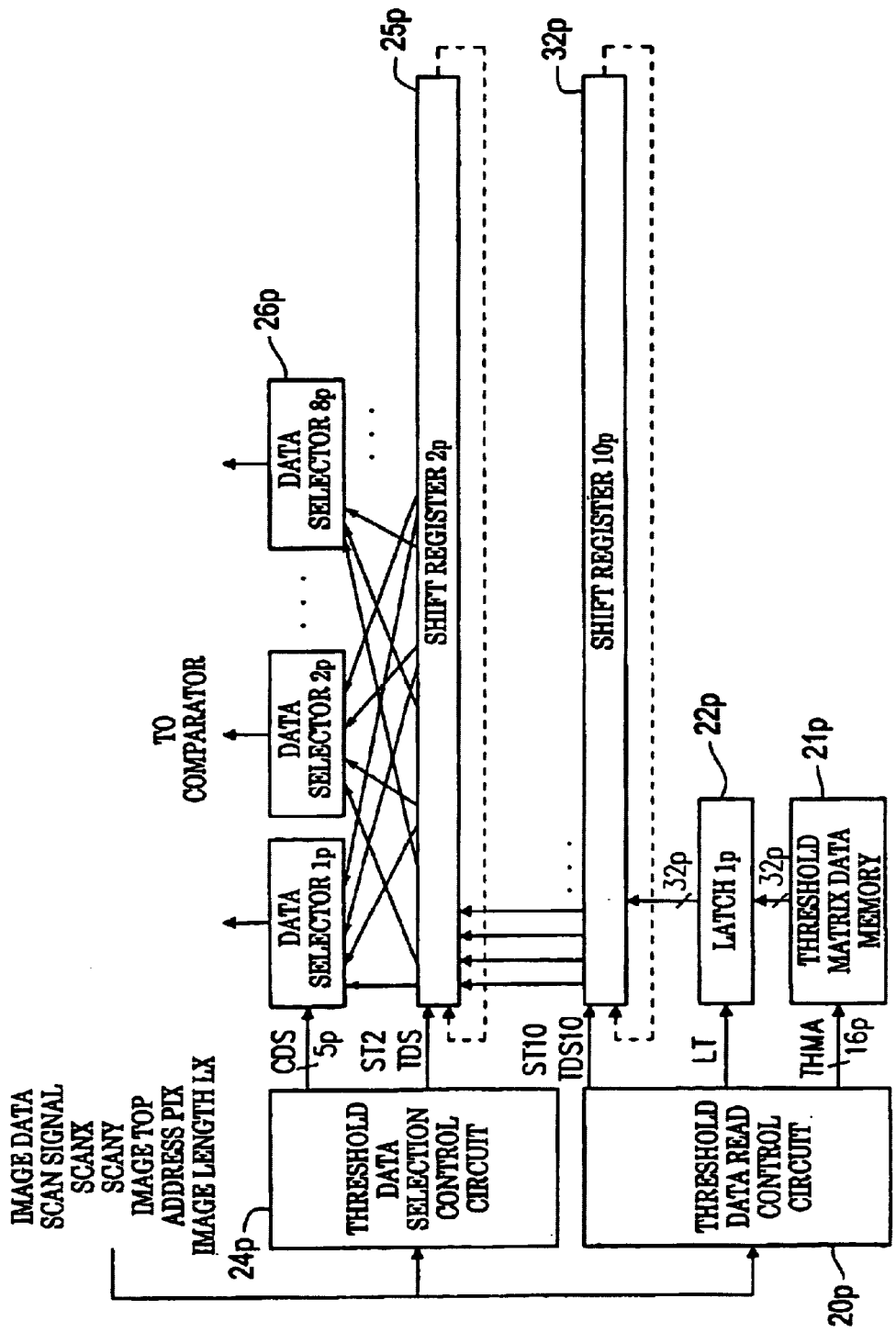
FIG. 9 is a peripheral hardware block diagram of threshold data read means $3p$ in a halftone generation system in a third embodiment of the invention.
Figure 11:
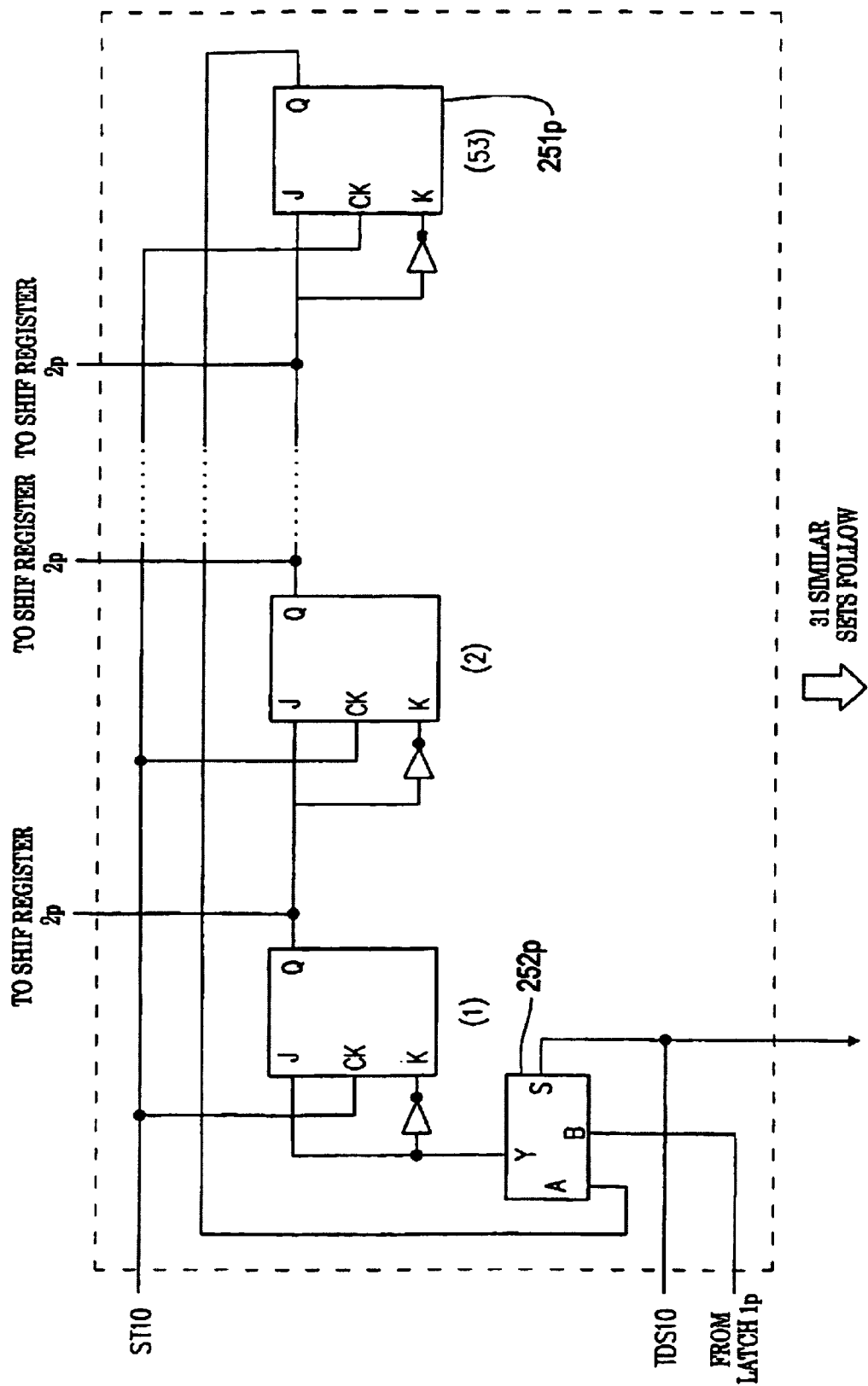
FIG. 11 is a schematic representation of the hardware configuration of a shift register $10p$ in the halftone generation system in the third embodiment of the invention.

FIG. 9 shows the peripheral hardware configuration of the threshold data read means $3p$ in the third embodiment. The third embodiment shown in FIG. 9 differs from the first embodiment previously described with reference to FIG. 3 in that the shift register $1p$, $23p$ in FIG. 3 is changed to a circular shift register $10p$, $32p$. The circular shift register $10p$, $32p$ has a similar configuration to that of the shift register $1p$, $23p$, namely, is made up of a circulating register comprising 53×32 JK flip-flop circuits $251p$ which store all data of one line of a threshold matrix in the embodiment four bytes by four bytes in parallel and are connected circularly, and 32 2 to 1 data selectors $252p$ for controlling input of threshold data from a latch $1p$, $22p$. FIG. 11 shows the configuration of the shift register $10p$, $32p$.

In the configuration, a threshold data read control circuit $20p$ outputs a threshold data address signal THMA for accessing threshold matrix data memory based on image top address PIX and image length LX information of multilevel image data to be converted into a halftone. If the image length LX is smaller than the threshold matrix data size (in the embodiment, 210 or less), output of the threshold data address signal THMA terminates when the threshold data corresponding to the image length LX is read. As in the first embodiment, a latch timing signal LT for retaining threshold data in the latch $1p$, $22p$ is output in response to the timing at which threshold data is output from memory. A shift signal ST10 for shifting data and a threshold data select signal TDS10 are output at the same time as the latched threshold data is read into the shift register $10p$, $32p$. After all threshold data required for converting the painting object into a halftone is set in the shift register $10p$, $32p$, the threshold data read control circuit $20p$ calculates the shift amount of the threshold data from the image top address PIX and memory boundaries applied when binarized data is written into buffer memory $29p$ (in the embodiment, eight-pixel units), and outputs the shift signal ST10 to the shift register $10p$, $32p$. According to the procedure, the start position of the input painting object and the threshold data storage position are matched with each other, then the threshold data is transferred to a shift register $2p$, $25p$ of register means $4p$. After this, as in the first embodiment, the threshold data is output to eight comparator means in order. After the threshold data is transferred to the shift register $2p$, $25p$, the threshold data read control circuit $20p$ reads threshold matrix data based on the image top address PIX and image length LX information of the next scanning line of the painting object.

Therefore, according to the embodiment, also in such a print processing system for performing processing in painting object units, the threshold data read from the threshold matrix can be recycled until the end of the current scanning line and it is made possible to execute read of threshold data for the next scanning line and threshold data output for conversion to a halftone as pipeline processing as in the first embodiment, so that it is made possible to speed up read of threshold data as compared with the conventional technique wherein threshold data is read for each process pixel.

(Fourth Embodiment)

Figure 10:
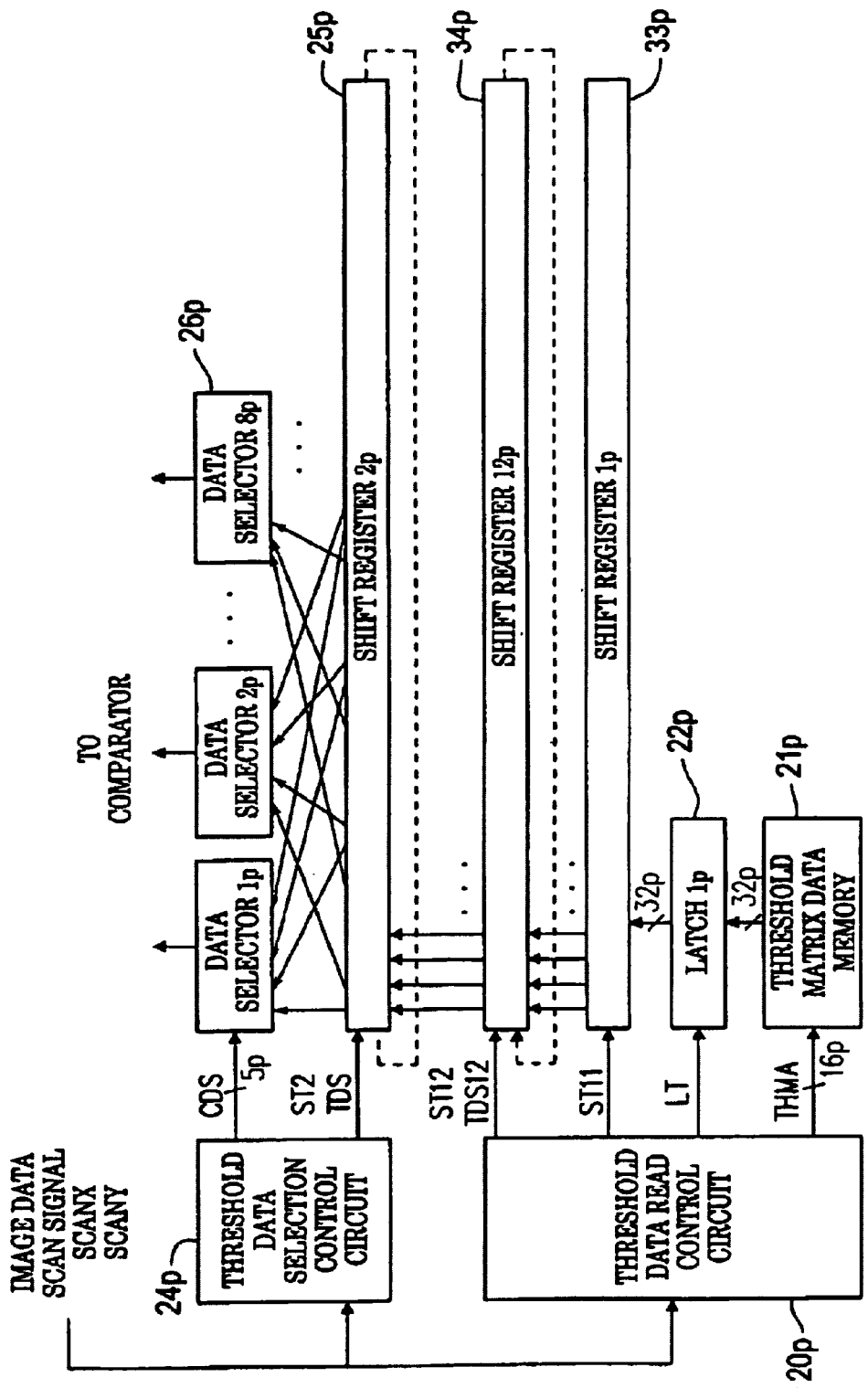
FIG. 10 is a peripheral hardware block diagram of threshold data read means $3p$ in a halftone generation system in a fourth embodiment of the invention.

Next, a fourth embodiment of the invention will be discussed. The fourth embodiment has a configuration wherein the threshold data read means in the hardware configuration of the third embodiment (see FIG. 9) is changed. Basically, it has the basic configuration in FIG. 1 and the configuration of the threshold data read means $3p$ in FIG. 1 differs from that shown in the third embodiment shown in FIG. 9. FIG. 10 shows the peripheral hardware configuration of threshold data read means $3p$ in a halftone generation system of the fourth embodiment. The fourth embodiment shown in FIG. 10 differs from the third embodiment shown in FIG. 9 in that shift registers $11p$, $33p$ and $12p$, $34p$ are provided in place of the shift register $10p$, $32p$ in FIG. 9. The shift registers $11p$, $33p$ and $12p$, $34p$ have the same configurations as the shift registers $1p$, $23p$ and $2p$, $25p$ in the first embodiment.

In the configuration of the fourth embodiment, shift processing for matching the start position of an input painting object with the threshold data storage position can be performed in parallel with data read processing from threshold matrix data memory.

In the embodiment, the threshold data read from the threshold matrix data memory is read into the shift register $11p$, $33p$ and further is read into the shift register $12p$, $34p$. After all threshold data required for converting the painting object into a halftone is set in the shift register $12p$, $34p$, a threshold data read control circuit $20p$ calculates the shift amount of the threshold data from image top address PIX and memory boundaries applied when binarized data is written into buffer memory $29p$ (see FIG. 3) (in the embodiment, eight-pixel units), and outputs a shift signal ST12 to the shift register $12p$, $34p$. According to the procedure, the start position of the input painting object and the threshold data storage position are matched with each other, then the already shifted data is transferred to a shift register $2p$, $25p$. After this, as in the first embodiment, the threshold data is output to eight comparator means in order. While shift processing is executed in the register $12p$, $34p$, the threshold data for the next scanning line is read into the shift register $11p$, $33p$.

In the configuration shown in the description of the third embodiment, threshold data is read, then is shifted so as to match the painting object starting position. However, according to the configuration of the fourth embodiment, read of threshold data and shifting of threshold data can be executed as pipeline processing, so that the delay caused by the threshold data read can be more lessened.

The embodiments of the halftone generation system of the invention have been described. The invention also contains any configurations provided by combining the configurations previously shown in the description of the embodiments, such as a configuration provided by combining the second embodiment previously described with reference to FIG. 4 comprising two stages of the register means 4p in FIG. 1 and the fourth embodiment previously described with reference to FIG. 10 comprising two stages of the registers in the threshold data read means 3p in FIG. 1 and any other combinational configuration. The numbers shown in the above-described embodiments, such as the number of the comparators, the number of the selectors, and the number of the data pieces set in each register, are given by way of example; the halftone generation system and the halftone generation method of the invention can be applied in configurations wherein any desired numbers are adopted.

Figure 12:
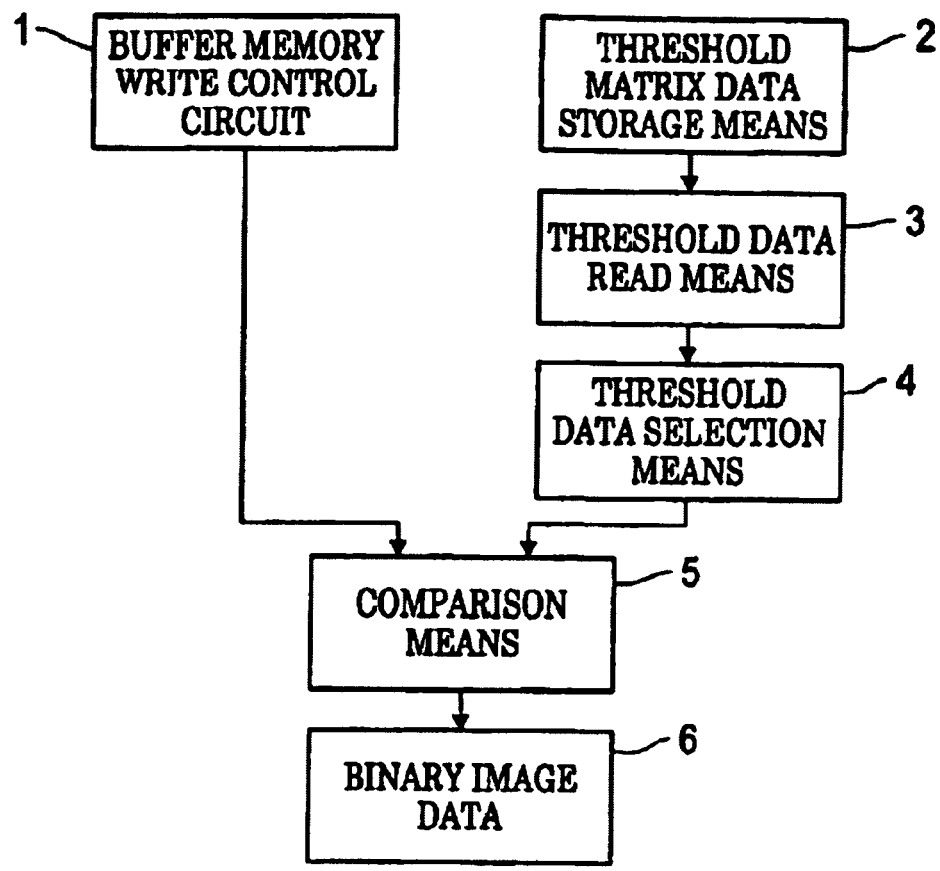
FIG. 12 is a block diagram to show the basic configuration of a halftone generation system of the invention.

FIG. 12 is a block diagram to show the basic configuration of a halftone generation system according to the invention. In the figure, the halftone generation system according to the invention is made up of threshold matrix data storage means 2, threshold data read means 3, threshold data selection means 4, and comparison means S.

The threshold matrix data storage means 2 is memory for storing threshold data used to binarize input multilevel image data 1. The threshold matrix data to which the invention is applied is, for example, matrix data of a large size corresponding to a high-resolution recorder and is data made up of halftone dot cells prepared in, for example, a supercell technique or a multiunit area technique. The supercell technique is described in "Postscript screening" written by Peter Fink, published by Kabushikikaisha MDN Corporation. The multiunit area technique is described in Nippon Insatsu Gakkaishi (1994), Vol. 31, pp 31–39. The word composition in the memory is formed so that threshold data of one line of threshold matrix data (for example in the main scanning direction) can be output by accessing the memory once.

The threshold data read means 3 reads threshold data of one line of the matrix corresponding to the scanning line at the same time from the threshold matrix data storage means 2 by accessing the memory once based on a scan signal of the input multilevel image data 1, and temporarily retains the threshold data, then transfers the threshold data to the threshold data selection means 4. After transferring the threshold data to the threshold data selection means 4, the threshold data read means 3 reads all threshold data of one line of the matrix corresponding to the scanning line of the next input multilevel image data.

The threshold data selection means 4 selectively takes out threshold data to binarize the multilevel image data 1 in the comparison means 5 from the one line of the threshold matrix data corresponding to the scanning line transferred from the threshold data read means 3 in response to the scan position of the multilevel image data 1. For example, consecutive threshold data pieces are placed in one block corresponding to multilevel image data 1 consisting of consecutive pixels and are output to the comparison means 5 in sequence in block units.

The comparison means 5 compares the input multilevel image data 1 consisting of pixels with as many threshold data pieces as the number of the pixels corresponding to the scanning positions in parallel and binarizes the multilevel image data 1. For example, if the multilevel image data is greater than the threshold data, the bit of the pixel is set to 1; if the multilevel image data is equal to or less than the threshold data, the bit of the pixel is set to 0. Binary image data 6 output from the comparison means 5 is stored in buffer memory (not shown) in predetermined processing units, for example, scanning line units, band units, or page units, then is output to an electrophotographic recorder.

(Fifth Embodiment)

Next, a fifth embodiment of the invention will be discussed.

Figure 13:
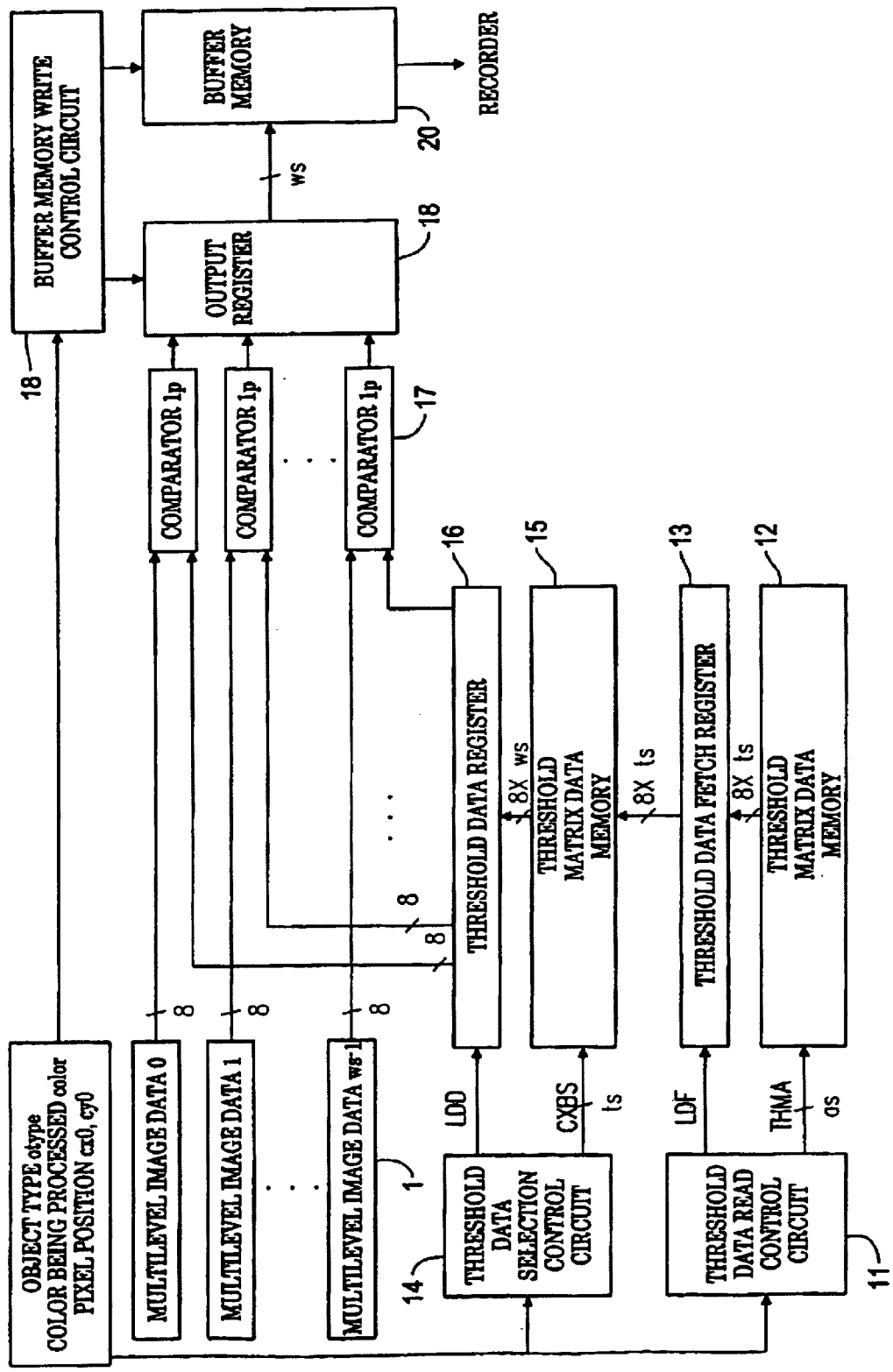
FIG. 13 is a block diagram to show the hardware configuration of a halftone generation system of a fifth embodiment of the invention.

FIG. 13 shows a hardware configuration example of a halftone generation system of the embodiment. The correspondence between the hardware components in FIG. 13 and the components shown in FIG. 12 will be discussed. The threshold matrix data storage means 2 corresponds to threshold matrix data memory 12, the threshold data read means 3 corresponds to a threshold data read control circuit 11 and a threshold data fetch register 13, the threshold data selection means 4 corresponds to a threshold data selection control circuit 14, a crossbar switch circuit 15, and a threshold data register 16, and the comparison means 5 correspond to a plurality of comparators 17 (in FIG. 13, ws comparators) and an output register 18. In addition, the hardware configuration shown in FIG. 12 contains buffer memory 20 for temporarily storing binarized image data and a buffer memory write control circuit 19 although the buffer memory 20 and the buffer memory write control circuit 19 are not directly related to the invention. FIG. 13 assumes that the threshold matrix size is ts×ts, that the address line width of the threshold matrix data memory 12 is as bits, and that the data line width of the buffer memory 20 is ws bits. The hardware components will be discussed.

Figure 14:
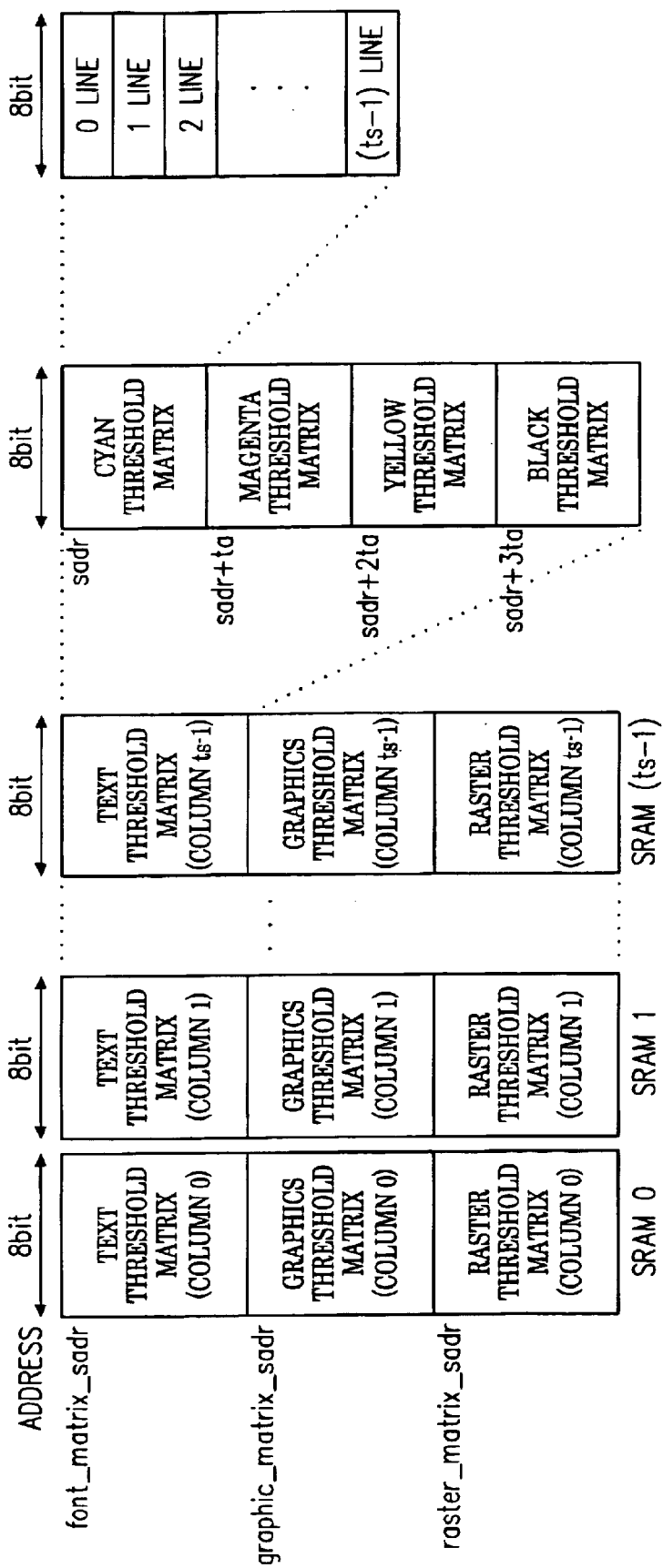
FIG. 14 is a schematic representation to show the memory configuration and how threshold matrix data is stored in the fifth embodiment of the invention.

The threshold matrix data memory 12 stores threshold matrix data prepared according to the multiunit area technique, etc.; in the embodiment, it is made of SRAM. FIG. 14 shows the memory configuration and how threshold matrix data is stored. The embodiment assumes that different threshold matrix data is used for each painting object of text, graphics, and raster and that different threshold matrix data is used for each color of C, M, Y, and K for each painting object. As shown in FIG. 14, in the embodiment, ts×8-bit SRAM devices are placed in parallel and ts threshold data pieces are output at a time at the same addressing. One column of the threshold matrix corresponding to the number given in FIG. 14 is stored in each SRAM device. The threshold matrix data is addressed by a threshold data address signal THMA input from the threshold data read control circuit 11.

The threshold data read control circuit 11 outputs the threshold data address signal THMA for accessing the threshold matrix data memory 12 based on a signal cy0 representing the pixel position of multilevel image data 0 undergoing halftone processing in the subscanning direction thereof, a signal color representing the current color being processed (C, M, Y, or K), and a signal otype representing the type of current painting object being processed (text, graphics, or raster), and outputs a load signal LDF for loading one line of threshold data to the threshold data fetch register 13 in response to the timing at which the threshold data is output from the threshold matrix data memory 12.

Figure 15:
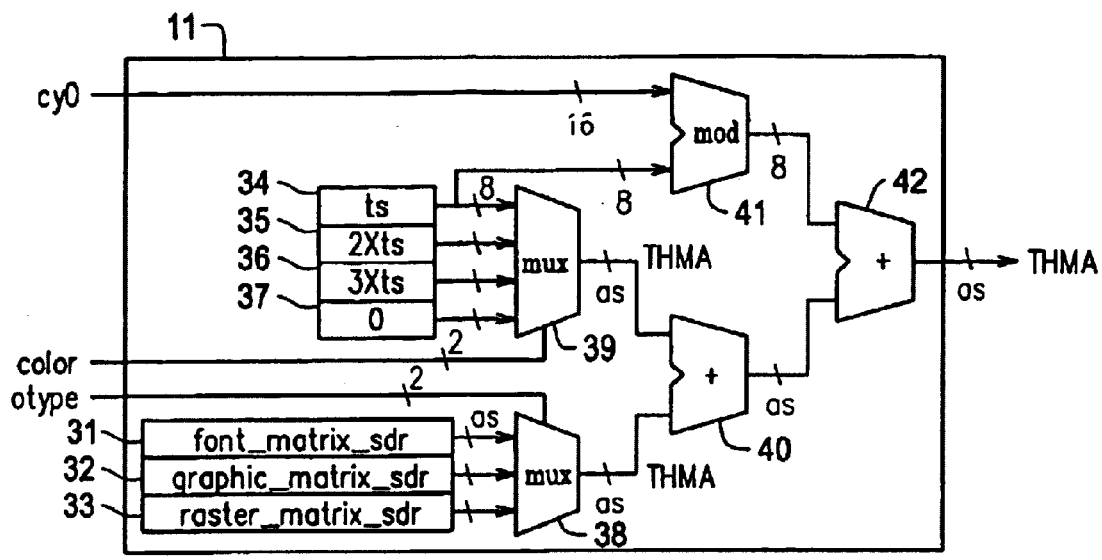
FIG. 15 is a block diagram to show the internal configuration of a threshold data read control circuit 11.
Figure 16:
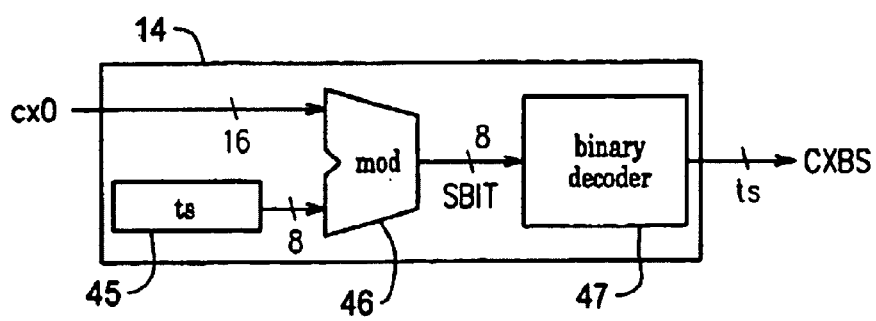
FIG. 16 is a block diagram to show the internal configuration of a threshold data selection control circuit 14.

FIG. 15 shows the data path configuration of the threshold data read control circuit 11 for generating the threshold data address signal THMA. In FIG. 15, the threshold data read control circuit 11 comprises a register 31 for storing the value of the top address font_matrix_sadr of the memory storing a text threshold matrix, a register 32 for storing the value of the top address graphic_matrix_sadr of the memory storing a graphics threshold matrix, a register 33 for storing the value of the top address raster_matrix_sadr of the memory storing a raster threshold matrix, a multiplexer 38 for selecting any of the registers 31 to 33 as SADR in response to the value of otype, a register 34 for storing the value of ts, a register 35 for storing the value of 2×ts, a register 36 for storing the value of 3×ts, a register 37 for storing 0, a multiplexer 39 for selecting any of the registers 34 to 37 as OFFSET in response to the value of color, an adder 40 for performing addition of SARD+OFFSET, a divider 41 for performing operation of cy0modts, and an adder 42 for calculating the sum of output of the adder 40 and output of the divider 41.

In the configuration, the threshold data address signal THMA is calculated as THMA=SADR+OFFSET+cy0modst. SADR corresponds to any of font_matrix_sadr, graphic_matrix_sadr, or raster_matrix_sadr in FIG. 14 or 15. If the input signal otype represents "text," font_matrix_sadr is selected as SADR. If the input signal otype represents "graphics," graphic_matrix_sadr is selected as SADR. If the input signal otype represents "raster," raster_matrix_sadr is selected as SADR. OFFSET corresponds to any of 0, ts, 2×ts, or 3×ts in FIG. 14 or 15. If the input signal color represents "cyan," 0 is selected as OFFSET. If the input signal color represents "magenta," ts is selected as OFFSET. If the input signal color represents "yellow," 2×ts is selected as OFFSET. If the input signal color represents "black," 3×ts is selected as OFFSET. mod denotes a modulo operation.

The threshold data fetch register 13 is a register for temporarily retaining one line of threshold data output from the threshold matrix data memory 12 for processing at the following stage. It is formed of ts D flip-flops, for example. When the load signal LDF input from the threshold data read control circuit 11 is active, the threshold data fetch register 13 reads one line of threshold data at the same time in synchronization with a system clock signal (not shown).

Figure 18:
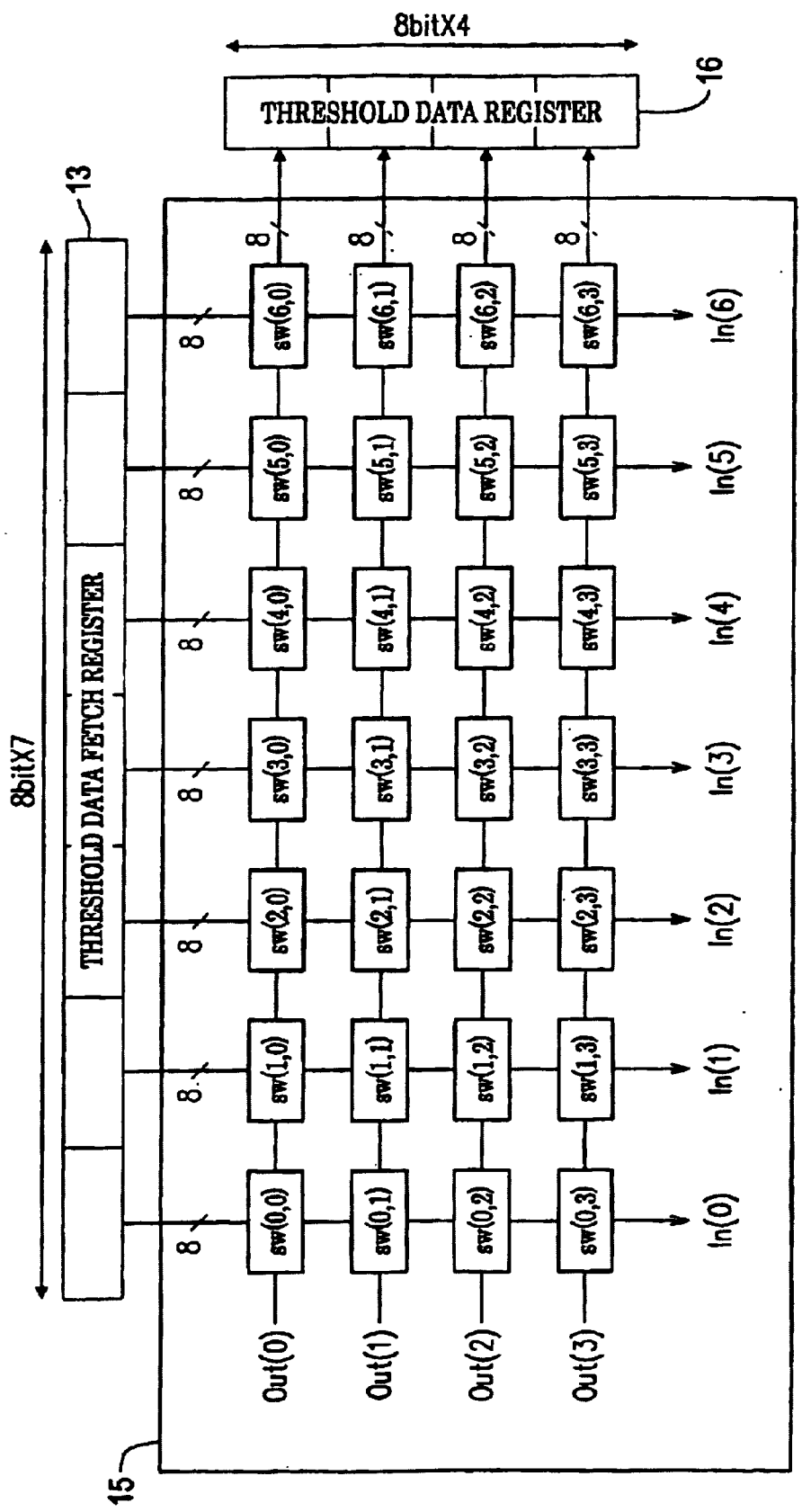
FIG. 18 is a drawing to show the data path configuration of a crossbar switch 15.

The crossbar switch 15 selects ws consecutive threshold data pieces starting at any desired position from among the threshold data pieces retained in the threshold data fetch register 13 and outputs the selected threshold data. FIG. 18 shows the data path configuration of the crossbar switch 15 with seven 8-bit input data lines and four 8-bit output data lines. In the figure, the crossbar switch 15 consists of input data lines in (0) to in (6), output data lines out (0) to out (3), and switches sw (0, 0) to sw (6, 3). From the threshold data fetch register 13, ts (in FIG. 18, seven) threshold data pieces are input to the input data lines (i). The output data lines out (j) output selected ws (in FIG. 18, four) threshold data pieces to the threshold data register 16.

Figure 19:
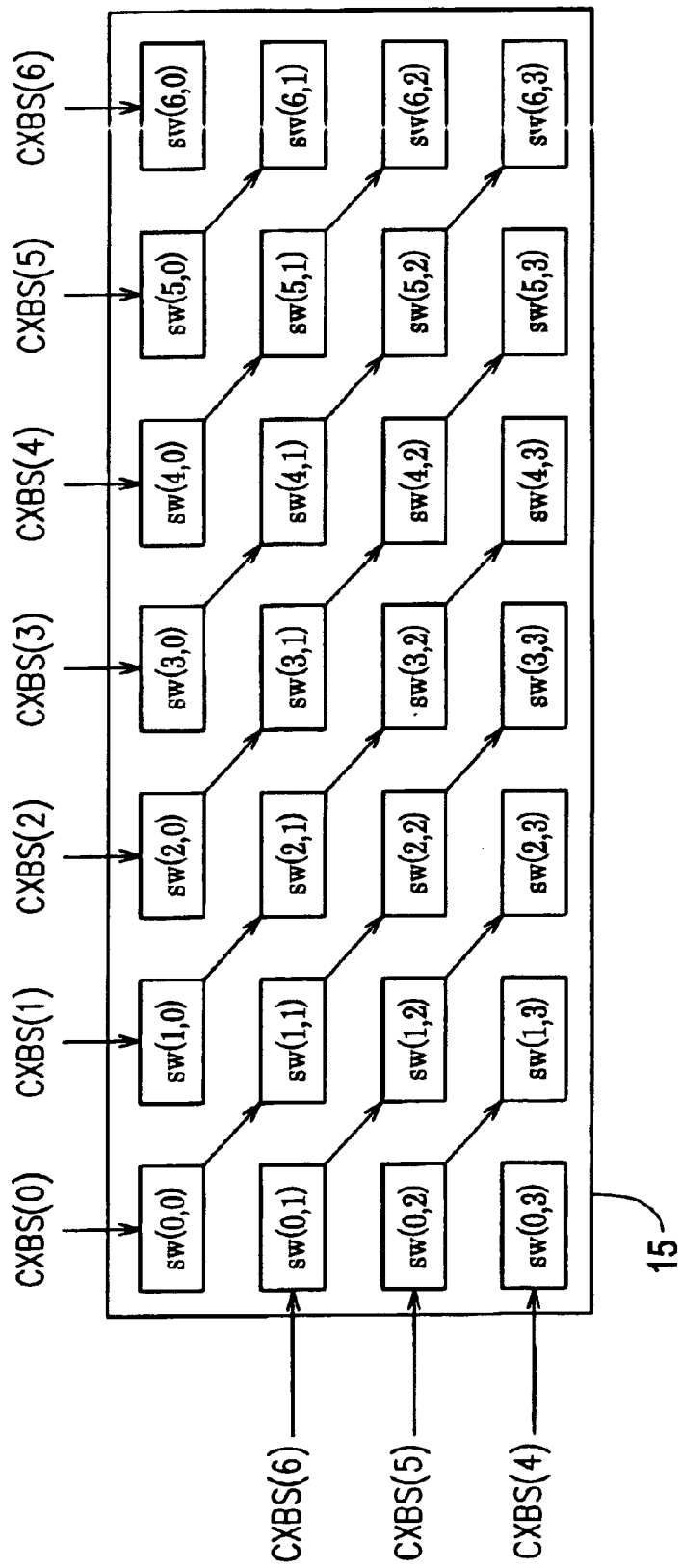
FIG. 19 is a drawing to show the control path configuration of the crossbar switch 15.
Figure 20:
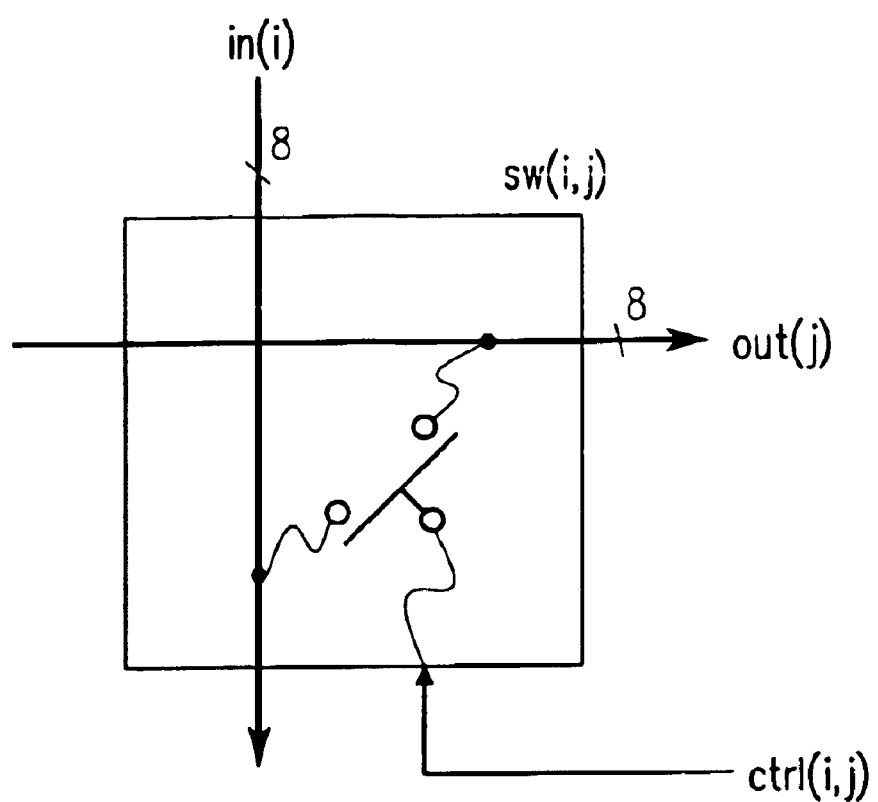
FIG. 20 is a drawing to show the internal configuration of switches sw (i, j)

FIG. 20 shows the internal configuration of the switches sw (i, j). The switch sw (i, j) connects the input data line in (i) and the output data line out (j) in response to a control signal ctrl (i, j). When ctrl (i, j)=1, the input data line in (i) and the output data line out (j) are connected and the contents of the input data line in (i) are output to the output data line out (j). When ctrl (i, j)=0, the input data line in (i) and the output data line out (j) are disconnected. FIG. 19 shows the control path configuration of the crossbar switch 15 in the same input/output configuration as in FIG. 18. A crossbar switch control signal CXBS input from the threshold data selection control circuit 14 is first input to the control signals ctrl (0, 0) to ctrl (6, 0) of sw (0, 0) to sw (6, 0). The value provided by rotating the crossbar switch control signal CXBS right one bit is input to sw (0, 1) to sw (6, 1), as shown in FIG. 19. Likewise, the value provided by further rotating the crossbar switch control signal CXBS right one bit is input to sw (0, 2) to sw (6, 2), . . . That is, if rotating CXBS right j bits is described as RTR (CXBS, j), RTR (CXBS, j) (i) is input to ctrl (i, j).

Figure 21:
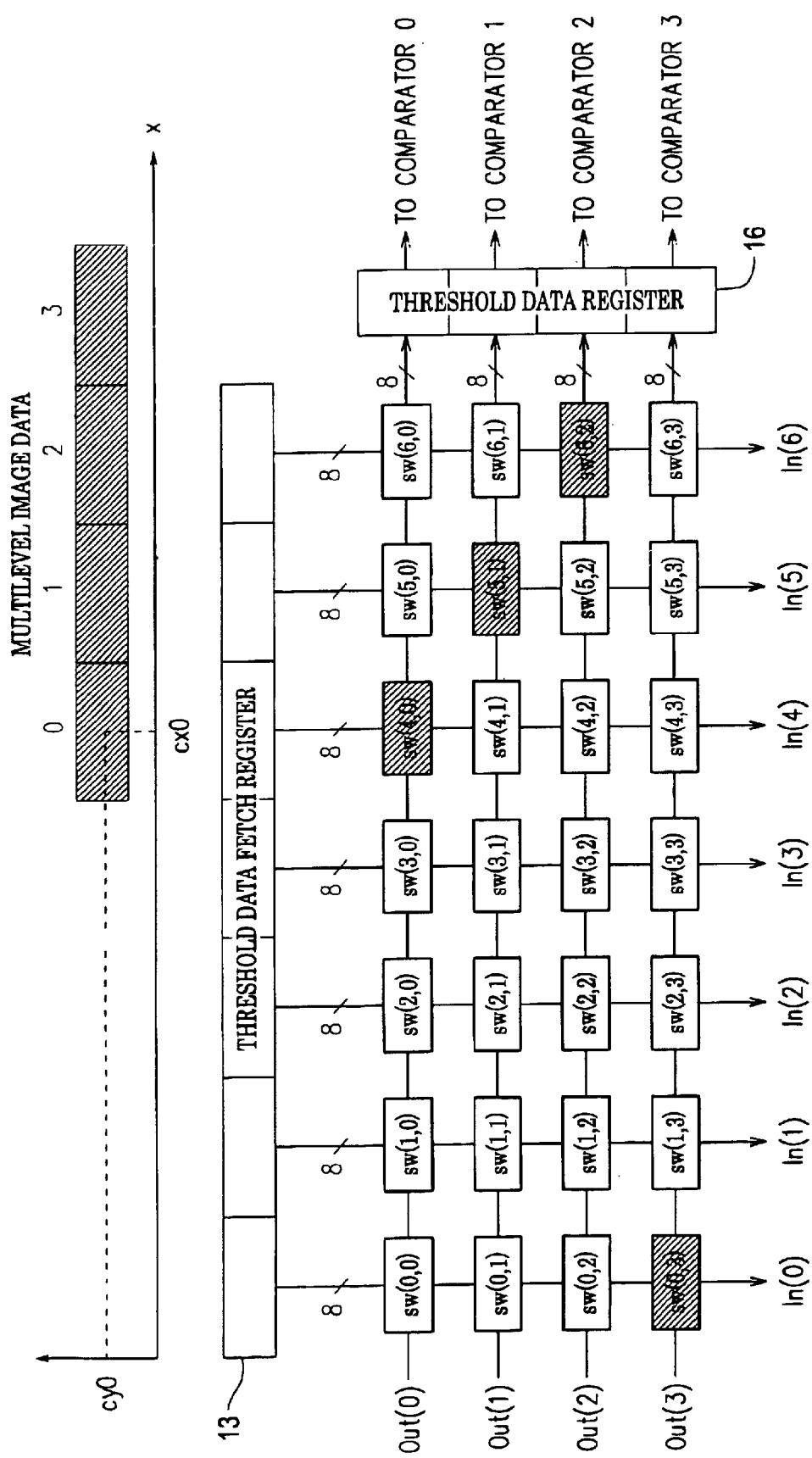
FIG. 21 is a drawing to describe the operation of the crossbar switch 15 when $ts \geq ws$.

Next, the operation of the crossbar switch 15 will be discussed with reference to FIGS. 21 and 22. FIG. 21 is a drawing to describe the operation of the crossbar switch 15 with seven 8-bit input data lines and four 8-bit output data lines. In FIG. 21, assume that multilevel image data pieces 0 to 3 of four pixels consecutive starting at the pixel position (cx0, cy0) are binarized, and that the threshold data corresponding to cx0, of one line of threshold data corresponding to cy0 loaded into the threshold data fetch register 13 is input to the input data line in (4). In this case, 0000100 is input as the crossbar switch control signal CXBS and only the switches sw (4, 0), sw (5, 1), sw (6, 2), and sw (0, 3) hatched in FIG. 21 are connected. That is, the threshold data corresponding to the multilevel image data 0 input to the input data line in (4) is output to the output data line out (0); the threshold data corresponding to the multilevel image data 1 input to the input data line in (5) is output to the output data line out (1); the threshold data corresponding to the multilevel image data 2 input to the input data line in (6) is output to the output data line out (2); and the threshold data corresponding to the multilevel image data 3 input to the input data line in (0) is output to the output data line out (3). The threshold data input to other input data lines in (1), in (2), and in (3) is not used for the binarization processing shown in FIG. 21.

Figure 22:
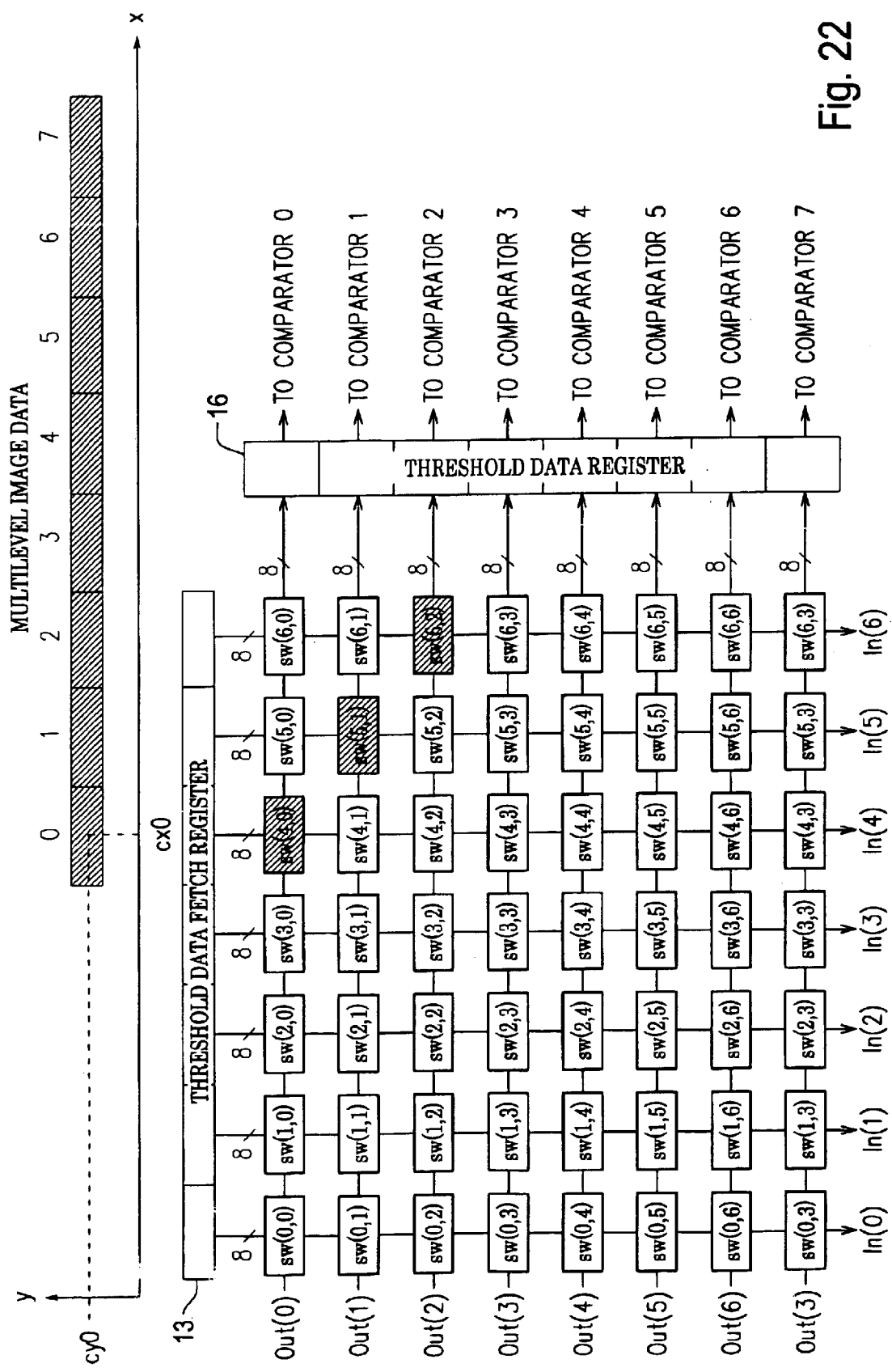
FIG. 22 is a drawing to describe the operation of the crossbar switch 15 when $ts < ws$.

FIG. 22 is a drawing to describe the operation of the crossbar switch 15 with seven 8-bit input data lines and eight 8-bit output data lines. FIG. 22 differs from FIG. 21 in that ts≧ws in FIG. 21; whereas ts<ws in FIG. 22. In FIG. 22, assume that multilevel image data pieces 0 to 7 of eight pixels consecutive starting at the pixel position (cx0, cy0) are binarized, and that the threshold data corresponding to cx0, of one line of threshold data corresponding to cy0 loaded into the threshold data fetch register 13 is input to the input data line in (4). In this case, 0000100 is input as the crossbar switch control signal CXBS and only the switches sw (4, 0), sw (5, 1), sw (6, 2), sw (0, 3), sw (1, 0), sw (2, 1), sw (3, 2), and sw (4, 3) hatched in FIG. 22 are connected. That is, the threshold data corresponding to the multilevel image data 0, 7 input to the input data line in (4) is output to the output data line out (0), out (7); the threshold data corresponding to the multilevel image data 1 input to the input data line in (5) is output to the output data line out (1); the threshold data corresponding to the multilevel image data 2 input to the input data line in (6) is output to the output data line out (2); the threshold data corresponding to the multilevel image data 3 input to the input data line in (0) is output to the output data line out (3); the threshold data corresponding to the multilevel image data 4 input to the input data line in (1) is output to the output data line out (4); the threshold data corresponding to the multilevel image data 5 input to the input data line in (2) is output to the output data line out (5); and the threshold data corresponding to the multilevel image data 6 input to the input data line in (3) is output to the output data line out (6). That is, FIG. 22 (ts<ws) differs from FIG. 21 (ts≧ws) in that one threshold data piece is output to more than one output data line (in FIG. 22, the threshold data input to the input data line in (4) is output to the two output data lines out (0) and out (7)).

The threshold data selection control circuit 14 outputs the crossbar switch control signal CXBS based on the signal cx0 representing the pixel position of multilevel image data 0 undergoing halftone processing in the main scanning direction thereof, and outputs a load signal LDD for loading ws threshold data pieces to the threshold data register 16 in response to the timing at which the ws threshold data pieces selected through the crossbar switch 15 are output. The crossbar switch control signal CXBS is a ts-bit signal; only one of the ts bits corresponding to the output start position of the threshold data is set to 1 and other bits are set to all 0. FIG. 17 shows the data path configuration of the threshold data selection control circuit 14 for generating the crossbar switch control signal CXBS. In the figure, the threshold data selection control circuit 14 comprises a register 45 for storing the value of ts, a divider 41 for performing operation of cx0modts, and a binary decoder 47. FIG. 17 shows a truth table of the binary decoder with 3-bit input and 8-bit output. Although the binary decoder 47 has eight bits of input and ts bits (maximum of 256 bits) of output, FIG. 17 shows the truth table assuming that the binary decoder 47 has three bits of input and eight bits of output for simplifying the representation. As seen in FIG. 17, when the input value is 0 (in FIG. 17, "000"), the binary decoder 47 outputs "1" to the most significant bit of the output line and "0" to all other output bits. If the input value changes from 0 to 1 (001), 2 (010), . . . the bit position of the output line to which "1" is output moves toward the least significant bit one bit at a time as the input value is incremented by one. If the output line consists of a small number of bits, for example, with input of three bits and output of five bits, when the input value is 5 (in FIG. 17, "101") or more, all bits "0" are output.

In the configuration, an internal signal SBIT representing the output start position is calculated as SBIT=cx0modts and the binary decoder 47 sets only the bit CXBS (SBIT) corresponding to the value of SBIT to 1 and all other bits to 0 and outputs the result.

The threshold data register 16 is a register for temporarily retaining ws threshold data pieces output from the crossbar switch 15 for processing at the following stage. It is formed of ws D flip-flops, for example. When the load signal LDD input from the threshold data selection control circuit 14 is active, the threshold data register 16 reads ws threshold data pieces at the same time in synchronization with a system clock signal (not shown).

The comparators 17 are ws 8-bit magnitude comparators. Each 8-bit magnitude comparator compares multilevel image data with threshold data. If the multilevel image data is greater than the threshold data, the 8-bit magnitude comparator outputs 1; if the multilevel image data is equal to or less than the threshold data, the 8-bit magnitude comparator outputs 0 for binarizing the multilevel image data. The image data binarized in the comparators 17 is temporarily retained in the output register 18, then is written into the buffer memory 20 ws bits at a time. Loading of the image data into the output register 18 and writing of the image data into the buffer memory 20 are controlled by the buffer memory write control circuit 19.

The hardware configuration of the embodiment has been described. The logic portion except the threshold matrix data memory 12 or the buffer memory 20 can be easily put into a one-chip LSI using a semicustom ASIC such as a gate array. If a fine semiconductor process of 0.25 $\mu$m or less is used, the whole containing the threshold matrix data memory 12 can be put into a one-chip LSI using a cell-based ASIC or a full-custom ASIC.

Next, the general processing in the hardware configuration descried above will be discussed. First, before binarization of input multilevel image data, the pixel position signal cy0, the color signal color, and the object type otype are read into the threshold data read control circuit 11. The threshold data read control circuit 11 generates and outputs the threshold data address signal THMA as previously described with reference to FIG. 15, reads all threshold data for the scanning line at a time from the threshold matrix data memory 12, and operates the load signal LDF for loading one line of the threshold data read into the threshold data fetch register 13.

When the threshold data is set in the threshold data fetch register 13, the threshold data selection control circuit 14 generates and outputs the crossbar switch control signal CXBS based on the pixel position signal cx0. The crossbar switch 15 selects ws threshold data pieces consecutive starting at the position corresponding to the pixel position c0y in accordance with the crossbar switch control signal CXBS and outputs the selected threshold data pieces. These ws threshold data pieces are loaded into the threshold data register 16 by the load signal LDD under the control of the threshold data selection control circuit 14.

When the threshold data is set in the threshold data register 16, the ws multilevel image data pieces are compared with the ws threshold data pieces in parallel by the comparators 17 and the multilevel image data is binarized. The binarized ws-bit image data is temporarily retained in the output register 18, then is written into the buffer memory 20.

The halftone generation system of the embodiment is configured to perform four processes of reading threshold data from the threshold matrix data memory 12 and loading one line of the threshold data into the threshold data fetch register 13, selecting threshold data through the crossbar switch 15 and loading ws threshold data pieces into the threshold data register 16, binarizing the multilevel image data 1 by the comparators 17 and loading the binarized image data into the output register 18, and writing the binarized image data into the buffer memory 20 as the four-stage pipeline operation. That is, if one line of threshold matrix data is loaded into the threshold data fetch register 13, for example, the threshold data read control circuit 11 starts threshold data read processing for the next multilevel image data without waiting for the termination of the three stages following the stage. This also applies to other three stages.

The processing is repeated for all input multilevel image data, thereby executing conversion of all multilevel image data into halftone.

The embodiment assumes that the input multilevel image data consisting of pixels is consecutive pixels on the same scanning line. However, the scope of the invention is not limited to it. Multilevel image data consisting of pixels at intermittent positions on the same scanning line can also be handled by changing the threshold data selection control circuit 14 and the crossbar switch 15 as follows: All pixel positions cx0 to cx(ws-1) in the main scanning line direction of ws input multilevel image data pieces are input to the threshold data selection control circuit 14 and all switch control signals ctrl (i, j) of the crossbar switch 15 are separately generated and output based on the pixel position signals, whereby it is made possible to sort and output ts input threshold data pieces in any desired order in the crossbar switch 15 and the threshold data correctly corresponding to multilevel image data pieces consisting of pixels at intermittent positions on the same scanning line can be supplied.

(Sixth Embodiment)

Figure 24:
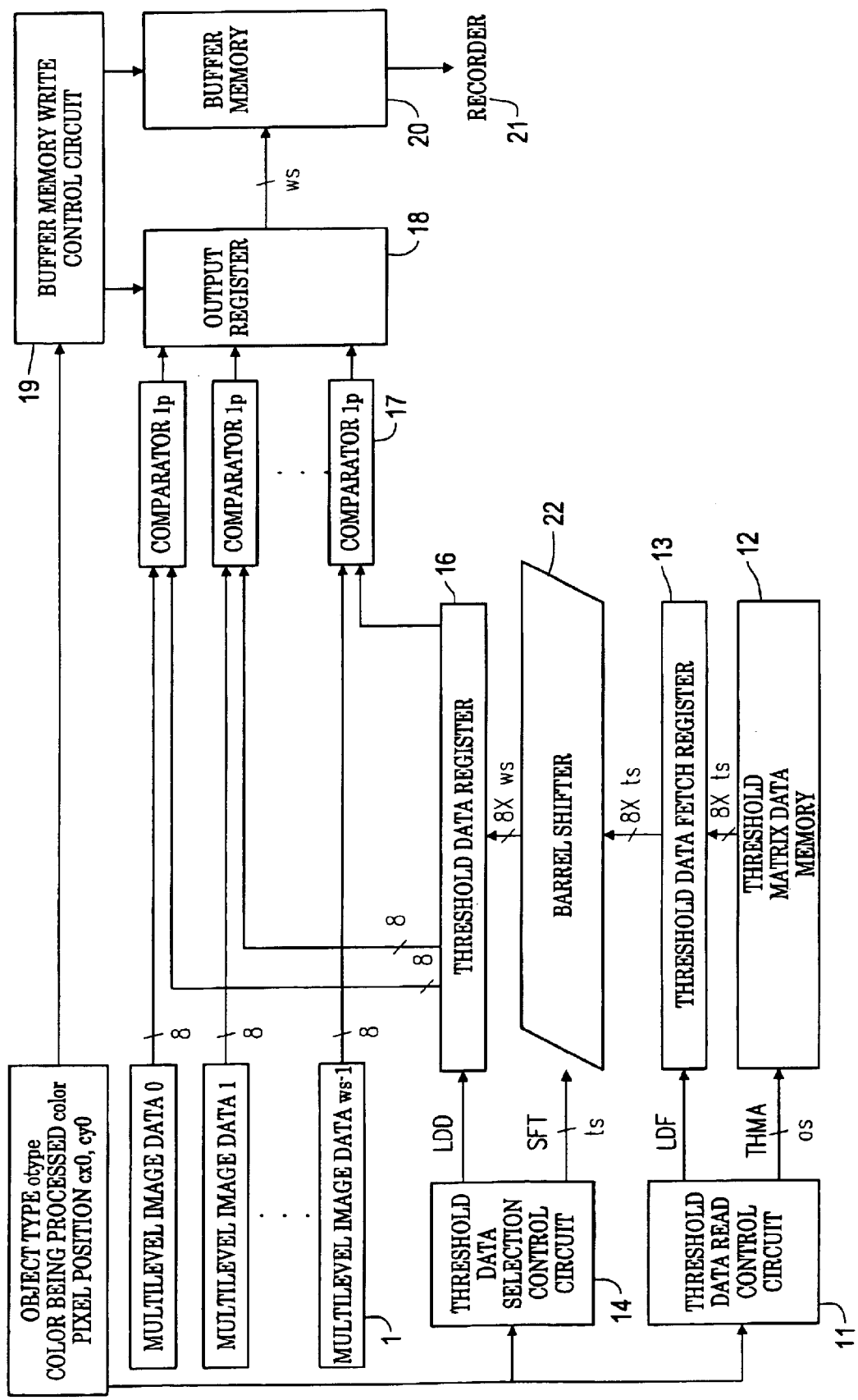
FIG. 24 is a block diagram to show a hardware configuration example of a halftone generation system of a sixth embodiment of the invention.

Next, a sixth embodiment of the invention will be discussed. The sixth embodiment differs from the fifth embodiment in hardware configuration of the threshold data selection means 4 previously described with reference to FIG. 12. FIG. 24 shows the hardware configuration of a halftone generation system of the sixth embodiment. In FIG. 24, the threshold data selection means 4 corresponds to a threshold data selection control circuit 14, a barrel shifter circuit 22, and a threshold data register 16, and other circuits are similar to those in the fifth embodiment previously described with reference to FIG. 13. The threshold data selection control circuit 14 having a different configuration from that in the fifth embodiment and the barrel shifter circuit 22 will be discussed.

Figure 25:
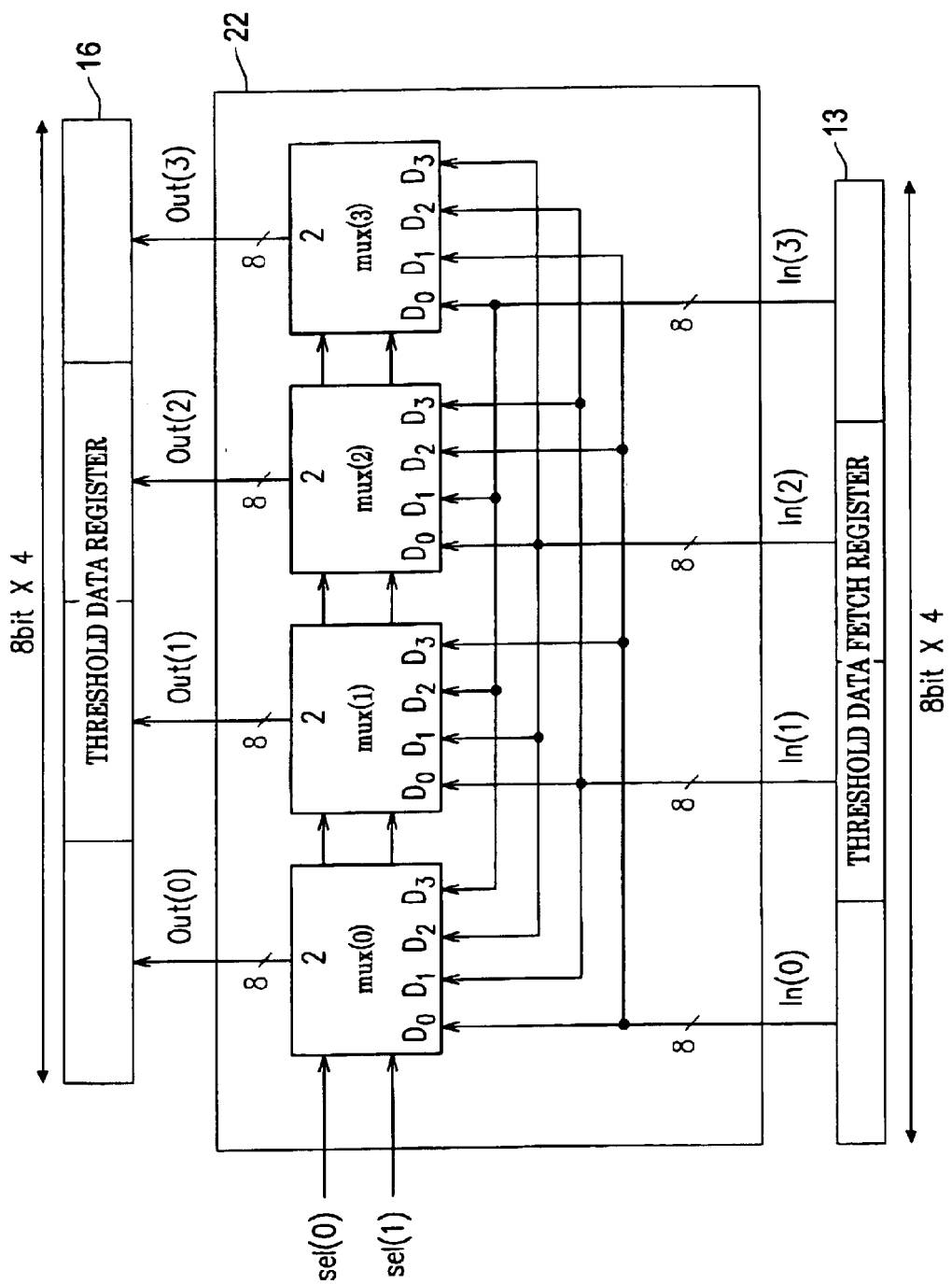
FIG. 25 is a drawing to show the data path configuration of a barrel shifter circuit 22 in the sixth embodiment of the invention.

The barrel shifter circuit 22 selects ws threshold data pieces consecutive starting at any desired position from among the threshold data pieces retained in a threshold data fetch register 13 and outputs the selected threshold data. FIG. 25 shows the circuit configuration of the barrel shifter for inputting four threshold data pieces and shifting the input data left a maximum of three data pieces. In the figure, the barrel shifter is made up of input data lines in (0) to in (3), output data lines out (0) to out (3), 4-input, 1-output multiplexer circuits mux (0) to mux (3), and barrel shifter control signal lines sel (0) and sel (1) for selecting the output signal of each multiplexer circuit in response to the shift amount. Each input data line in (i) consists of eight bits, each output data line out (i) consists of eight bits, and each barrel shifter control signal line sel (i) is one bit. Each multiplexer circuit mux (i) selectively outputs the value input to D (0) to D (3) in response to the value of the barrel shifter control signal lines sel (0) and sel (1). For example, if sel (1) sel (0)=00, each multiplexer circuit mux (i) outputs the value input to D (0). Therefore, in this case, the input data is not shifted and is output intact. If sel (1) sel (0)=01, each multiplexer circuit mux (i) outputs the value input to D (1). Resultantly, the value provided by shifting the input data left one piece is output. Likewise, it sel (1) sel (0)=10, the value provided by shifting the input data left two pieces is output and if sel (1) sel (0)=11, the value provided by shifting the input data left three pieces is output. A barrel shifter control circuit SFT output from the threshold data selection control circuit 14 is input to the control signal lines sel (0) and sel (1).

Figure 26:
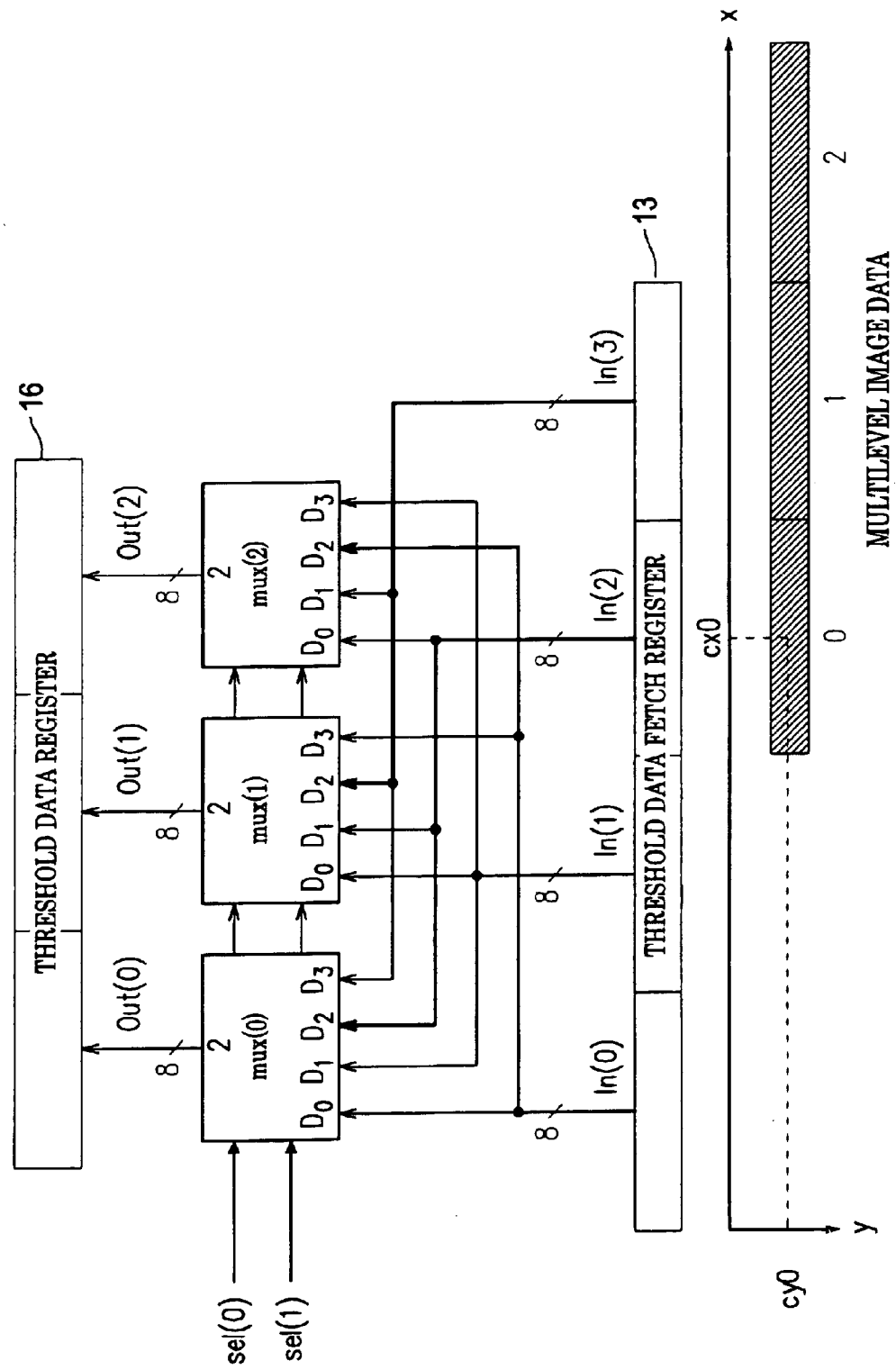
FIG. 26 is a drawing to describe the operation of a barrel shifter circuit 22 when ts≧ws.

Next, the operation of the barrel shifter circuit 22 for selecting ws threshold data pieces consecutive starting at any desired position from among ts threshold data pieces retained in the threshold data fetch register 13 and outputting the selected threshold data will be discussed with reference to FIGS. 26 and 26. FIG. 25 is a drawing to describe the operation of the barrel shifter circuit 22 with four 8-bit input data lines and three 8-bit output data lines, namely, when ts≧ws. In FIG. 26, assume that multilevel image data pieces 0 to 2 of three pixels consecutive starting at the pixel position (cx0, cy0) are binarized, and that the threshold data corresponding to cx0, of one line of threshold data corresponding to cy0 loaded into the threshold data fetch register 13 is input to the input data line in (2). In this case, sel (1) sel (0)=10 is input as the barrel shifter control signal and the value input to D (2) of each multiplexer circuit mux (i) is output, namely, the input data is shifted left two pieces, the threshold data corresponding to multilevel image data 0 input to the input data line in (2) is output to the output data line out (0), the threshold data corresponding to multilevel image data 1 input to the input data line in (3) is output to the output data line out (1), and the threshold data corresponding to multilevel image data 2 input to the input data line in (0) is output to the output data line out (2). The threshold data input to the input data line in (1) is not used for the binarization processing shown in FIG. 26.

Figure 27:
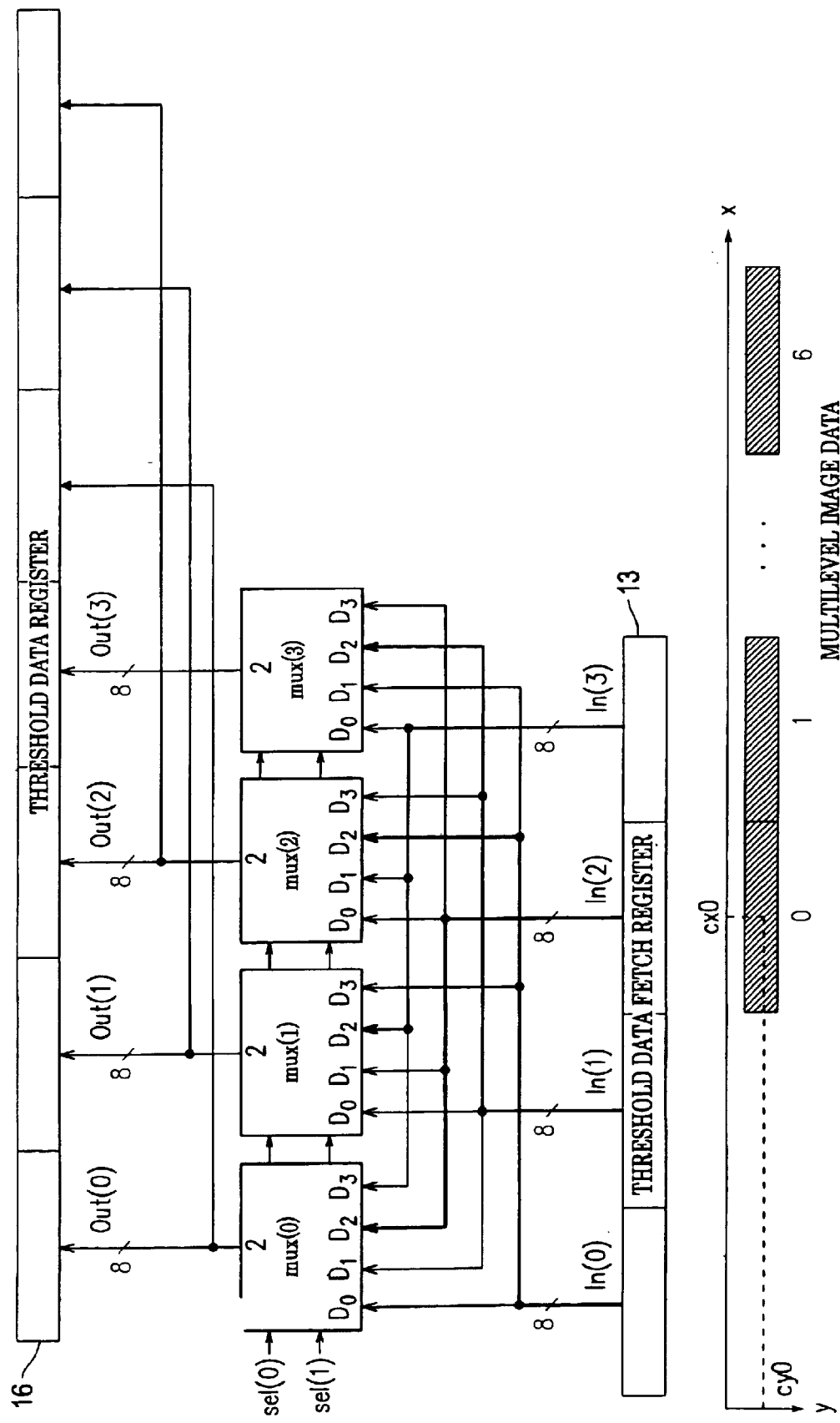
FIG. 27 is a drawing to describe the operation of the barrel shifter circuit 22 when ts<ws.

FIG. 27 is a drawing to describe the operation of the barrel shifter circuit 22 with four 8-bit input data lines and seven B-bit output data lines, namely, when ts<ws. In FIG. 27, assume that multilevel image data pieces 0 to 6 of seven pixels consecutive starting at the pixel position (cx0, cy0) are binarized, and that the threshold data corresponding to cx0, of one line of threshold data corresponding to cy0 loaded into the threshold data fetch register 13 is input to the input data line in (2). In this case, sel (1) sel (0)=10 is input as the barrel shifter control signal and the value input to D (2) of each multiplexer circuit mux (i) is output, namely, the input data is shifted left two pieces, the threshold data corresponding to multilevel image data 0, 4 input to the input data line in (2) is output to the output data line out (0), out (4), the threshold data corresponding to multilevel image data 1, 5 input to the input data line in (3) is output to the output data line out (1), out (5), the threshold data corresponding to multilevel image data 2, 6 input to the input data line in (0) is output to the output data line out (2), out (6), and the threshold data corresponding to multilevel image data 3 input to the input data line in (1) is output to the output data line out (3). As in the description of the fifth embodiment with FIG. 22, FIG. 27 (ts<ws) differs from FIG. 26 (ts≧ws) in that one threshold data piece is output to more than one output data line (in FIG. 27, the threshold data input to the input data line in (2), in (3), or in (4) is output to the two output data lines).

Figure 28:
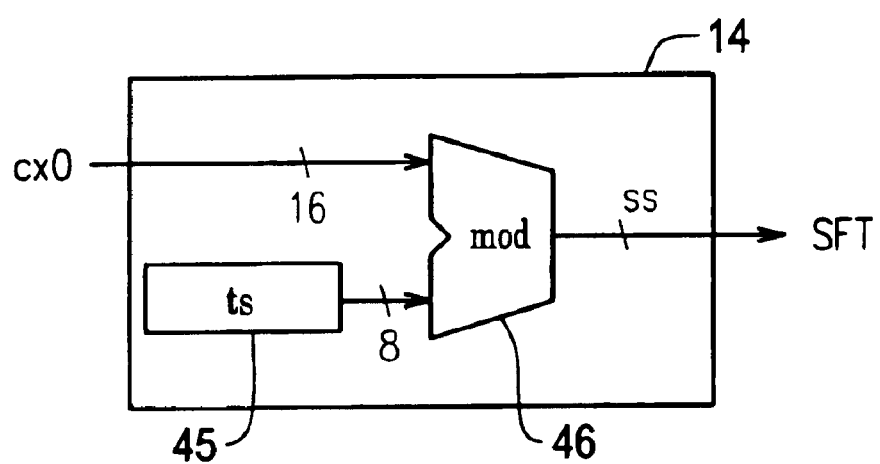
FIG. 28 is a block diagram to show the internal configuration of a threshold data selection control circuit 14 in the sixth embodiment of the invention.

The threshold data selection control circuit 14 outputs the barrel shifter control signal SFT based on the signal cx0 representing the pixel position of multilevel image data 0 undergoing halftone processing in the main scanning direction thereof, and outputs a load signal LDD for loading ws threshold data pieces to the threshold data register 16 in response to the timing at which the ws threshold data pieces selected through the barrel shifter circuit 22 are output. The barrel shifter control signal SFT is an ss-bit signal (ss=log2ts (digits to the right of the decimal point are rounded to the unit's place)) for controlling the operation of shifting input data left a maximum of ts−1 pieces. FIG. 28 shows the data path configuration of the threshold data selection control circuit 14 for generating the barrel shifter control signal SFT. In the figure, the threshold data selection control circuit 14 comprises a register 45 for storing the value of ts and a divider 46 for performing operation of cx0modts. The significant bit width ss of the remainder (modulo) output from the divider 46 is ss≦8 in FIG. 28. In the configuration, the remainder calculated by the divider 46 is output as the barrel shifter control signal SFT.

The different portion of the hardware configuration of the sixth embodiment from that of the fifth embodiment has been described. The general processing in the hardware configuration of the sixth embodiment differs from that in the hardware configuration of the fifth embodiment only in processing between setting threshold data in the threshold data fetch register 13 and setting threshold data in the threshold data register 16. Processing of the different portion will be discussed.

When threshold data is set in the threshold data fetch register 13, the threshold data selection control circuit 14 generates the barrel shifter control signal SFT based on the pixel position signal cx0 and outputs the signal. The barrel shifter circuit 22 shifts the threshold data left as many data pieces as the number corresponding to the barrel shifter control signal SFT and outputs ws threshold data pieces, which then are loaded into the threshold data register 16 by the load signal LDD under the control of the threshold data selection control circuit 14.

The halftone generation system according to the embodiment also executes threshold data selection and load processing of ws threshold data pieces into the threshold data register 16 by the barrel shifter circuit 22 as one stage of the pipeline operation and thus is configured so as to operate in 4-stage pipeline processing as a whole as in the fifth embodiment.

(Seventh Embodiment)

Figure 23:
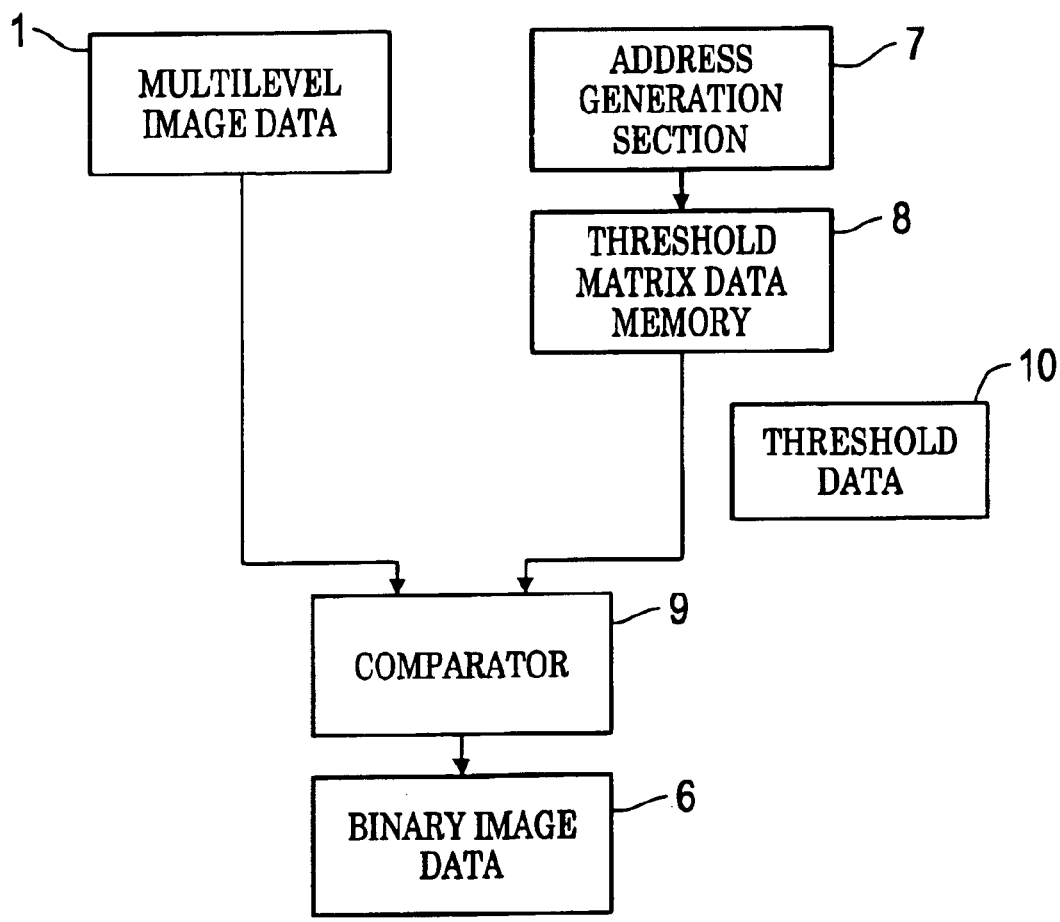
FIG. 23 is a block diagram of hardware for executing representative halftone generation processing in a related art.
Figure 29:
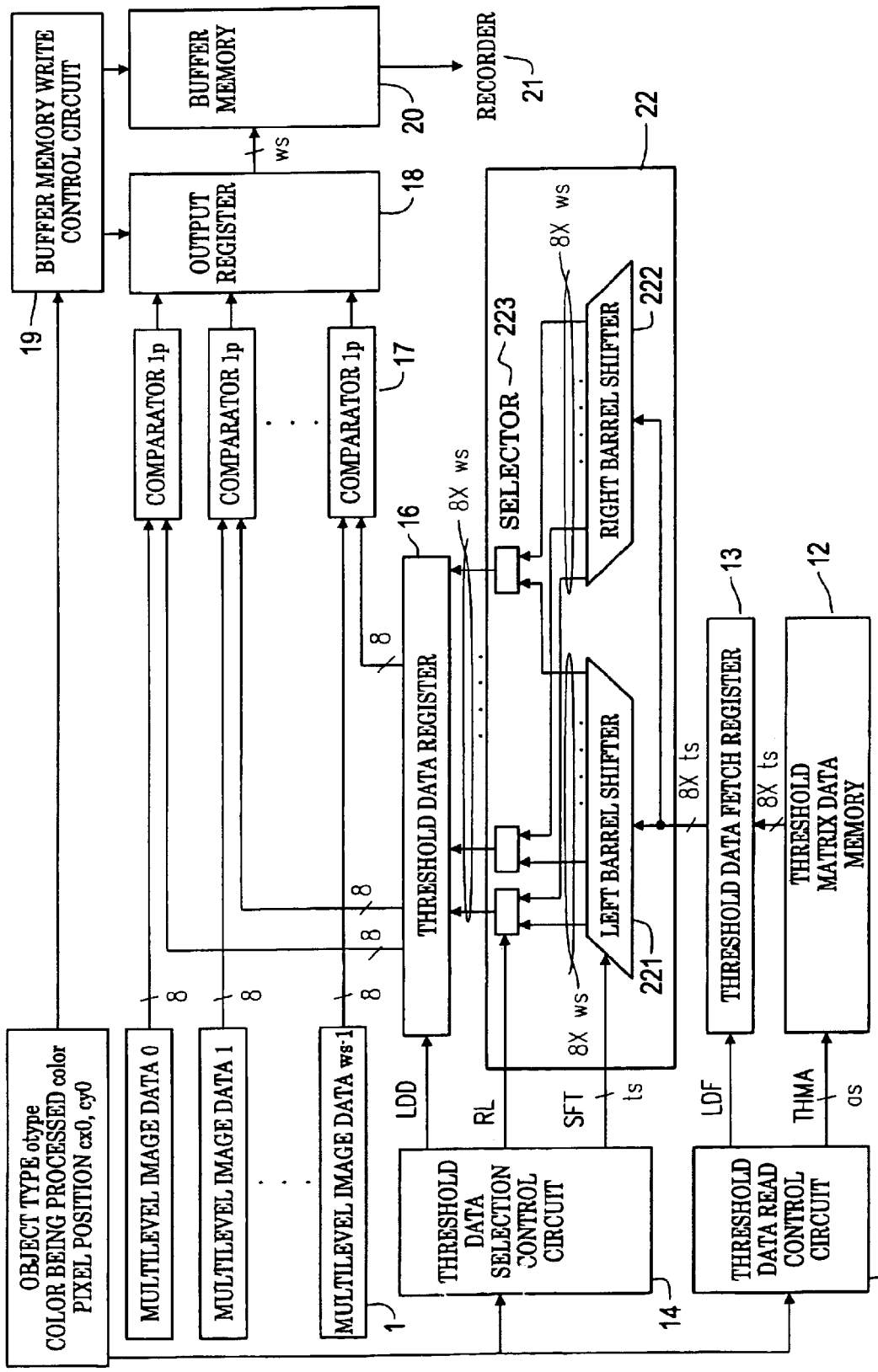
FIG. 29 is a block diagram to show a hardware configuration example of a halftone generation system of a seventh embodiment of the invention.
Figure 30:
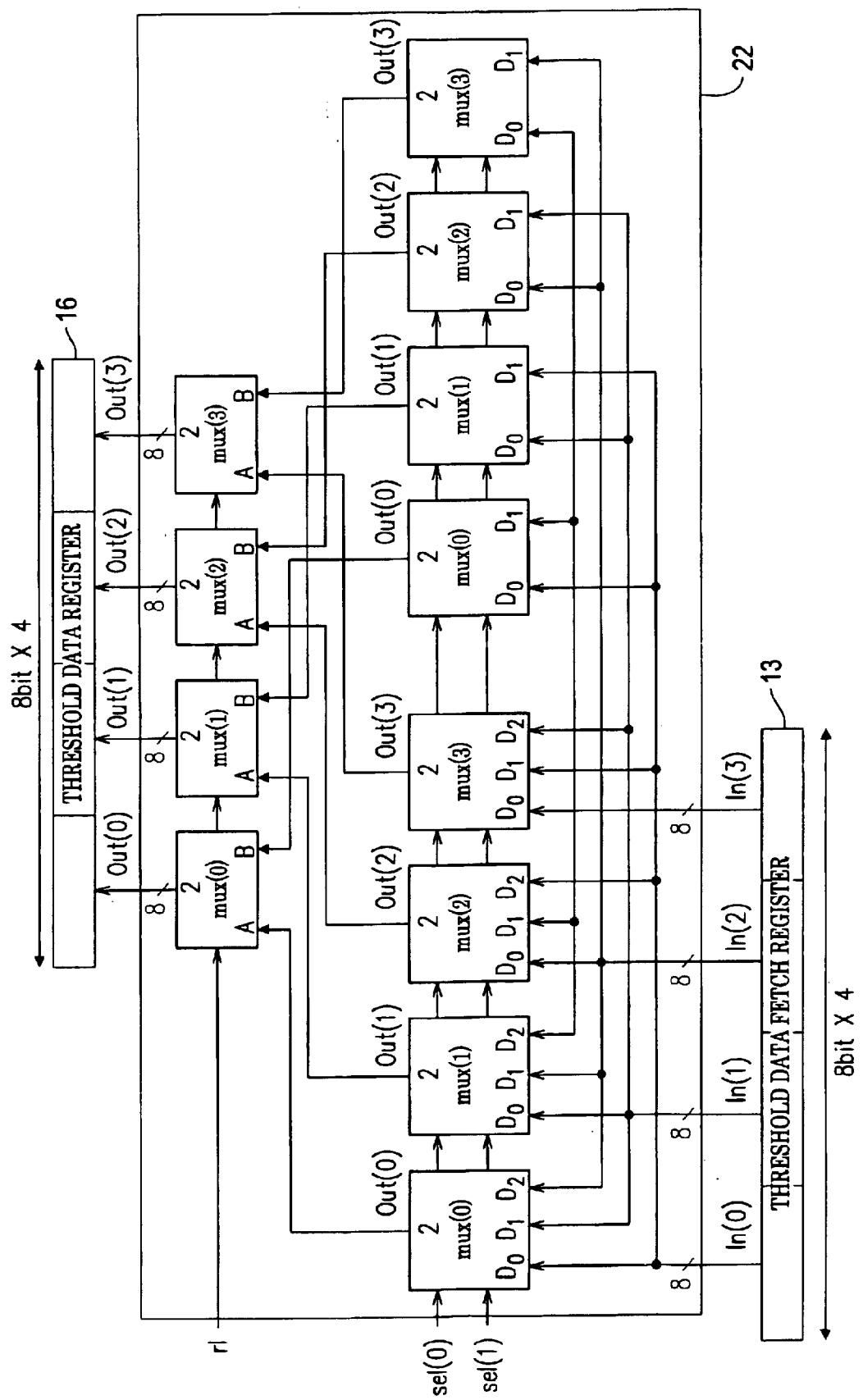
FIG. 30 is a drawing to show the data path configuration of a barrel shifter circuit 22 in the seventh embodiment of the invention.

Next, a seventh embodiment of the invention will be discussed. The seventh embodiment differs from the sixth embodiment (FIG. 23) in hardware configuration, namely, threshold data selection control circuit 14 and barrel shifter circuit 22. FIG. 29 shows the hardware configuration of a barrel shifter circuit 22 in the sixth embodiment. In FIG. 29, the barrel shifter circuit 22 is made up of a barrel shifter 221 for shifting data left a maximum of ts/2 data pieces (when ts is even) or (ts−1)/2 data pieces (when ts is odd), a barrel shifter 222 for shifting data right a maximum of ts/2−1 data pieces (when ts is even) or (ts−1)/2 data pieces (when ts is odd), and a selector 223 for selecting the output value of either the left barrel shifter 221 or the right barrel shifter 222. Of course, the maximum shift count when ts is even may be changed left and right. FIG. 30 shows the circuit configuration of the barrel shifter for shifting data left a maximum of two data pieces and the barrel shifter for shifting data right a maximum of one data piece when four data pieces are input. In the figure, the left barrel shifter is made up of input data lines in (0) to in (3), output data lines outl (0) to outl (3), 3-input, 1-output multiplexer circuits muxl (0) to muxl (3), and barrel shifter control signal lines sel (0) and sel (1) for selecting the output signal of each multiplexer circuit in response to the shift amount, the right barrel shifter is made up of input data lines in (0) to in (3), output data lines outr (0) to outr (3), 2-input, 1-output multiplexer circuits muxr (0) to muxr (3), and barrel shifter control signal lines sel (0) and sel (1) for selecting the output signal of each multiplexer circuit in response to the shift amount, and the selector is made up of output data lines out (r1) (0) to out (r1) (3), selective output data lines out (0) to but (3), 2-input, 1-output multiplexer circuits mux (0) to mux (3), and an output selection signal line r1 for selecting output from either of the two barrel shifters depending on whether data is to be shifted left or right. Each input data line in (i) consists of eight bits, each output data line out (r1) (i) consists of eight bits, each barrel shifter control signal line sel (i) is one bit, and the output selection signal line r1 is one bit. Each multiplexer circuit muxl (i) selectively outputs the value input to D (0) to D (2) in response to the value of the barrel shifter control signal lines sel (0) and sel (1), and each multiplexer circuit muxr (i) selectively outputs the value input to D (0) and D (1) in response to the value of the barrel shifter control signal lines sel (0) and sel (1) and selectively outputs the output result of the barrel shifter corresponding to the shift direction. For example, to shift data left one piece, sel (1) sel (0)=01 and r1=0 are input to the barrel shifter and the selector respectively. According to sel (1) sel (0)=01, the value input to D (1) is output from the multiplexer circuit mux (r1) (i) in each barrel shifter. Resultantly, the value provided by shifting the input data left one piece is output from the left barrel shifter and the value provided by shifting the input data right one piece is output from the right barrel shifter. Further, as r1=0 is input to the selector, the output data of the left barrel shifter is selected and finally the output data provided by shifting the input data left one piece is obtained. Likewise, when sel (1) sel (0)=10 and r1=0 are input, the value provided by shifting the input data left two pieces is output and when sel (1) sel (0)=01 and r1=1 are input, the value provided by shifting the input data right one piece (the same as the value provided by shifting the input data left three pieces) is output.

Figure 31:
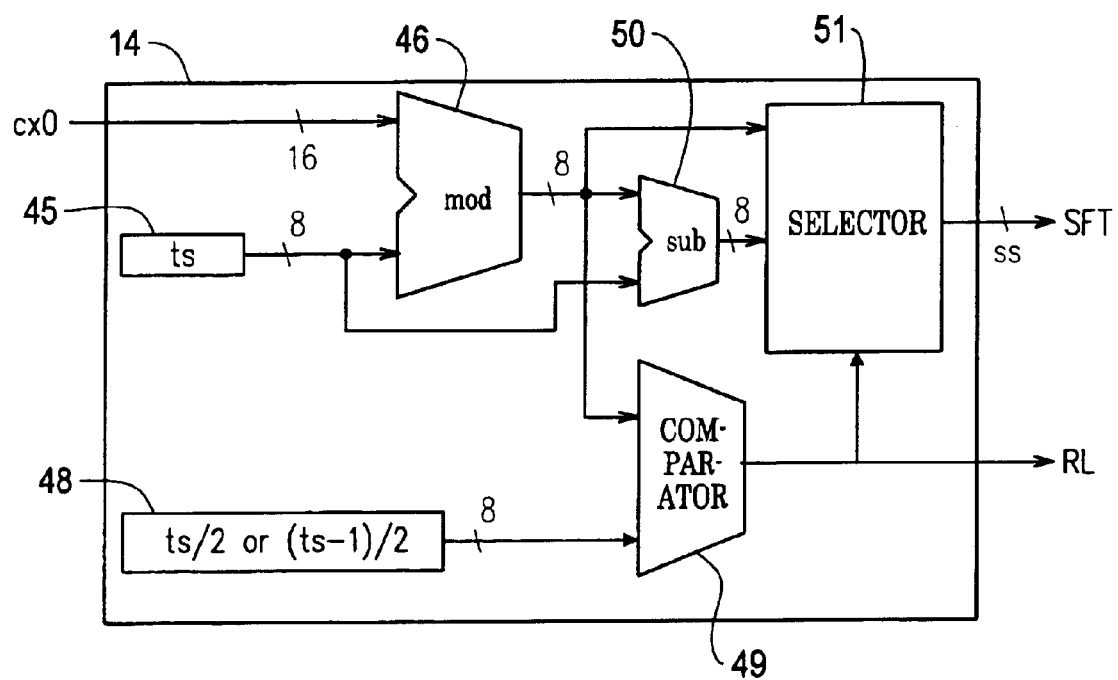
FIG. 31 is a block diagram to show the internal configuration of a threshold data selection control circuit 14 in the seventh embodiment of the invention.

Next, the data path configuration of the threshold data selection control circuit 14 for generating a barrel shifter control signal SFT and an output selection signal RL will be discussed with reference to FIG. 31. In the figure, the threshold data selection control circuit 14 comprises a register 45 for storing the value of ts, a divider 46 for performing operation of cx0modts, a register 48 for storing the value of ts/2 (when ts is even) or the value of (ts−1)/2 (when ts is odd), a comparator 49 for comparing the remainder output from the divider 46 with the value stored in the register 48 with respect to the greater-than, or less-than relationship, therebetween, a subtracter 50 for subtracting the remainder output from the divider 46 from the value stored in the register 48, and a selector 51 for selectively outputting the remainder output from the divider 46 or the subtraction result of the subtracter 50 in response to the output of the compactor 49. The significant bit width ss of the remainder or the subtraction result output from the selector 51 is ss≦8 in FIG. 31. In the configuration, the output result of the comparator 49 is output as the output selection signal RL and the remainder or the complement of the remainder output from the selector 51 is output as the barrel shifter control signal SFT.

The hardware configuration of the embodiment has been described. According to the configuration of the embodiment, the left and right barrel shifters are provided, whereby the shift count of data in each barrel shifter is reduced to a half or less as compared with a one-way barrel shifter and the delay time caused by the shift processing can be shortened. Therefore, the halftone generation system can be operated as pipeline processing at higher speed as compared with the halftone generation system of the sixth embodiment.

(Eighth Embodiment)

Figure 32:
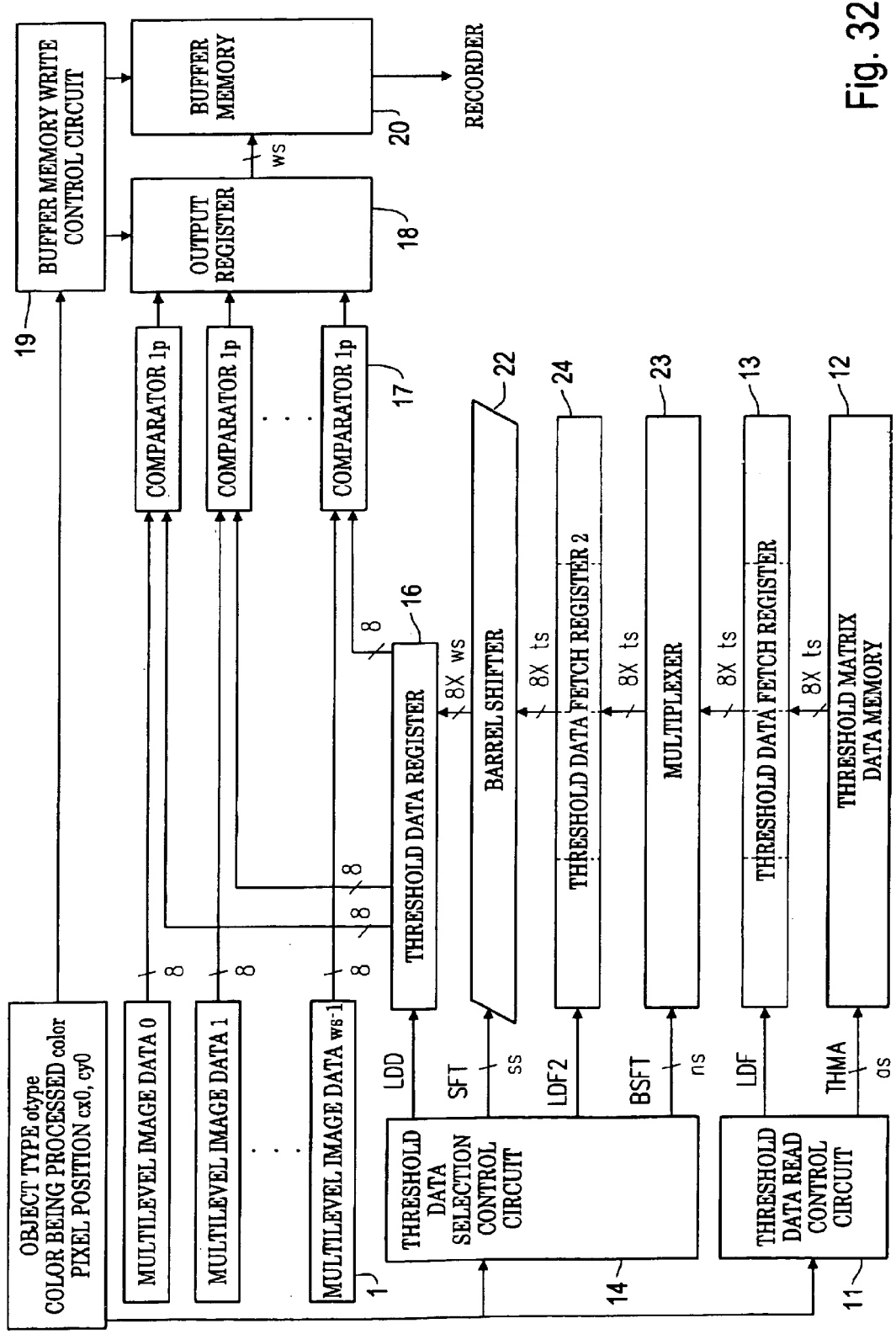
FIG. 32 is a block diagram to show a hardware configuration example of a halftone generation system of an eighth embodiment of the invention.
Figure 33:
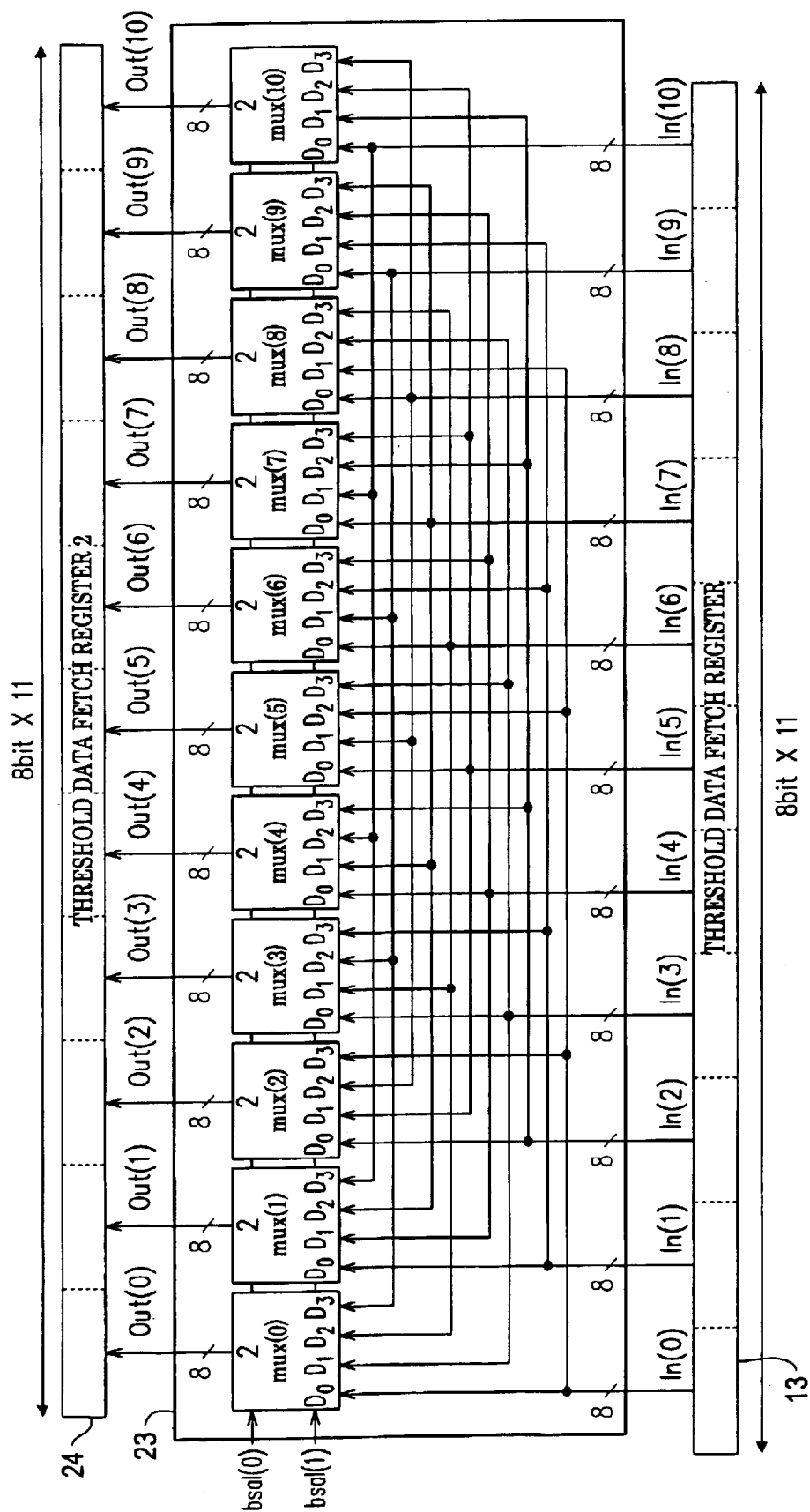
FIG. 33 is a drawing to show the data path configuration of a multiplexer circuit 23.

Next, an eighth embodiment of the invention will be discussed. The eighth embodiment differs from the fifth to seventh embodiments in hardware configuration of the threshold data selection means 4 previously described with reference to FIG. 12. FIG. 32 shows the hardware configuration of a halftone generation system of an eighth embodiment. In FIG. 32, the threshold data selection means 4 corresponds to a threshold data selection control circuit 14, a multiplexer circuit 23, a threshold data fetch register 2, 24, a barrel shifter circuit 22, and a threshold data register 16, and other circuits are similar to those in the fifth embodiment previously described with reference to FIG. 13. The operation of the threshold data selection means in the eighth embodiment will be discussed with reference to FIG. 32. In the figure, first a threshold data fetch register 13 is divided into n blocks each consisting of bs threshold data pieces. Here, bs=ts/n (digits to the right of the decimal point are rounded to the unit's place) and only the number of threshold data pieces in the rightmost or leftmost block becomes bs=ts−(n−1)*bs. Next, which block the start position of multilevel image data to be binarized is contained in is determined, and the threshold data is sorted in block units so that the block in which the start position is contained becomes the top block in accordance with a block shift control signal BSFT output from the threshold data selection control circuit 14. The threshold data sorted in the multiplxer circuit 23 is stored in the threshold data fetch register 2, 24. Next, the barrel shifter circuit 22 selects ws threshold data pieces consecutive starting at any desired position in the top block from the threshold data retained in the threshold data fetch register 2, 24 and outputs the ws threshold data pieces, which then are stored in the threshold data register 16.

Next, the threshold data selection control circuit 14, the multiplexer circuit 23, the threshold data fetch register 2, 24, and the barrel shifter circuit 22 in the embodiment will be discussed.

The multiplexer circuit 23 shifts the threshold data retained in the threshold data fetch register 13 by blocks for sorting the threshold data. FIG. 32 shows the circuit configuration of the multiplexer for dividing 11 threshold data pieces into four blocks and sorting the threshold data in block units. In the figure, the multiplexer circuit 23 is made up of input data lines in (0) to in (10), output data lines out (0) to out (10), 4-input, 1-output multiplexer circuits mux (0) to mux (10), and block shift control signal lines bsel (0) and bsel (1) for selecting the output signal of each multiplexer circuit in response to the shift amount. Each input data line in (i) consists of eight bits, each output data line out (i) consists of eight bits, and each block shift control signal line bsel (i) is one bit. Each multiplexer circuit mux (i) selectively outputs the value input to D (0) to D (3) in response to the value of the block shift control signal lines bsel (0) and bsel (1). For example, if sel (1) sel (0)=00, each multiplexer circuit mux (i) outputs the value input to D (0). Therefore, in this case, the input data is not shifted and is output intact. If sel (1) sel (0)=01, each multiplexer circuit mux (i) outputs the value input to D (1). Resultantly, the value provided by shifting the input data left one block is output. Likewise, if sel (1) sel (0)=10, the value provided by shifting the input data left two blocks is output and if sel (1) sel (0)=11, the value provided by shifting the input data left three blocks is output.

The threshold data fetch register 2, 24 is a register for temporarily retaining ts threshold data pieces output from the multiplexer circuit 23 for processing at the following stage. It is formed of ts D flip-flops, for example. When a load signal LDD1 input from the threshold data selection control circuit 14 is active, the threshold data fetch register 2, 24 reads ts threshold data pieces at the same time in synchronization with a system clock signal (not shown). The barrel shifter circuit 22 has a similar configuration to that described in the sixth embodiment.

Figure 34:
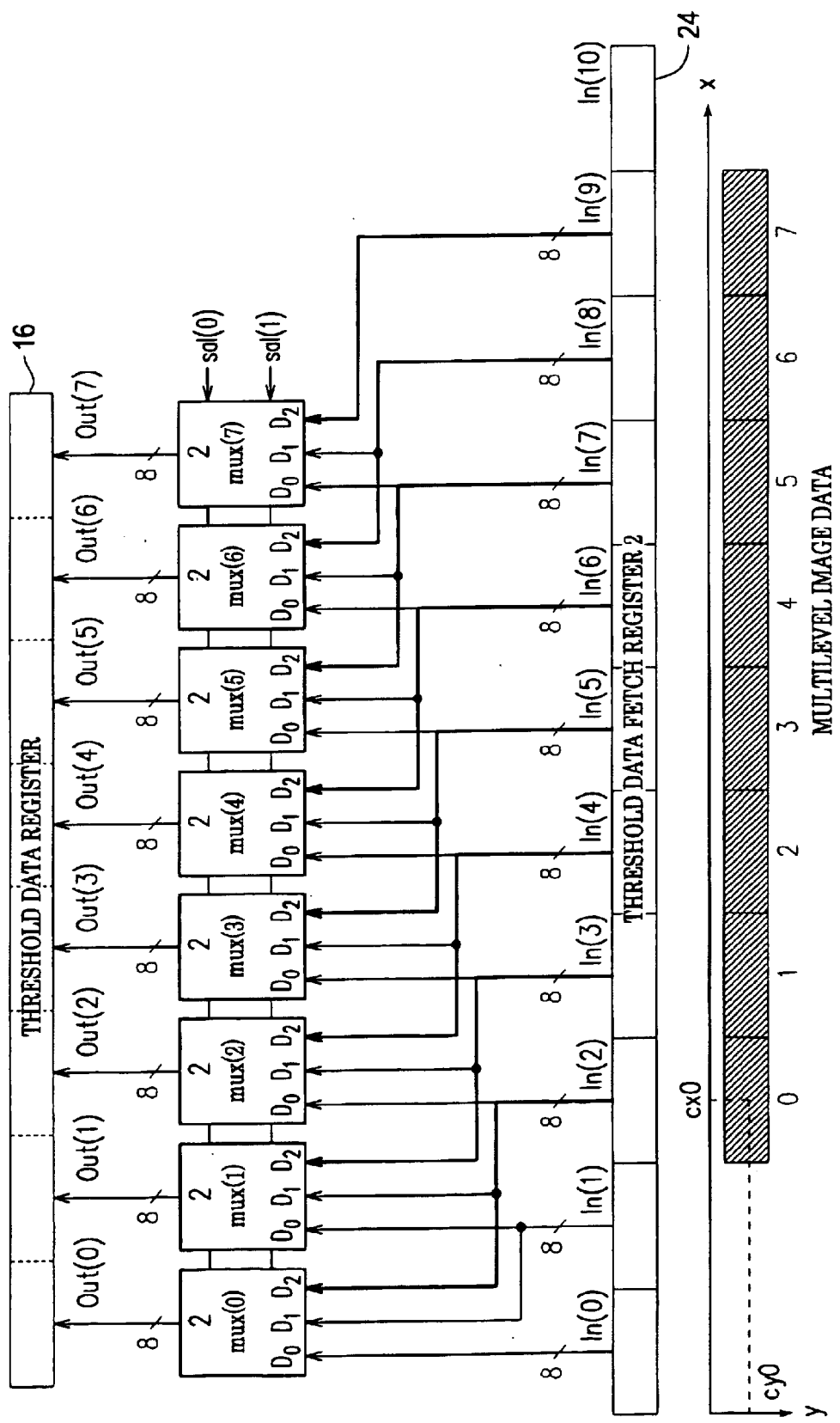
FIG. 34 is a drawing to describe the operation of a barrel shifter circuit 22 when ts≧ws in the eighth embodiment of the invention.

Next, the operation of the barrel shifter circuit 22 for selecting ws threshold data pieces consecutive starting at any desired position from among ts threshold data pieces retained in the threshold data fetch register 2, 24 and outputting the selected threshold data will be discussed with reference to FIGS. 34 and 35. FIG. 34 is a drawing to describe the operation of the barrel shifter circuit 22 with 11 8-bit input data lines and eight 8-bit output data lines, namely, when ts≧ws. In FIG. 34, assume that multilevel image data pieces 0 to 2 of eight pixels consecutive starting at the pixel position (cx0, cy0) are binarized, and that the threshold data corresponding to cx0, of one line of threshold data corresponding to cy0 loaded into the threshold data fetch register 2, 24 is input to the input data line in (2). Since the block containing the threshold data corresponding to cx0 is shifted to the top by the multiplexer circuit 23 described above, the threshold data corresponding to cx0 is always input to any of the input data lines in (0) to in (2). In this case, it is assumed that the threshold data corresponding to cx0 is input to the input data line in (2), thus sel (1) sel (0)=10 is input as a barrel shifter control signal and the value input to D (2) of each multiplexer circuit mux (i) is output, namely, the input data is shifted left two pieces, the threshold data corresponding to multilevel image data 0 input to the input data line in (2) is output to the output data line out (0), and the subsequent threshold data pieces are output to the corresponding output data line. The threshold data input to the input data lines in (0), in (1), and in (10) is not used for the binarization processing shown in FIG. 34.

Figure 35:
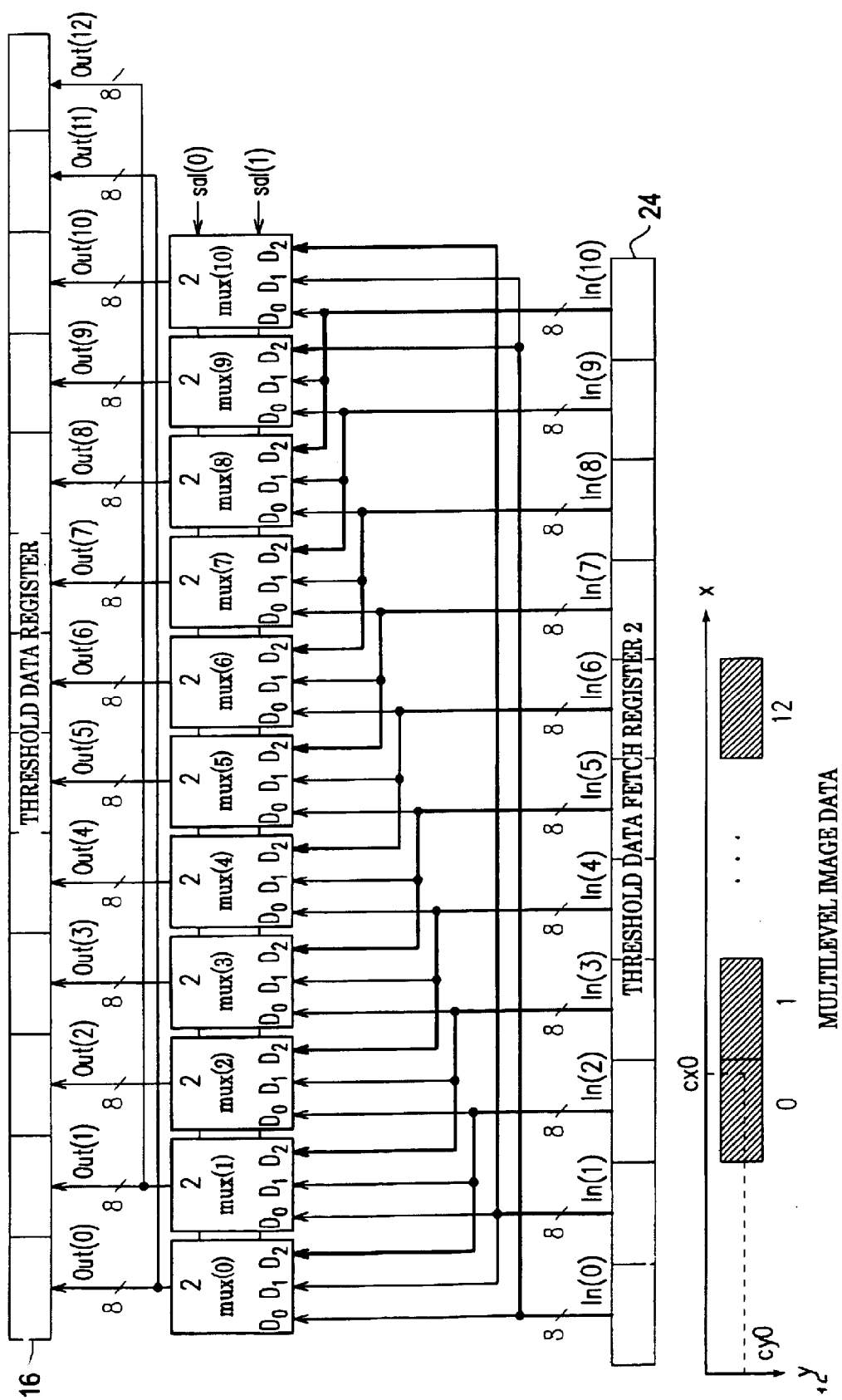
FIG. 35 is a drawing to describe the operation of the barrel shifter circuit 22 when ts<ws in the eighth embodiment of the invention.

FIG. 35 is a drawing to describe the operation of the barrel shifter circuit 22 with 11 8-bit input data lines and 13 8-bit output data lines, namely, when ts<ws. In FIG. 35, assume that multilevel image data pieces 0 to 12 of 13 pixels consecutive starting at the pixel position (cx0, cy0) are binarized, and that the threshold data corresponding to cx0, of one line of threshold data corresponding to cy0 loaded into the threshold data fetch register 2, 24 is input to the input data line in (2). Since the block containing the threshold data corresponding to cx0 is shifted to the top by the multiplexer circuit 23 described above, the threshold data corresponding to cx0 is always input to any of the input data lines in (0) to in (2). In this case, it is assumed that the threshold data-corresponding to cx0 is input to the input data line in (2), thus sel (1) sel (0)=10 is input as the barrel shifter control signal and the value input to D (2) of each multiplexer circuit mux (i) is output, namely, the input data is shifted left two pieces, the threshold data corresponding to multilevel image data 0, 4 input to the input data line in (2) is output to the output data line out (0), out (4) and the subsequent threshold data pieces are output to the corresponding output data lines. As in the description of the fifth embodiment with FIG. 22, FIG. 35 (ts<ws) differs from FIG. 34 (ts≧ws) in that one threshold data piece is output to more than one output data line (in FIG. 35, the threshold data input to the input data line in (2) or in (3) is output to the two output data lines).

Figure 36:
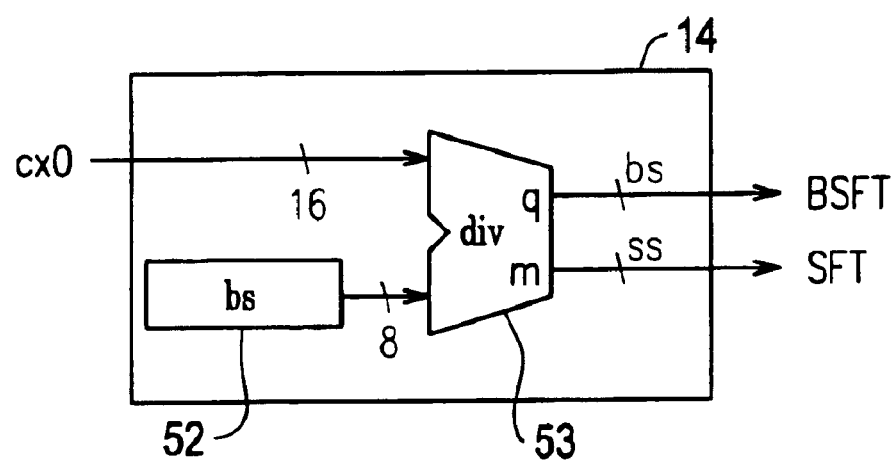
FIG. 36 is a block diagram to show the internal configuration of a threshold data selection control circuit 14 in the eighth embodiment of the invention.

The threshold data selection control circuit 14 outputs the block shift control signal BSFT and the barrel shifter control signal SFT based on the signal cx0 representing the pixel position of multilevel image data 0 undergoing halftone processing in the main scanning direction thereof, and outputs a load signal LDF2 for loading ts threshold data pieces to the threshold data register 2, 24 in response to the timing at which the ts threshold data pieces sorted in block units by the multiplexer circuit 23 are output, and a load signal LDD for loading ws threshold data pieces to the threshold data register 16 in response to the timing at which the ws threshold data pieces selected through the barrel shifter circuit 22 are output. The block shift control signal BSFT is an ns-bit signal (ns=log2n (digits to the right of the decimal point are rounded to the unit's place)) for controlling the operation of shifting input data left a maximum of n−1 blocks. The barrel shifter control signal SFT is an ss-bit signal (ss=log2 (digits to the right of the decimal point are rounded to the unit's place)) for controlling the operation of shifting input data left a maximum of bs-1 blocks. FIG. 36 shows the data path configuration of the threshold data selection control circuit 14 for generating the block shift control signal BSFT and the barrel shifter control signal SFT. In the figure, the threshold data selection control circuit 14 comprises a register 52 for storing the value of bs and a divider 53 for performing operation of cx0/bs. In the configuration, the quotient calculated by the divider 53 is output as the block shift control signal BSFT and the remainder as the barrel shifter control signal SFT.

The different portion of the hardware configuration of the eighth embodiment from the hardware configurations of the fifth to seventh embodiments has been described. According to the configuration of the eighth embodiment, the multiplexer circuit 23 for controlling shifting of data in block units is provided, whereby the shift count of data in the barrel shifter is reduced to the bit width forming the maximum block or less as compared with the case where only the barrel shifter is involved in shifting, and the delay time caused by the shift processing can be shortened. Therefore, the halftone generation system can be operated as pipeline processing at higher speed as compared with the halftone generation systems of the sixth and seventh embodiments.

In the description of the eighth embodiment, the barrel shifter circuit 22 shifts data left, but may be formed of left and right barrel shifters as in the seventh embodiment. In this case, when the start position cx0 of multilevel image data lies between the top bit and the center bit in a unit block of threshold data, first the block containing cx0 is shifted to the left end by the multiplexer circuit 23, next shifted a maximum of bs/2 in the left barrel shifter; on the other hand, when the start position cx0 of multilevel image data lies between the center bit and the last bit in a unit block of threshold data, first the block containing cx0 is shifted to the right end by the multiplexer circuit 23, next shifted a maximum of bs/2 in the right barrel shifter, whereby the shift count in the barrel shifter can be further reduced and the halftone generation system can be operated as pipeline processing at higher speed as compared with one-way shifting.

The halftone generation system according to the embodiment also executes shifting threshold data in block units and load processing of ts threshold data pieces into the threshold data fetch register 2, 24 by the multiplexer circuit 23 and threshold data selection and load processing of ws threshold data pieces into the threshold data register 16 by the barrel shifter circuit 22 as one stage of the pipeline operation and thus is configured so as to operate in 6-stage pipeline processing as a whole.

The embodiments of the invention have been described. The invention is not limited to the described embodiments and also contains any configurations provided by combining the configurations of the embodiments. For example, the multiplexer configuration for shifting threshold data read from the threshold matrix data memory in block units in the eighth embodiment can be applied to any other embodiment. That is, the threshold data in block units already shifted by the multiplexer in the eighth embodiment can be used as input threshold data to the crossbar switch circuit in the fifth embodiment. Likewise, it can also be input to the barrel shifter circuit comprising the left and right barrel shifters in the seventh embodiment.

Although threshold data was formerly read for each process pixel, according to the configuration of the invention described above, threshold data may be read only once for each scanning line for processing because the threshold data read from the threshold matrix is recycled until the end of the scanning line for processing. Further, threshold data may be read during halftone data generation of the preceding line, namely, it is made possible to perform pipeline processing for each scanning line, thus the threshold data read speed can be prevented from becoming a bottleneck for speeding up the processing as compared with the former technique of reading threshold data for each process pixel.

Further, according to the configuration of the invention, the threshold data read speed does not cause the processing speed to lower in such a print processing system for performing processing in painting object units. That is, the print processing system that can incorporate the invention can process print information representing text, graphics, and photo separately for their respective painting objects, so that it can apply optimum processing containing conversion to a halftone to such print information with graphics superposed on a photo and merge them in memory. Further, the invention can also be applied to such a print processing system for processing print information at high speed online for each object and can provide similar advantages.

As described above, according to the halftone generation system and the halftone generation method of the invention, in halftone generation wherein halftone processing is performed at high speed in parallel processing by a plurality of comparators applied to a high-definition print processing system, it is made possible to execute read of threshold data from the threshold matrix data memory and threshold data output to a plurality of comparators as pipeline processing, so that threshold data supply formerly causing a bottleneck can be executed at high speed.

As described above, according to the halftone generation system and the halftone generation method of the invention, comparison processing between a plurality of pixel data pieces forming a multilevel image and a plurality of threshold data pieces can be executed in parallel, and reading of all threshold data applied to a scanning line from the threshold matrix data memory is executed in batch in one read cycle, for example, so that it is made possible to supply halftone data at high speed.

Further, the processing sequence including the selection processing of selecting a plurality of threshold data pieces required for parallel comparison processing from among all threshold data pieces applied to the scanning line from the threshold matrix data memory, the parallel comparison processing using a plurality of comparators, etc., is executed as pipeline processing, so that halftone data of pixels can be repeatedly output in sequence and it is made possible to supply halftone data at high speed.

(Ninth Embodiment)

Figure 38:
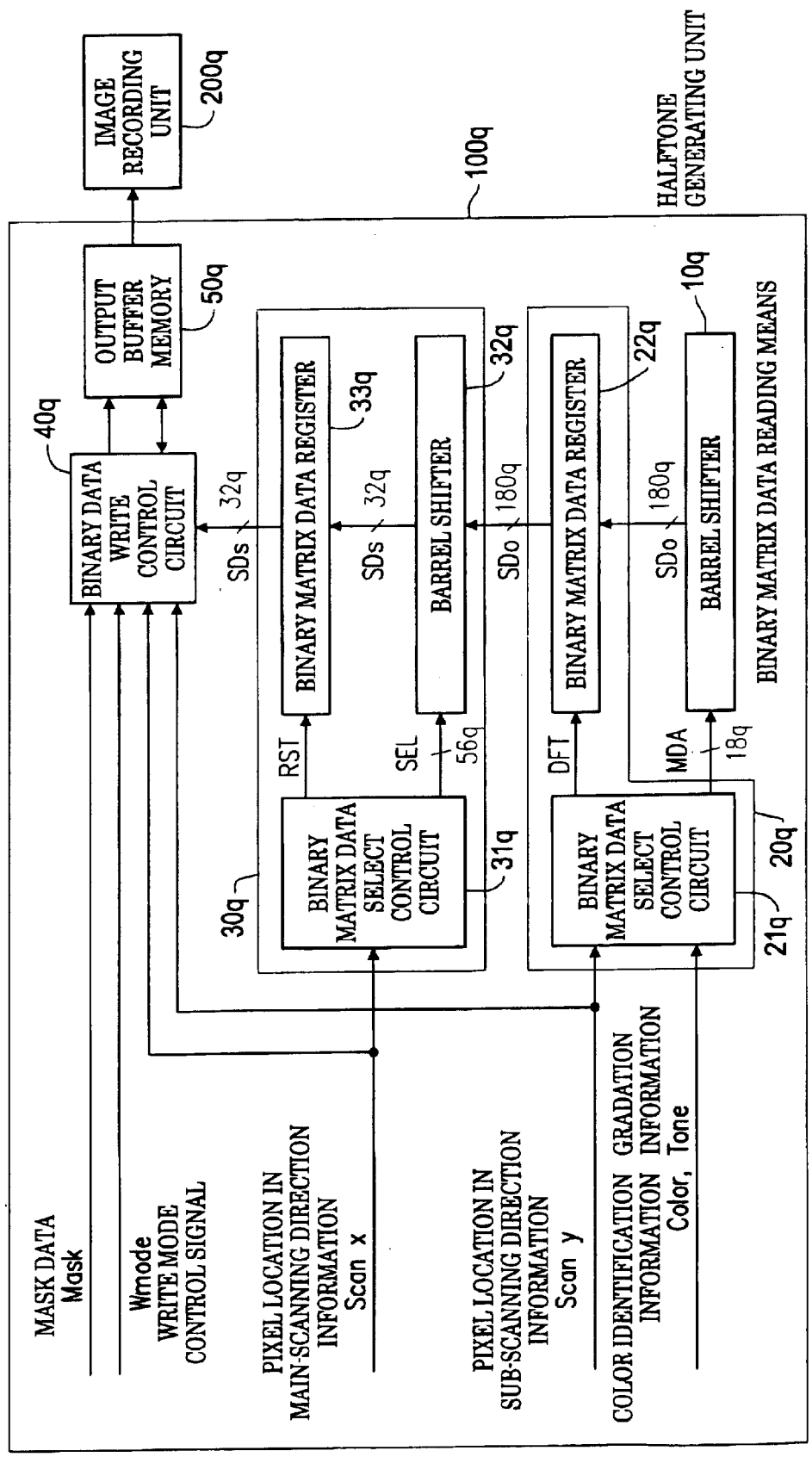
FIG. 38 is a block diagram showing a hardware configuration of an overall halftone generation system which is a ninth embodiment of the present invention.

FIG. 38 is a block diagram showing a hardware configuration of an overall halftone generation system which is a ninth embodiment of the present invention. A halftone generation system 100*q* is made up of a binary matrix data storage memory 10*q*, a binary matrix data reading means 20*q*, a binary matrix data selection means 30*q*, a binary data write control circuit 40*q*, and an output buffer memory 50*q*. Halftone data is supplied from the output buffer memory 50*q* to an image recorder 200*q*. The image recorder 200*q* is a xerography-basis color printer of the single engine type.

<Configuration of Binary Matrix Data Storage Memory and How the Data is Stored Therein>

Figure 37:
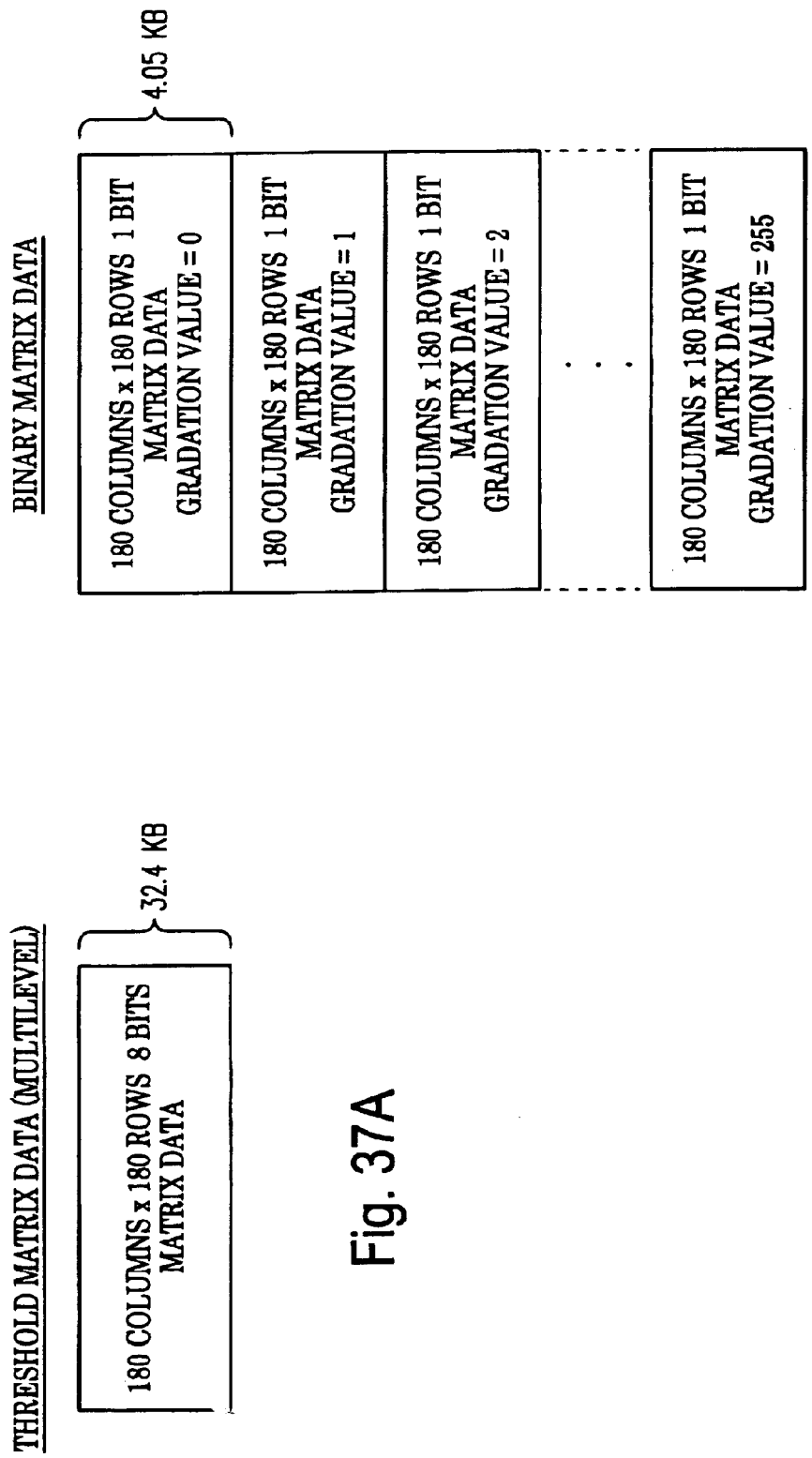
FIGS. 37A and 37B are diagrams is a diagram showing examples of threshold matrix data and binary matrix data used in the present invention.

In the halftone generation system of the ninth embodiment, the binary matrix data shown in FIG. 37B is stored into the binary matrix data storage memory 10*q* such that all of the binary matrix data of a scan line under processing, i.e., the binary matrix data of 180 bits, can be read out simultaneously.

Figure 39:
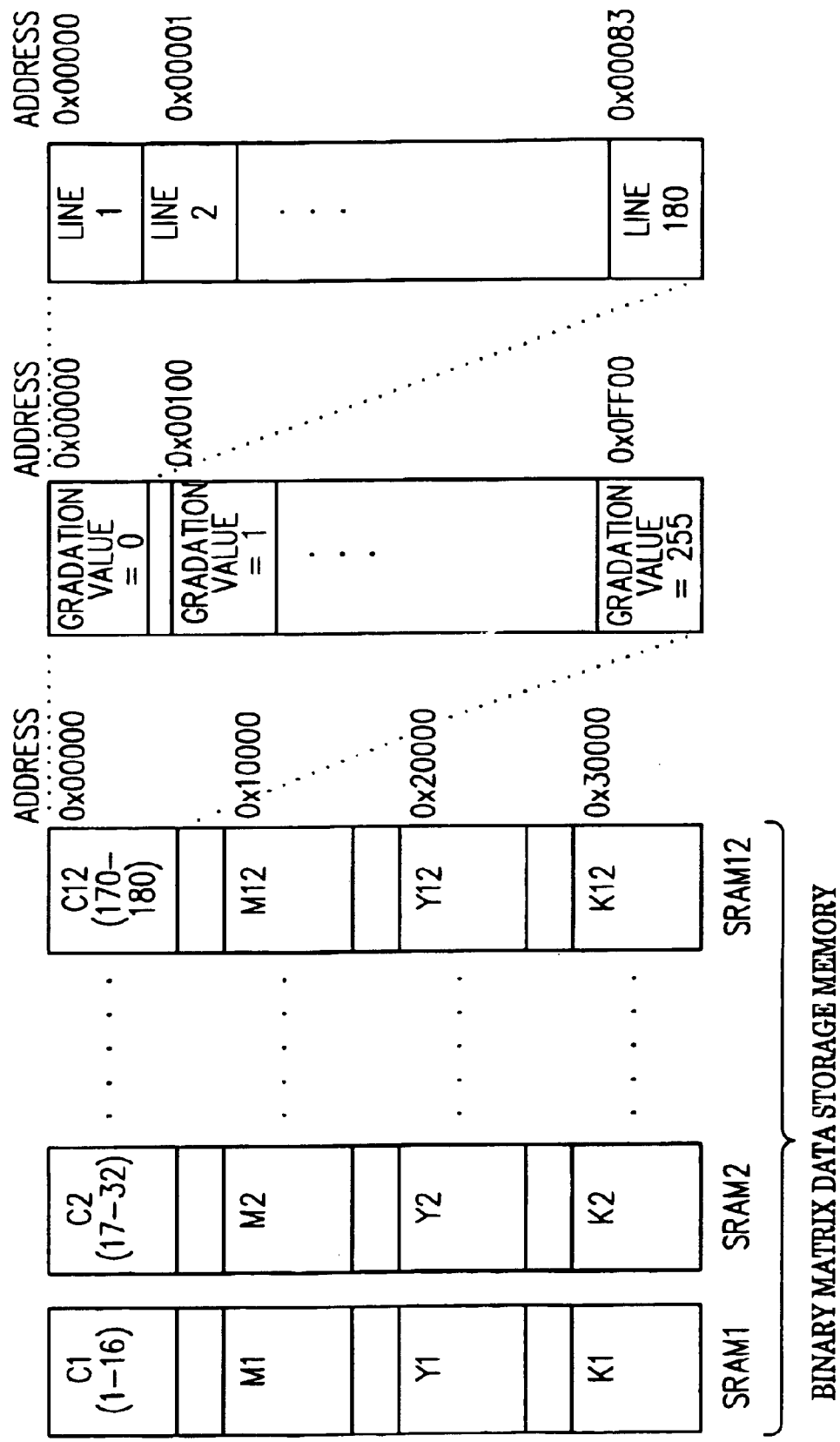
FIG. 39 is a diagram showing a configuration of a binary matrix data storage memory and how the data is stored therein in the ninth embodiment.

As shown in FIG. 39, the binary matrix data storage memory 10*q* includes 12 number of SRAMs 1 to 12 each allowing 16-bit data to be read out by one addressing. Consecutive 16-bit data pieces (of the same scan line) of the binary matrix data of each of the tone values (levels) 0 to 255 of each of the colors of C, M, Y and K are written into a memory location of an address assigned thereto in the SRAMs 1*q* to 12*q* (only the SRAM 12*q* stores 4-bit data in this case). Accordingly, the address lines of the binary matrix data storage memory 10*q* are totally 18 bits, an the data lines thereof are totally 180 bits.

<Reading Out of Binary Matrix Data>

In the ninth embodiment, the binary matrix data reading means 20*q* (FIG. 38) simultaneously reads out all the binary matrix data pieces (of 180 bits) of the scan line under processing, which correspond to color identification information "Color" and gradation information "Tone", from the binary matrix data storage memory 10*q* in accordance with color identification information "Color", gradation information "Tone" and sub-scanning direction pixel position information Subsidiary-scanning direction pixel position information "Scany" of a painting object of text and graphics under processing, and temporarily holds the readout data pieces. The binary matrix data reading means 20*q* includes a binary matrix data read control circuit 21*q* and a binary matrix data fetch register 22*q*.

The color identification information "Color" indicates the colors of C, M, Y and K. The gradation information "Tone"

indicates the gradation levels 0 to 255. The sub-scanning direction pixel position information "Scany" indicates the scan line under processing of the painting object.

The binary matrix data read control circuit 21*q* produces a binary matrix data address signal MDA for making an access to the binary matrix data storage memory 10*q*, and further produces a fetch timing signal DFT used for temporarily storing binary matrix data SDo of 180 bits into the binary matrix data fetch register 22*q* when the 180-bit binary matrix data SDo is read out of the binary matrix data storage memory 10*q* by the binary matrix data address signal MDA.

The binary matrix data address signal MDA consists of 18 bits. The 10 high-order bits are generated from the color identification information "Color" and the gradation information "Tone". The 8 low-order bits are generated from the residue of the result of dividing the sub-scanning direction pixel position information "Scany" by 180 of the matrix size.

The binary matrix data address signal MDA is generated when the halftone data generation process for the preceding scan line ends and the sub-scanning direction pixel position information "Scany" varies to start the halftone data generation.

Figure 40:
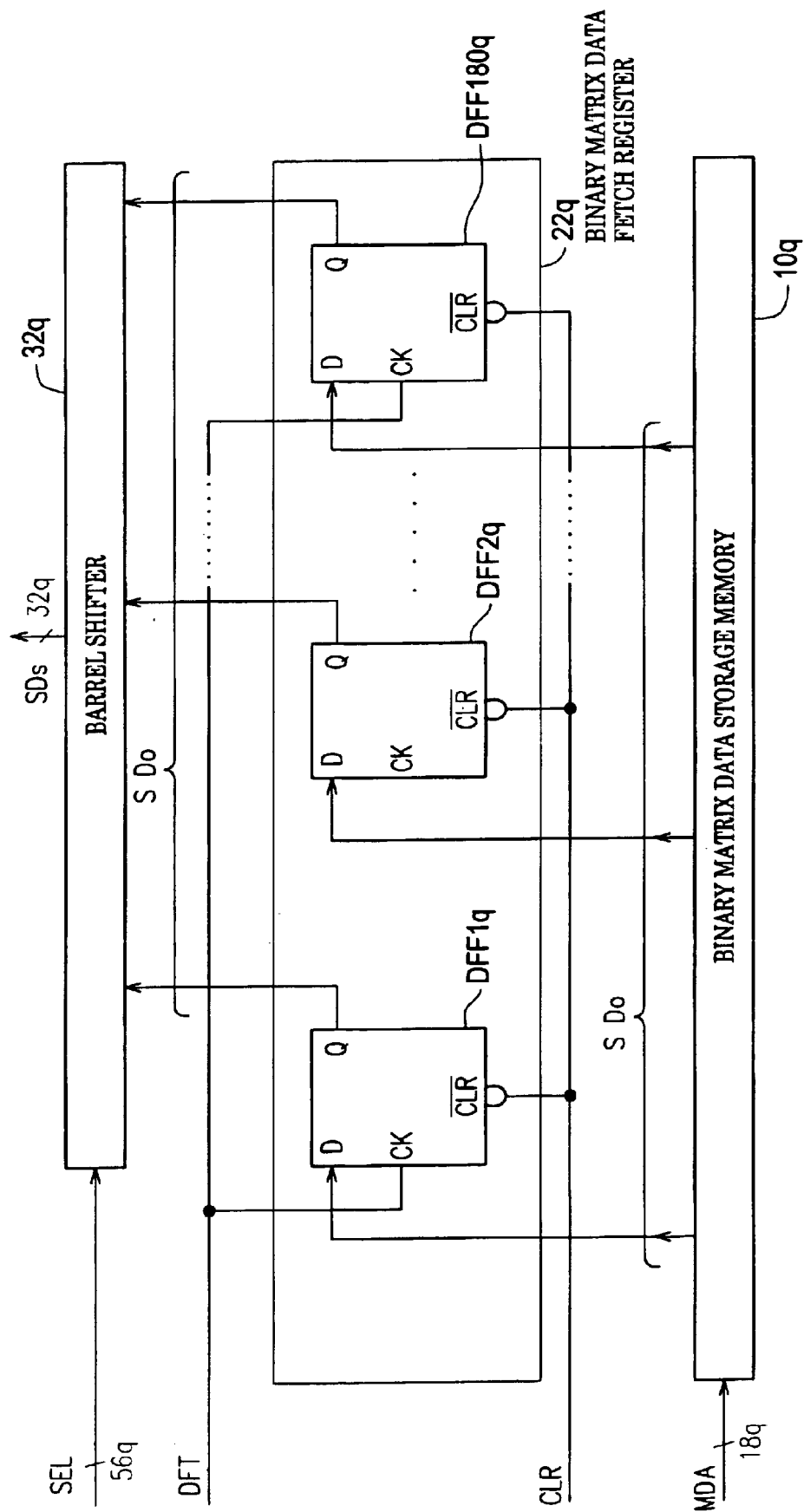
FIG. 40 is a block diagram showing an internal configuration of a binary matrix data fetch register in the ninth embodiment.

The binary matrix data fetch register 22*q*, as shown in FIG. 40, includes 180 number of D-flip-flop circuits DFF1*q* to DFF180*q*. 180-bit binary matrix data SDo is retained in those flip-flop circuits and then is output to a barrel shifter 32*q* to be described later. (The 180-bit binary matrix data SDo is read out of the binary matrix data storage memory 10*q* when the fetch timing signal DFT is applied as a clock signal to the flip-flop circuits DFF1 to DFF180*q*.)

<Selecting and Outputting of Binary Matrix Data>

The binary matrix data selection means 30*q* (FIG. 38) includes a binary-matrix-data select control circuit 31*q*, the barrel shifter 32*q* and a binary matrix data register 33*q*. To correct a shift of a pixel position of the painting object in the main scanning direction relative to a pixel position of the binary matrix data in the main scanning direction in accordance with main-scanning direction pixel position information "Scanx" of the painting object under processing, which represents a first pixel position in the main scanning direction, the binary matrix data selection means 30*q* selects 32-bit binary matrix data SDs from the binary matrix data SDo and outputs the result, while successively shifting 180-bit binary matrix data SDo retained in the binary matrix, data fetch register 22 bits at the steps of 32 bits till the halftone data generation process of a scan line under processing is completed.

Figure 41:
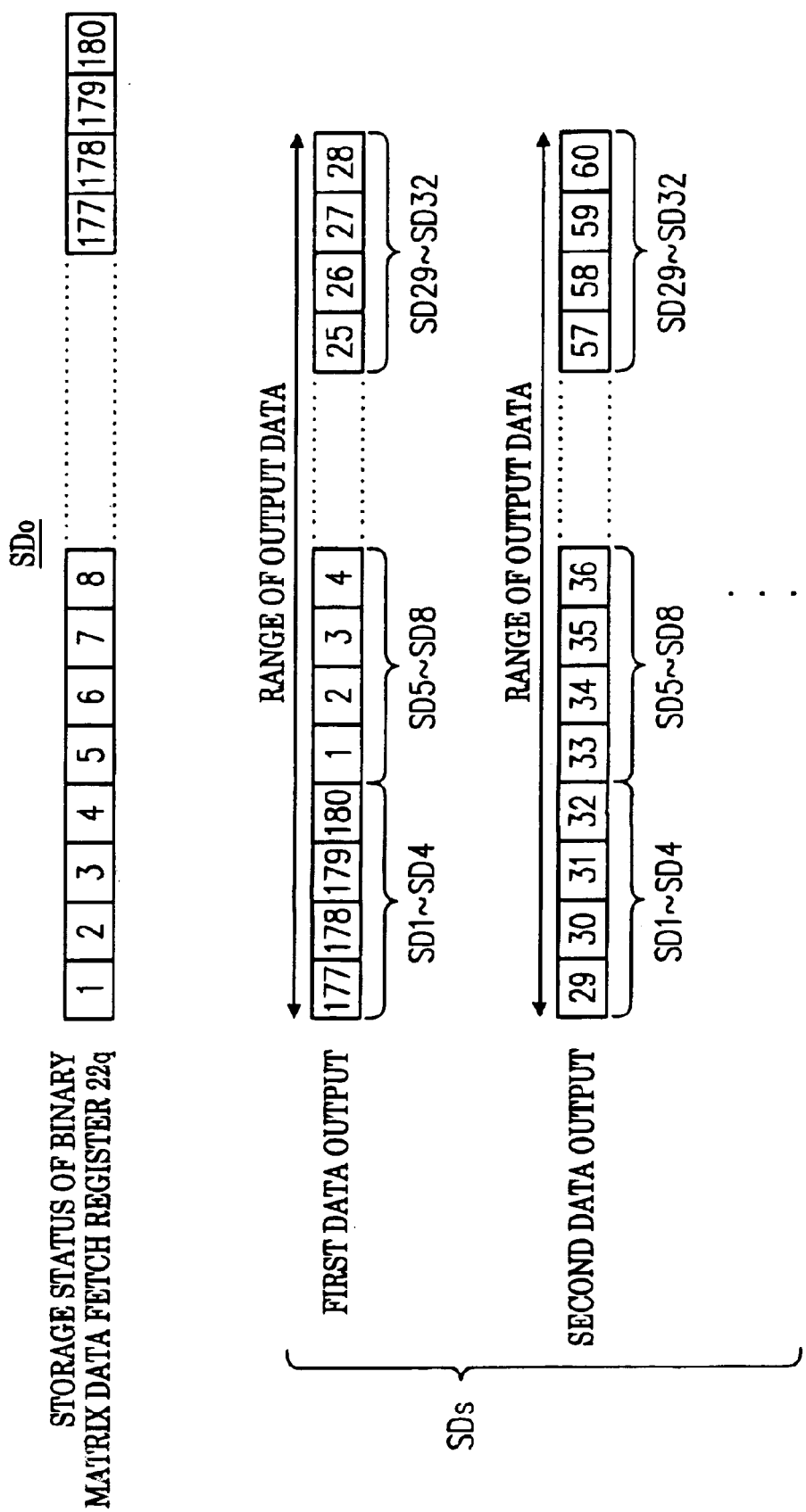
FIG. 41 is a diagram showing how binary matrix data of a plurality of pixels is selectively output in the ninth embodiment.

How to selectively output the binary matrix data is shown in FIG. 41. FIG. 4*i* illustrates a case where a starting point (every 32 bits) of a pixel stream under processing of the painting object when viewed in the main scanning direction is the $177^{th}$ data of the 180-bit binary matrix data SDo. In this case, in the first data outputting operation by the binary matrix data selection means 30*q*, data pieces of 32 bits of the binary matrix data SDo, which ranges consecutively from the $177^{th}$ to the $28^{th}$ Data, are output simultaneously. In the second data outputting operation, the data pieces of 32 bits of the binary matrix data SDo, which ranges consecutively from the $29^{th}$ to $60^{th}$, are output simultaneously.

Figure 42:
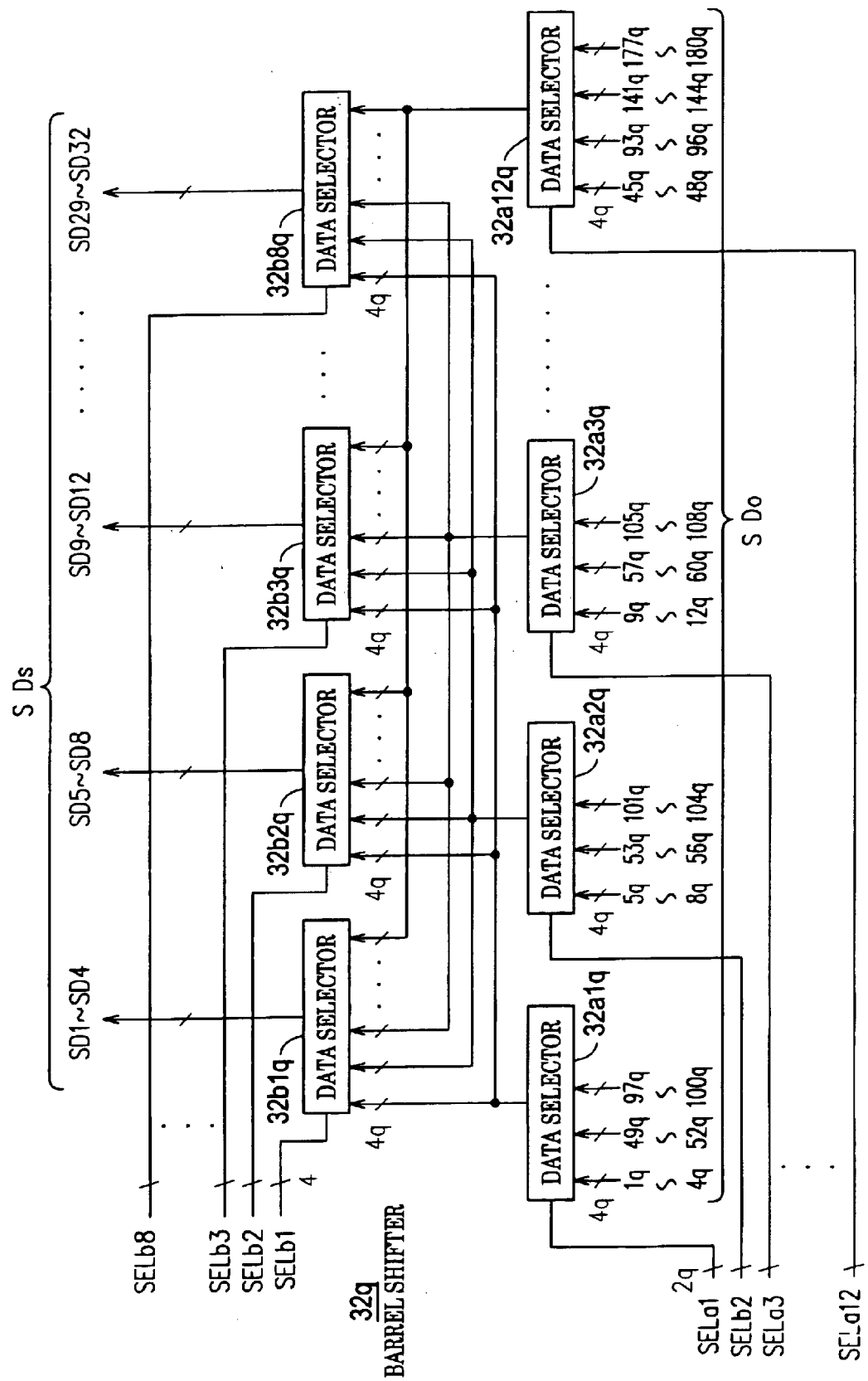
FIG. 42 is a block diagram showing an exemplary arrangement of a barrel shifter in the ninth embodiment.

An exemplary arrangement of the barrel shifter 32*q* functioning to thus selectively output data is shown in FIG. 42. As shown, the barrel shifter 32*q* includes two groups of data selectors 32*a*1 to 32*a*8, and 32*b*1 to 32*b*8.

The 180-bit binary matrix data SDo that is output from the binary matrix data fetch register 22*q* are divided into eight data sets each consisting of 4 bits, and those data sets are input to the first group of data selectors 32*a*1*q* to 32*a*8*q*, respectively. (Those data sets, when combined, make up the binary matrix data SDs of consecutive 32 bits.) In this case, in design, care must be used so as to inhibit those eight 4-bit data sets SD1 to SD4, SD5 to SD8, ..., SD29 to SD32, from being output from the same data selector.

Specifically, the first to $144^{th}$ data pieces of the binary matrix data SDo are divided and allocated to those data selectors 32*a*1*q* to 32*a*12*q*: the first to fourth data pieces are allocated to the data selector 32*a*1*q*, and the $5^{th}$ to $8^{th}$ data pieces are allocated to the data selector 32*a*2*q*, and so on. The $145^{th}$ to $180^{th}$ data pieces are divided and allocated to the data selectors 32*a*4*q* to 32*a*12*q*: the $144^{th}$ to $148^{th}$ data pieces are allocated to the data selector 32*a*4*q* (not shown), and the $149^{th}$ to 152th data pieces are allocated to the data selector 32*a*5*q* (not shown), and so on.

Accordingly, three 4-bit data sets are input to the data selectors 32*a*1*q* to 32*a*3*q*, and four 4-bit data sets are input to the data selectors 32*a*4*q* to 32*a*12*q*. The reason why the binary matrix data SDo is processed every 4-bit data set is that 4 (4 bits) is the greatest common factor of the 180 (180 bits of the binary matrix data Binary matrix data SDo) and 32 (32 bits of the binary matrix data binary matrix data SDs).

In response to select signals SELa1 to SELa12 each of 2 bits, which are derived from the binary-matrix-data select control circuit 31*q* (described in detail later), the data selectors 32*a*1*q* to 32*a*12*q* selectively output the 4-bit data sets.

The 4-bit data sets that are output from the data selectors 32*a*1*q* to 32*a*8*q* are input to the data selectors of the next stage, a32*b*1*q* to a32*b*8*q*, such that each data set is input to all the latter data selectors. In response to 4-bit select signals SELb1 to SELb8 output from the binary-matrix-data select control circuit 31*q* (to be described later), the data selectors a32*b*1*q* to a32*b*8*q* selectively output 4-bit data sets SD1 to SD4, SD5 to SD8, ..., SD29 to SD32, which make up the binary matrix data SDs consisting of consecutive 32 bits (FIG. 41). Therefore, those of the data selectors 32*a*1*q* to 32*a*8*q* of the first stage, which output valid data pieces through the data selectors a32*b*1*q* to a32*b*8*q* of the second stage, are only eight ones. The data selectors 32*a*1*q* to 32*a*8*q* and a32*b*1*q* to a32*b*8*q* operate concurrently.

The binary matrix data SDs (SD1 to SD32) that is output from the barrel shifter 32*q* form halftone data corresponding to the pixel stream under processing in the painting object, and is input to the binary matrix data register 33*q* (FIG. 38). Transferring of the data from the binary matrix data fetch register 22*q* to the binary matrix data register 33*q* is performed during a time period corresponding to that of one clock cycle of a clock signal used for the operation of the barrel shifter 32*q*.

The binary matrix data register 33*q* temporarily stores the 32-bit binary matrix data SDs that is received from the barrel shifter 32*q*. The binary matrix data register 33*a* includes 32 number of D-flip-flop circuits, for example. In operation, a register timing signal RST is applied as a clock signal from the binary-matrix-data select control circuit 31*q* to the 32 number of D-flip-flop circuits; the binary matrix data SDs is retained in those flip-flop circuits; and then is output from the flip-flop circuits to the binary data write control circuit 40*q* to be described in detail later.

The binary-matrix-data select control circuit 31*q* processes the main-scanning direction pixel position information "Scanx", and outputs the select signals SELa1 to SELa12 and SELb1 to SELb8, and the register timing signal RST.

The select signal SEL (SELa1 to SELa12 and SELb1 to SELb8) consists of 56 bits. A look-up table, for example, is used for generating the select signal SEL of 56 bits. Specifically, to generate the 56-bit select signal SEL, combinations of the select signals corresponding to the main-scanning direction pixel positions as units each of 32 bits are computed in advance, and the result is stored in a ROM.

The binary-matrix-data select control circuit 31q computes an address of the ROM by use of the main-scanning direction pixel position information "Scanx", and reads out the select signal SEL from the ROM by the address data. In this case, the number of combinations of the select signals, which correspond to the main-scanning direction pixel positions as the units each of 32 bits, is 45 (180/4), and the address data is 6 bits wide as a whole. The address is computed in a manner that the first pixel position of the painting object under processing in the main scanning direction is replaced with the first pixel position of each pixel stream of 32 bits, which contains it, the resultant is divided by 180 of the matrix size, and the residue as the result of the dividing operation is further divided by 4.

<Writing of Halftone Data into Output Buffer>

The binary data write control circuit 40q first computes an address ADR to write halftone data into the output buffer memory 50q by use of the main-scanning direction pixel position information "Scanx" and the sub-scanning direction pixel position information "Scany" of a painting object under processing. In this embodiment, the output buffer memory 50q is arranged so as to allow halftone data of 32-bit width to be written thereinto.

Following the computing of the address ADR, the binary data write control circuit 40q carries out an ANDing operation of 32-bit binary matrix data SDs that is output from the binary matrix data register 33q of the binary matrix data selection means 30q mask data Mask indicative of a paint-out area (pixelwise shape) of the painting object, and writes the operation result into the output buffer memory 50q by use of the address ADR.

In this embodiment, the writing operation may be placed to a simple write mode or a read modify mode. A write mode control signal Wmode is used for selecting the writing mode, the simple write mode or the read modify mode. In this embodiment, halftone data of the painting object is sequentially over-written into the output buffer memory 50q. When the remainder of 32 bits is yielded at the start edge or the end edge of the painting object, the following problem arises: the data of other pixel streams than the pixel stream under processing is overwritten into the memory on the assumption that no object is present.

The read modifier write mode is used for preventing the problem. In the read modify write mode, when the remainder of 32 bits is yielded at the start edge or the end edge of the painting object, the data is read out of the output buffer memory 50q by the binary data write control circuit 40q; the readout data is bit inverted; the readout data and the inverted mask data are ANDed; and the result of the ANDing operation and the resulting of ANDing the binary matrix data SDs and the mask data "Mask" are stored into the output buffer memory 50q.

The halftone data stored into the output buffer memory 50q is transferred to the image recorder 200q where it is visualized as a halftone picture.

The output buffer memory 50q is a page memory in the embodiment, but it may be a band buffer memory. Where the band buffer memory is used for the output buffer memory, painting object data to be input to the halftone generation system 100q is divided into data blocks each of a predetermined band size. The data is processed every data block. At least two band buffer memories are provided. Those two band buffer memories are alternately subjected to the writing and reading of halftone data thereto and therefrom.

<Effects of the Ninth Embodiment>

As described above, the binary matrix data which is as the result of binarizing using the threshold tone data and to be halftone data is directly read out of the output buffer memory 50q; the data read-out of the output buffer memory is not the threshold tone data.

Therefore, the number of read data lines derived from the binary matrix data storage memory 10q is reduced. If the data width of the threshold tone when it is read out of the threshold matrix data memory is 8 bits as in the conventional technique, the number of the required read data lines is ⅛ as large as the conventional ones. If the number of the read data line led out of the binary matrix data storage memory 10q is equal to that of the corresponding ones in the conventional halftone generation system, the matrix size of the halftone generation system of the invention is eight times as large as that of the conventional one. Further, the hardware for rearranging the binary matrix data read out of the binary matrix data storage memory 10q is also reduced to ⅛ in scale when comparing with the conventional one.

Furthermore, the ninth embodiment succeeds in reducing the number of pixels to be subjected to parallel processing. This leads to high speed processing of halftone generation. Additionally, the binary matrix data which is to be halftone data is directly read out of the output buffer memory 50q. Therefore, there is no need of using the comparator for comparing the multilevel image data with the threshold tone data. This produces an advantage of reducing the scale of hardware.

(Tenth Embodiment)

Figure 43:
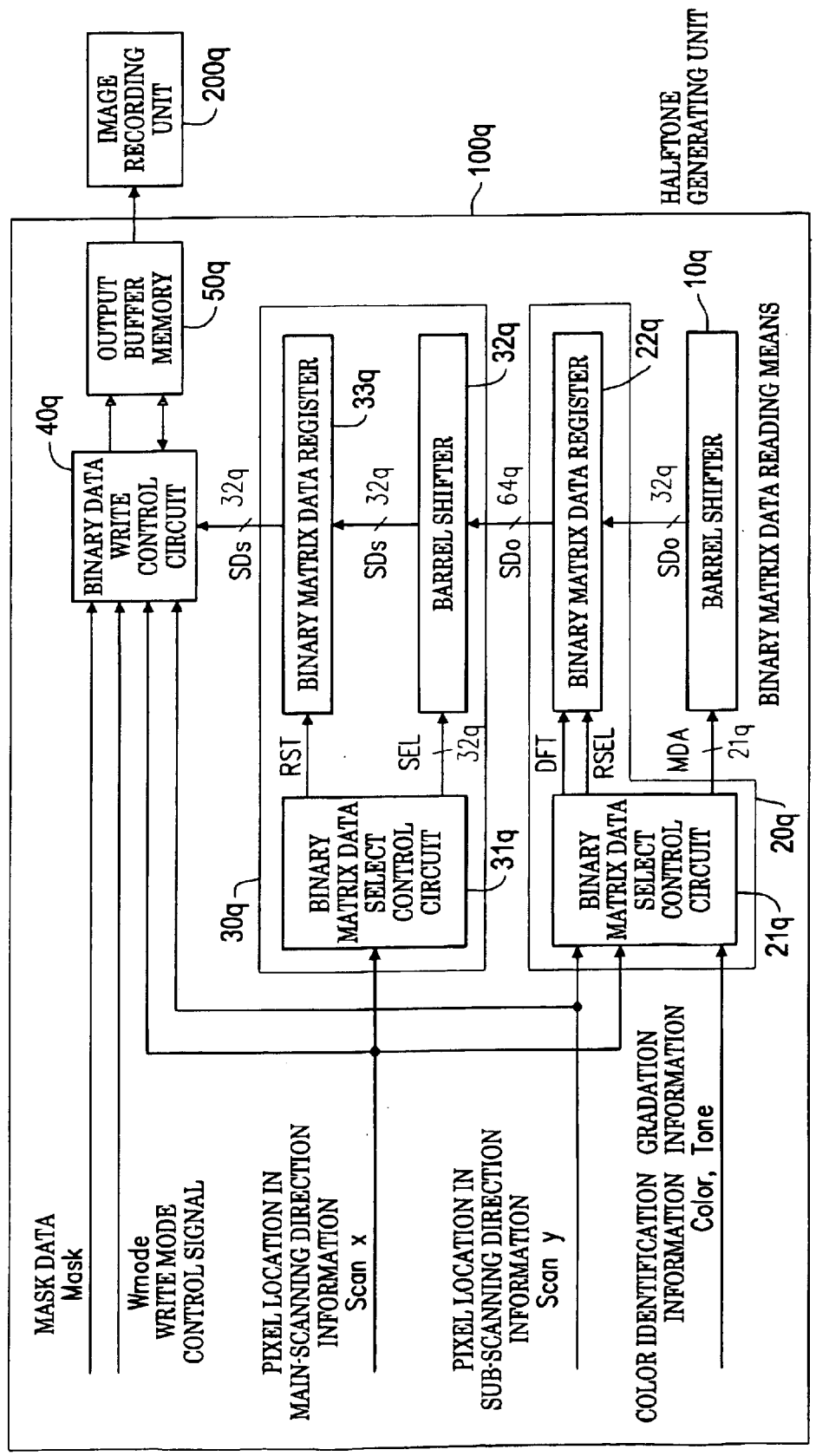
FIG. 43 is a block diagram showing a hardware configuration of an overall halftone generation system which is a tenth embodiment of the present invention.

FIG. 43 is a block diagram showing a hardware configuration of an overall halftone generation system which is a tenth embodiment of the present invention. As in the ninth embodiment, a halftone generation system 100q is made up of a binary matrix data storage memory 10q, a binary matrix data reading means 20q, a binary matrix data selection means 30q, a binary data write control circuit 40q, and an output buffer memory 50q. Major differences of the tenth embodiment from the ninth embodiment are the internal configuration and the way of data storage of the binary matrix data storage memory 10q, and the internal configuration and the operation of the binary matrix data selection means 30q.

<Configuration of Binary Matrix Data Storage Means and How the Data is Stored Therein>

In the tenth embodiment, the binary matrix data shown in FIG. 37B is stored in the binary matrix data storage memory 10q such that part of the binary matrix data of one scan line (data pieces of 32 bits in the embodiment) are read out therefrom simultaneously.

Figure 44:
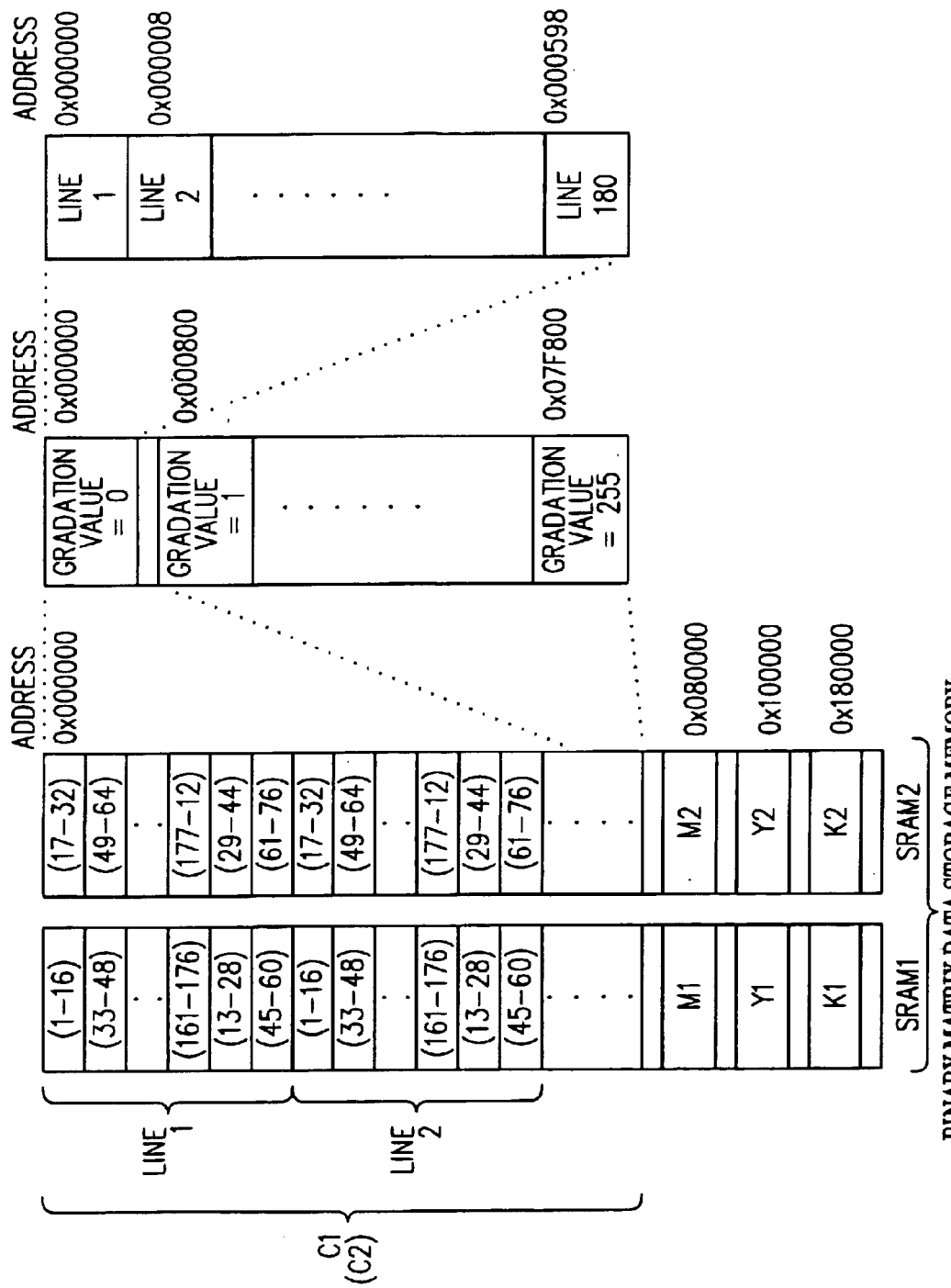
FIG. 44 is a diagram showing a configuration of a binary matrix data storage memory and how the data is stored therein in the tenth embodiment.

To be more specific, as shown in FIG. 44, the binary matrix data storage memory 10q includes two SRAMs, SRAM1 and SRAM2, each designed such that data pieces of 16 bits may be read out of a memory location with an address assigned thereto in the memory. The consecutive 16-bit data pieces of the binary matrix data of the tone values (gradation levels) 0 to 255 of one scan line are alternately written into the SRAM1 and SRAM2.

The first to $76^{th}$ data pieces, following the $180^{th}$ data piece, of the binary matrix data of each scan line are repeated written into the SRAM 1 and SRAM2. With this data storage way, it is possible to continuously read out the binary matrix data of 32 bits as data unit, which corresponds to the first pixel position of the under-processing painting object of text and graphics, as will be described later.

<Reading Out of Binary Matrix Data>

In the tenth embodiment, the binary matrix data reading means $20q$ (FIG. 43) simultaneously reads out the binary matrix data pieces of the scan line under processing, which correspond to color identification information "Color" and gradation information "Tone", from the binary matrix data storage memory $10q$ in accordance with color identification information "Color", gradation information "Tone" of a painting object of text and graphics under processing, main-scanning direction pixel position information "Scanx", and sub-scanning direction pixel position information "Scany". In this case, the data pieces of 32 bits are simultaneously read out for two read cycles for each halftone data generation process, and hence totally 64 bits of the data pieces are read out for one halftone data generation process. The readout data pieces are temporarily retained in the binary matrix data reading means $20q$. The binary matrix data reading means $20q$ includes a binary matrix data read control circuit $21q$ and a binary matrix data fetch register $22q$.

The binary matrix data read control circuit $21q$ produces a binary matrix data address signal MDA for making an access to the binary matrix data storage memory $10q$, and further produces a select signal RSEL and a fetch timing signal, which are used for temporarily storing binary matrix data SDo of 64 bits into the binary matrix data fetch register $22q$ when the binary matrix data SDo is read out of the binary matrix data storage memory $10q$ by the binary matrix data address signal MDA for two read cycles such that the binary matrix data SDo of 32 bits is read out for each read cycle.

The binary matrix data address signal MDA consists of 21 bits. The 10 high-order bits are generated from the color identification information "Color" and the gradation information "Tone". The 8 medium-order bits are generated from the residue of the result of dividing the sub-scanning direction pixel position information "Scany" by 180 of the matrix size. The 3 low-order bits are generated from the residue of the result of dividing the main-scanning direction pixel position information "Scanx" by 180 of the matrix size.

In the ninth embodiment, all the binary matrix data pieces of a scan line under processing are simultaneously read out of the binary matrix data storage memory $10q$. Therefore, the binary matrix data address signal MDA is produced one for each scan line. In the tenth embodiment, the binary matrix data address signals MDA are produced two times for each halftone data generation process.

Figure 45:
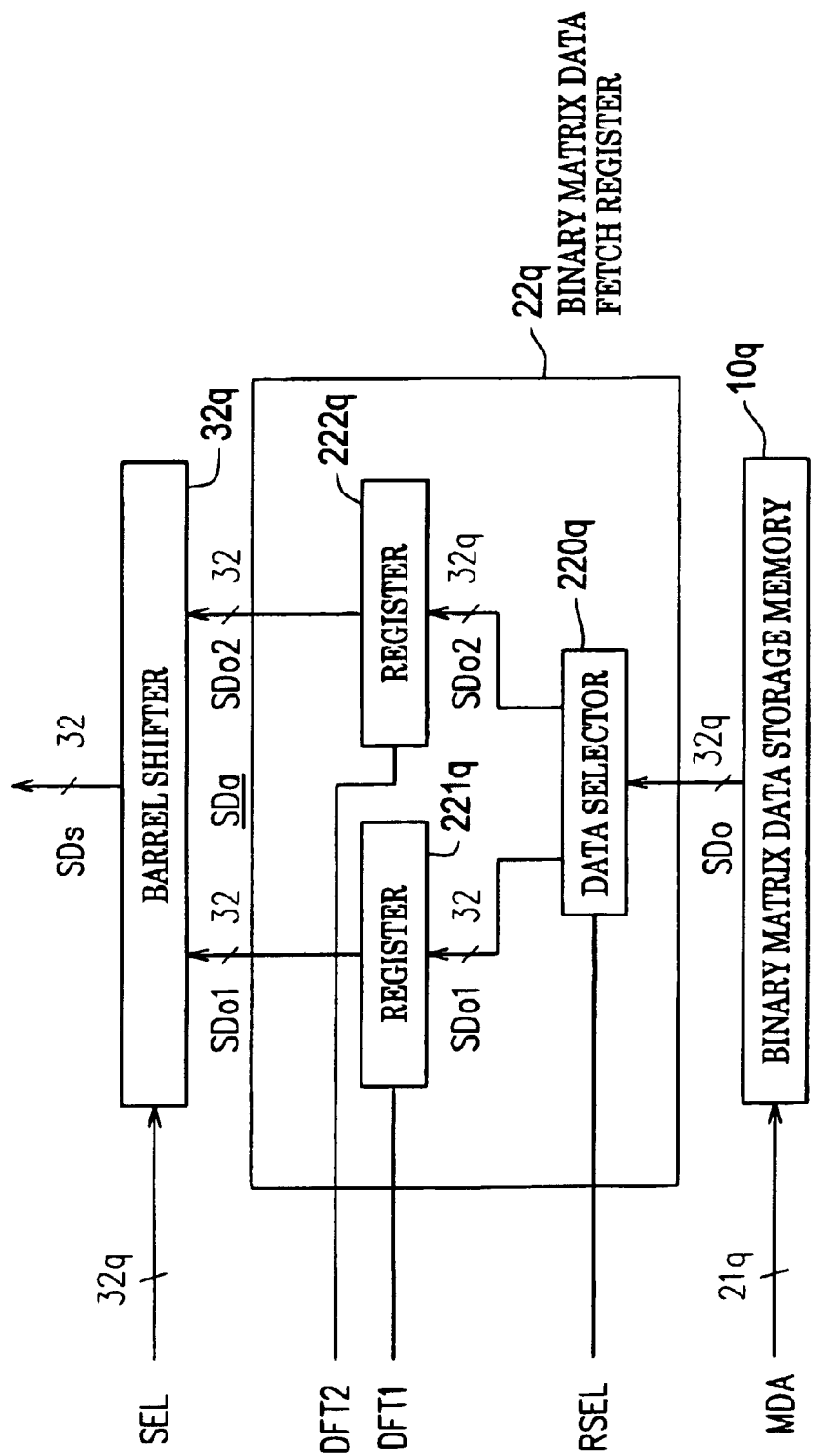
FIG. 45 is a block diagram showing an internal configuration of a binary matrix data fetch register in the tenth embodiment.

The binary matrix data fetch register $22q$, as shown in FIG. 45, includes a data selector $220q$, and registers $221q$ and $222q$. In operation, in response to the select signal RSEL the data selector $220q$ delivers the binary matrix data Binary matrix data SDo, which was read out, by 32 bits, from the binary matrix data storage memory $10g$, as binary matrix data SDo1 and SDo2 to the registers $221q$ and $222q$.

The registers $221q$ and $222q$ are each formed with 32 number of D-flip-flop circuits. Fetch timing signals DFT1 and DFT2 are applied as clock signals to those flip-flop circuits of the registers $221q$ and $222q$. In response to those fetch timing signals, the registers $221q$ and $222q$ hold the binary matrix data pieces SDo1 and SDo2 therein, and binary matrix data SDa of 64 bits as the combination of those data pieces SDo1 and SDo2 is input to a barrel shifter $32q$ to be described later.

<Selecting and Outputting of Binary Matrix Data>

The binary matrix data selection means $30q$ (FIG. 38) includes a binary-matrix-data select control circuit $31q$, the barrel shifter $32q$ and a binary matrix data register $33q$. To correct a shift of a pixel position of the painting object in the main scanning direction relative to a pixel position of the binary matrix data in the rain scanning direction in accordance with main-scanning direction pixel position information "Scanx" of the painting object under processing, the binary matrix data selection means $30q$ selects 32-bit binary matrix data SDs from the binary matrix data SDa and outputs the result, while successively shifting 64-bit binary matrix data SDa retained in the binary matrix data fetch register $22q$ bits at the steps of 32 bits till the halftone data generation process of a scan line under processing is completed.

Figure 46:
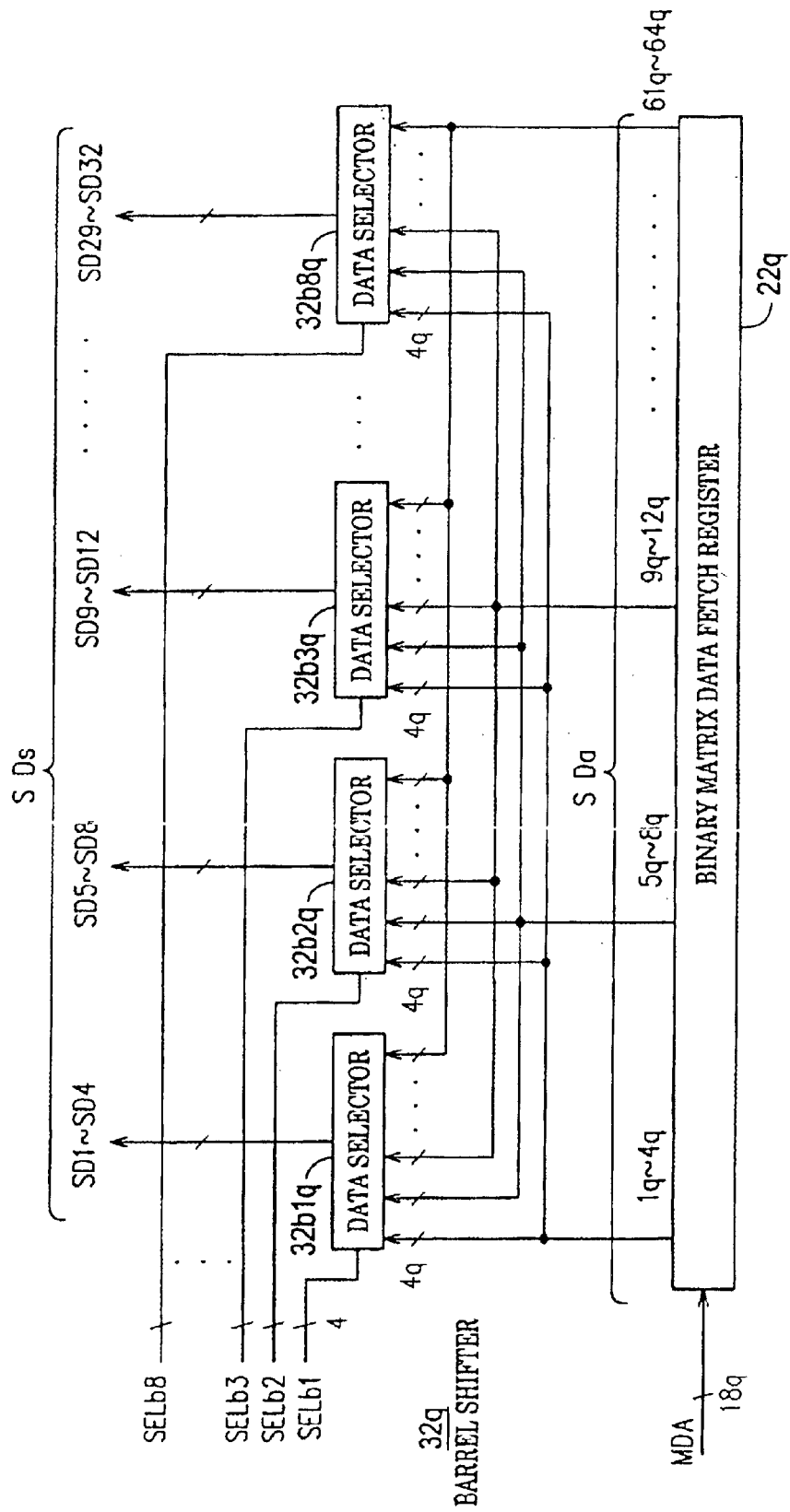
FIG. 46 is a block diagram showing an exemplary arrangement of a barrel shifter in the tenth embodiment.

An exemplary arrangement of the barrel shifter $32q$ functioning to thus selectively output data is shown in FIG. 46. As shown, the barrel shifter $32q$ includes eight data selectors $32b1$ to $32b8$. The binary matrix data SDa of 64 bits, output from the binary matrix data fetch register $22q$ is divided into data sets each consisting of 4 bits, and those data sets are input to the data selectors $32b1q$ to $32b8q$, respectively.

Accordingly, in response to select signals SELb1 to SEb8 each consisting of 4 bits derived from the binary-matrix-data select control circuit $31q$, the data selectors $32b1q$ to $32b8q$, selectively output the 4-bit data sets SD1 to SD4, SD5 to SD8, SD29 to SD32, which form the binary matrix data SDa consisting of consecutive 32 bits.

The barrel shifter $32q$ of the ninth embodiment uses two groups of data selectors (FIG. 42) in order to select the binary matrix data SDs from the 180-bit binary matrix data SDo and output the resultant. On the other hand, the barrel shifter $32q$ of the tenth embodiment uses one group of data selectors. Further, in the tenth embodiment, the bit width of the select signal SEL output from the binary-matrix-data select control circuit $31q$ is reduced from 58 bits to 32 bits.

The binary-matrix-data select control circuit $31q$ and the binary matrix data register $33q$ in the tenth embodiment are substantially the same as those in the ninth embodiment except that the bit width of the select signal SEL output from the binary-matrix-data select control circuit $31q$ is 32 bits as described above.

<Writing of Halftone Data into Output Buffer Memory>

The writing operation of halftone data into the output buffer memory $50q$, viz., the configurations and operations of the binary data write control circuit $40q$ and the output buffer memory $50q$, is substantially the same as of the ninth embodiment.

<Effect of the Tenth Embodiment>

The tenth embodiment improves over the ninth embodiment in that the hardware including the binary matrix data reading means $20q$ and the binary matrix data selection means $30q$ is significantly reduced in amount, and the number of connection wires wired among the circuits of the hardware is remarkably reduced.

(Eleventh Embodiment)

In the tenth embodiment in which the binary matrix data is stored into the binary matrix data storage memory $10q$ in the data storing method as shown in FIG. 44, two read cycles are required for each halftone data generation process to read out the binary matrix data from the binary matrix data storage memory $10q$. As a result, the processing rate of the halftone data generation process is reduced. When the $177^{th}$ to $28^{th}$ data pieces are read out of the binary matrix data storage memory $10q$ in the first data outputting operation (FIG. 41), the 161th to $12^{th}$ data pieces are first read out, then the $13^{th}$ to $44^{th}$ data are read out, and the $177^{th}$ to $28^{th}$ data pieces are selected and output by the binary matrix data selection means $30q$.

Figure 47:
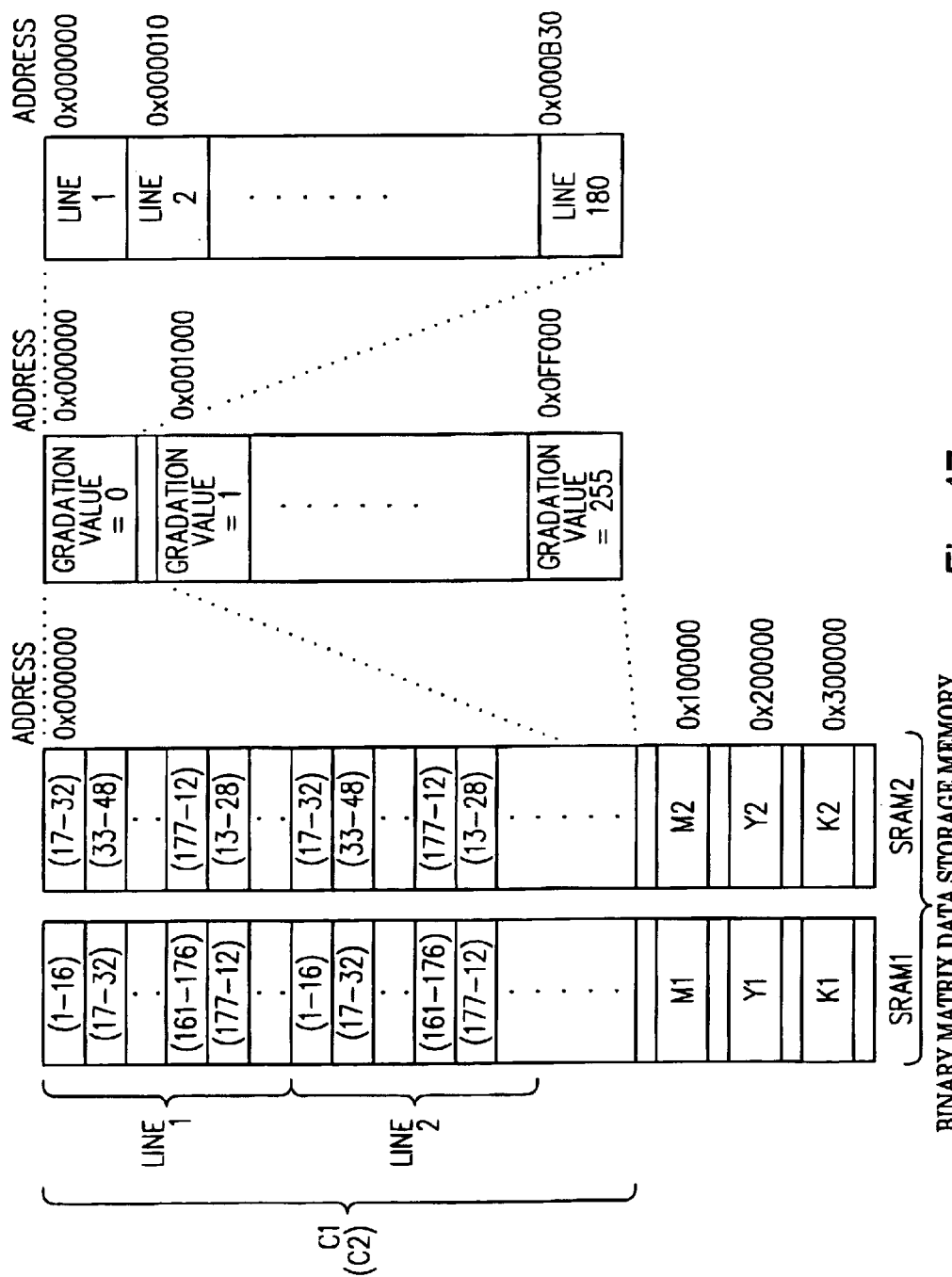
FIG. 47 is a diagram showing a configuration of a binary matrix data storage memory and how the data is stored therein in eleventh embodiment.
Figure 48:
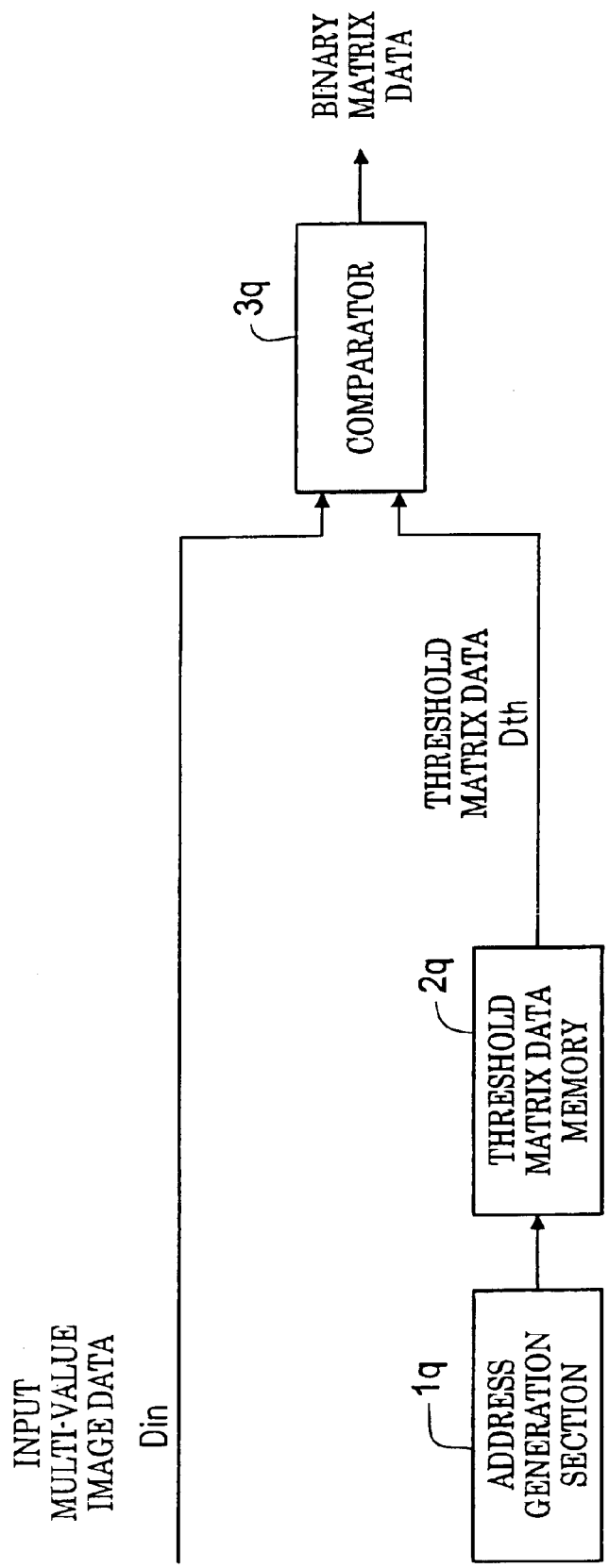
FIG. 48 is a hardware block diagram for representative halftone formation in a related art.

Another data storing method to cope with this problem is shown in FIG. 47. In this method, the 16-bit data of a scan line of the binary matrix data is written into both the memories SRAM1 and SRAM2. With this, the binary matrix data may be read out from the binary matrix data storage memory 10*q* for one cycle for one halftone generation process. Therefore, the hardware containing the binary matrix data reading means 20*q* and the binary matrix data selection means 30*q* is considerably reduced in amount, and the number of connection wires wired among the circuits of the hardware is remarkably reduced.

As seen from the foregoing description, the present invention succeeds in providing a halftone generation system for simultaneously generating halftone data of a plurality of pixels for each painting object of text and graphics, which the halftone generation system is capable of generating the halftone data, which is large in matrix size, and high in freedom of selecting angles and the number of lines, at high speed and by use of small scale hardware.

What is claimed is:

1. A halftone generation system for generating halftone data of a pixel based on comparison between multilevel image data of the pixel and threshold matrix data, said halftone generation system comprising:

threshold matrix data storage means for storing threshold matrix data;

threshold data read means for reading all threshold data applied to halftone data generation processing for one scanning line from said threshold matrix data storage means;

first register means for retaining all the read threshold data applied to halftone data generation processing for the scanning line;

threshold data selection means for selecting a plurality of threshold data pieces from among all the threshold data pieces applied to halftone data generation processing for the scanning line retained in said first register means and outputting the selected threshold data pieces; and a plurality of comparison means for performing comparison processing between the threshold data pieces selected by said threshold data selection means and multilevel image data of a plurality of pixels in parallel and executing parallel generation processing of halftone data of the pixels, wherein said threshold data selection means comprises as many selector circuits as the number of halftone data pieces generated in parallel in said plurality of comparison means, and input of each of said selector circuits is connected to output of said first register means at intervals of as many as the number of halftone data pieces generated in parallel in said plurality of comparison means, and output of each of the selector circuits is switched in response to the pixel position of halftone data generated in parallel.

2. The halftone generation system as claimed in claim 1, wherein said threshold data read means comprises; second register means for retaining all threshold data applied to halftone data generation processing for the scanning line to be processed next to the current scanning line where halftone data generation processing is being executed, said threshold data read means reads all threshold data applied to halftone data generation processing for the scanning line to be processed next to the current scanning line from said threshold matrix data storage means, and outputs the read threshold data to said second register means, and the threshold data retained in said second register means is output to said first register means.

3. The halftone generation system as claimed in claim 2, wherein the parallel generation processing of halftone data of the pixels in said plurality of comparison means and the reading of all threshold data applied to halftone data generation processing for the scanning line to be processed next to the current scanning line from said threshold matrix data storage means, and the output processing of the read threshold data to said second register means in said threshold data read means are performed in parallel.

4. The halftone generation system as claimed in claim 2, wherein said threshold data read means outputs a shift signal for specifying a threshold data shift amount for said second register means, and the shift signal indicates the shift amount for causing a start position of a painting object and a threshold data storage location to match.

5. The halftone generation system as claimed in claim 4, wherein said second register means comprises; a second register at the preceding stage, and a second register at the following stage, the threshold data read from said threshold matrix data storage means is retained in said second register at the preceding stage, then is output to the second register at the following stage, said threshold data read means outputs a shift signal for specifying a threshold data shift amount for said second register at the following stage, said second register at the following stage shifts the retained threshold data in response to the shift signal, and the threshold data shifted in said second register at the following stage is output to said first register means.

6. The halftone generation system as claimed in claim 5, wherein the parallel generation processing of halftone data of the pixels in said plurality of comparison means, and the threshold data shift processing in said second register at the following stage are performed in parallel.

7. The halftone generation system as claimed in claim 1, wherein said first register means comprises; a shift circuit for circularly shifting the retained threshold data, and said shift circuit shifts the retained threshold data by as many threshold data pieces as the number of threshold data pieces in said first register means not output through said selector circuits to said plurality of comparison means.

8. The halftone generation system as claimed in claim 1 wherein said first register means comprises; a first register at the preceding stage, and a first register at the following stage, input of each of said selector circuits is connected to output of said first register at the following stage at intervals of as many as the number of halftone data pieces generated in parallel in said plurality of comparison means, said first register at the preceding stage comprises; a shift circuit for circularly shifting the retained threshold data, said shift circuit shifts the retained threshold data in said first register at the preceding stage by as many threshold data pieces as the number of threshold data pieces in said first register at the following stage not output through said selector circuits to said plurality of comparison means, and the threshold data shifted in said first register at the preceding stage is output to said first register at the following stage.

9. The halftone generation system as claimed in claim 8, wherein the parallel generation processing of halftone data of the pixels in said plurality of comparison means, and the threshold data shift processing in said first register at the preceding stage are performed in parallel.

10. The halftone generation system as claimed in claim 1, wherein said threshold data read means reads a plurality of threshold data pieces at the same time from said threshold matrix data storage means.

11. A halftone generation system for generating halftone data of a pixel based on comparison between multilevel image data of the pixel and threshold matrix data in painting object units, said halftone generation system comprising:

threshold matrix data storage means for storing threshold matrix data;

threshold data read means for reading all threshold data applied to halftone data generation processing for one scanning line from said threshold matrix data storage means in response to the start position of a painting object;

first register means for retaining all the read threshold data applied to halftone data generation processing for the scanning line;

threshold data selection means for selecting a plurality of threshold data pieces from among all the threshold data applied to halftone data generation processing for the scanning line retained in said first register means and outputting the selected threshold data pieces; and a plurality of comparison means for performing comparison processing between the threshold data pieces selected by said threshold data selection means and multilevel image data of a plurality of pixels in parallel and executing parallel generation processing of halftone data of the pixel, wherein said threshold data selection means comprises as many selector circuits as the number of halftone data pieces generated in parallel in said plurality of comparison means, and input of each of said selector circuits is connected to output of said first register means at intervals of as many as the number of halftone data pieces generated in parallel in said plurality of comparison means, and output of each of the selector circuits is switched in response to the pixel position of halftone data generated in parallel.

12. The halftone generation system as claimed in claim 11, wherein said threshold data read means controls the number of threshold data pieces to be read from said threshold matrix data storage means in response to the number of pixels of a painting object on a scanning line to which processing is applied.

13. A halftone generation method for generating halftone data of a pixel based on comparison between multilevel image data of the pixel and threshold matrix data, said halftone generation method comprising:

a threshold data read step of reading all threshold data applied to halftone data generation processing for one scanning line from threshold matrix data storage means;

a step of retaining all the read threshold data applied to half tone data generation processing for the scanning line in first register means;

a threshold data selection step of selecting a plurality of threshold data pieces from among all the threshold data applied to halftone data generation processing for the scanning line retained in said first register means and outputting the selected threshold data pieces; and a comparison step in a plurality of comparison means for performing comparison processing between the threshold data pieces selected at said threshold data selection step and multilevel image data of a plurality of pixels in parallel and executing parallel generation processing of halftone data of the pixels, wherein said threshold data selection step utilizes threshold data selection means that includes as many selector circuits as the number of halftone data pieces generated in parallel in said comparison step, and connecting input of each of said selector circuits to output of said first register means at intervals of as many as the number of halftone data pieces generated in parallel in said plurality of comparison means, and switching output of each of the selector circuits in response to the pixel position of halftone data generated in parallel.

14. The halftone generation method as claimed in claim 13, wherein said threshold data read means reads all threshold data applied to halftone data generation processing for the scanning line to be processed next to the current scanning line where halftone data generation processing is being executed from the threshold matrix data storage means and outputs the read threshold data to second register means, and the threshold data retained in said second register means is output to said first register means.

15. The halftone generation method as claimed in claim 14, wherein the parallel generation processing of halftone data of the pixels in said plurality of comparison means and the reading of all threshold data applied to halftone data generation processing for the scanning line to be processed next to the current scanning line from said threshold matrix data storage means and the output processing of the read threshold data to said second register means in said threshold data read means are performed in parallel.

16. A halftone generation method for generating halftone data of a pixel based on comparison between multilevel image data of the pixel and threshold matrix data in painting object units, said halftone generation method comprising:

a threshold data read step of reading all threshold data applied to halftone data generation processing for one scanning line from threshold matrix data storage means in response to the start position of a painting object;

a step of retaining all the read threshold data applied to halftone data generation processing for the scanning line in first register means;

a threshold data selection step of selecting a plurality of threshold data pieces from among all the threshold data applied to halftone data generation processing for the scanning line retained in said first register means and outputting the selected threshold data pieces; and a comparison step in a plurality of comparison means for performing comparison processing between the threshold data pieces selected at said threshold data selection step and multilevel image data of a plurality of pixels in parallel; and executing parallel generation processing of halftone data of the pixels, wherein said threshold data selection step utilizes threshold data selection means that includes as many selector circuits as the number of halftone data pieces generated in parallel in said comparison step, and connecting input of each of said selector circuits to output of said first register means at intervals of as many as the number of halftone data pieces generated in parallel in said plurality of comparison means, and switching output of each of the selector circuits in response to the pixel position of halftone data generated in parallel.

17. A halftone generation system for comparing pixel data forming a multilevel image with threshold matrix data, thereby generating halftone data based on the pixel data of the multilevel image, said halftone generation system comprising:

threshold data read means for reading all threshold data applied to a scanning line for generating a halftone in batch from threshold matrix data storage means for storing threshold matrix data;

threshold data selection means for selecting a plurality of threshold data pieces corresponding to positions of a plurality of pixels for which a halftone is to be generated from among the threshold data pieces read by said threshold data read means and outputting the selected threshold data pieces; and comparison means for performing comparison processing between the pixel data pieces for which a halftone is to be generated and the threshold data pieces selected by said threshold data selection means in parallel and generating a plurality of halftone data pieces at the same time, wherein said threshold data selection means comprises a crossbar switch circuit, and a switch control circuit for controlling said crossbar switch circuit;

when the number of all threshold data pieces contained in the scanning line for processing is M, said crossbar switch circuit can input all M threshold data pieces at the same time; and said switch control circuit controls said crossbar switch circuit so as to select only the threshold data corresponding to the pixel position of generated halftone from among the M threshold data pieces input to said crossbar switch circuit and output to the selected threshold data.

18. The halftone generation system as claimed in claim 17, wherein said threshold data read means reads all threshold data applied to the scanning line for generating a halftone from said threshold matrix data storage means for storing threshold matrix data by accessing memory once.

19. The halftone generation system as claimed in claim 17, wherein when the number of all threshold data pieces contained in the scanning line for processing is M, the number of pixels of halftone data generated at the same time is P, and the start pixel position of selected threshold data is S, said threshold data selection means selects P consecutive threshold data pieces containing the S'th threshold data piece from the top as the start position from among the M threshold data pieces and outputs the selected threshold data pieces and if the number of the S'th threshold data piece and a later of the M threshold data pieces is less than P, said threshold data selection means selects the S'th threshold data piece and the later plus the threshold data pieces consecutive starting at the top of the threshold data and outputs a total of P threshold data pieces.

20. The halftone generation system as claimed in claim 17, wherein said threshold data selection means selects or sorts all threshold data applied to the scanning line read by said threshold data read means in an arbitrary order responsive to the pixel position of generated halftone and outputs the threshold data.

21. The halftone generation system as claimed in claim 20, wherein said threshold data selection means outputs at the same output timing, a number of threshold data pieces equal to or less than the number of threshold data pieces undergoing comparison processing in parallel in said comparison means.

22. The halftone generation system as claimed in claim 17, wherein said threshold data selection means further comprises:

a multiplexer circuit for sorting M threshold data pieces divided into blocks each consisting of a plurality of threshold data pieces in block units; and block-unit threshold data register means for temporarily retaining the M threshold data pieces sorted in block units by said multiplexer circuit, and said crossbar switch circuit inputs the threshold data pieces sorted in block units and retained in said block-unit threshold data register means.

23. A halftone generation system for comparing pixel data forming a multilevel image with threshold matrix data so as to generate halftone data based on the pixel data of the multilevel image, said halftone generation system comprising:

threshold data read means for reading all threshold data applied to a scanning line for generating a halftone in batch from threshold matrix data storage means for storing threshold matrix data;

first register means for temporarily retaining all threshold data corresponding to the scanning line read by said threshold data read means;

threshold data selection means for selecting a plurality of threshold data pieces corresponding to positions of a plurality of pixels for which a halftone is to be generated from among all the threshold data pieces corresponding to the scanning line retained in said first register means and outputting the selected threshold data pieces;

second register means for temporarily retaining the selected and output threshold data pieces; and comparison means for performing comparison processing between the pixel data pieces for which a halftone is to be generated and the threshold data pieces retained in said second register means in parallel and generating a plurality of halftone data pieces at the same time, wherein the threshold data read processing performed by said threshold data read means, the threshold data selection processing performed by said threshold data selection means, and the halftone data generation processing performed by said comparison means are executed in parallel as pipeline processing in units of pixels, wherein said threshold data selection means comprises a crossbar switch circuit, and a switch control circuit for controlling said crossbar switch circuit;

when the number of all threshold data pieces contained in the scanning line for processing is M, said crossbar switch circuit can input all M threshold data pieces at the same time; and said switch control circuit controls said crossbar switch circuit so as to select only the threshold data corresponding to the pixel position of generated halftone from among the M threshold data pieces input to said crossbar switch circuit and output to the selected threshold data.

24. A halftone generation system for comparing pixel data forming a multilevel image with threshold matrix data, thereby generating halftone data based on the pixel data of the multilevel image, said halftone generation system comprising:

threshold data read means for reading all threshold data applied to a scanning line for generating a halftone in batch from threshold matrix data storage means for storing threshold matrix data;

threshold data selection means for selecting a plurality of threshold data pieces corresponding to positions of a plurality of pixels for which a halftone is to be generated from among the threshold data pieces read by said threshold data read means and outputting the selected threshold data nieces; and comparison means for performing comparison processing between the pixel data pieces for which a halftone is to be generated and the threshold data pieces selected by said threshold data selection means in parallel and generating a plurality of halftone data pieces at the same time, wherein said threshold data selection means comprises; a barrel shifter circuit and a shift control circuit for controlling the shift amount of the barrel shifter circuit, when the number of all threshold data pieces contained in the scanning line for processing is M, the barrel shifter circuit can input all M threshold data pieces at the same time, said shifter control circuit controls the shift amount of the M threshold data pieces input to said barrel shifter circuit in response to the pixel position of generated halftone.

25. The halftone generation system as claimed in claim 24, wherein said threshold data selection means further comprises:

a multiplexer circuit for sorting M threshold data pieces divided into blocks each consisting of a plurality of threshold data pieces in block units; and block-unit threshold data register means for temporarily retaining the M threshold data pieces sorted in block units by said multiplexer circuit, said barrel shifter circuit inputs the threshold data pieces sorted in block units and retained in said block-unit threshold data register means.

26. The halftone generation system as claimed in claim 24, wherein said barrel shifter circuit forming a part of said threshold data selection means comprises; a right barrel shifter circuit which inputs the M threshold data pieces and can shift the data only right, and a left barrel shifter circuit which inputs the M threshold data pieces and can shift the data only left in combination, and said threshold data selection means further comprises; a selector circuit for selecting the threshold data output from either said right or left barrel shifter circuit.

27. A halftone generation method for comparing pixel data forming a multilevel image with threshold matrix data so as to generate halftone data based on the pixel data of the multilevel image, said halftone generation method comprising:

a threshold data read step of reading all threshold data applied to a scanning line for generating a halftone in batch from threshold matrix data storage means for storing threshold matrix data;

a threshold data selection step of selecting a plurality of threshold data pieces corresponding to positions of a plurality of pixels for which a halftone is to be generated from among the threshold data pieces read at the threshold data read step and outputting the selected threshold data pieces; and a comparison step of performing comparison processing between the pixel data pieces for which a halftone is to be generated and the threshold data pieces selected at the threshold data selection step in parallel and generating a plurality of halftone data pieces at the same time, wherein the threshold data selection step selects or sorts all threshold data applied to the scanning line read at the threshold data read step in an arbitrary order responsive to the pixel position of generated halftone and outputs the threshold data.

28. A halftone generation method for comparing pixel data forming a multilevel image with threshold matrix data so as to generate halftone data based on the pixel data of the multilevel image, said halftone generation method comprising:

a threshold data read step of reading all threshold data applied to a scanning line for generating a halftone in batch from threshold matrix data storage means for storing threshold matrix data;

a step of temporarily retaining all threshold data corresponding to the scanning line read at said threshold data read step in first register means;

a threshold data selection step of selecting a plurality of threshold data pieces corresponding to positions of a plurality of pixels for which halftone is to be generated from among all the threshold data pieces corresponding to the scanning line retained in said first register means and outputting the selected threshold data pieces;

a step of temporarily retaining the selected threshold data pieces in second register means; and a comparison step of performing comparison processing between the pixel data pieces for which a halftone is to be generated and the threshold data pieces retained in said second register means in parallel and generating a plurality of halftone data pieces at the same time, wherein the threshold data read processing performed at said threshold data read step, the threshold data selection processing performed at said threshold data selection step, and the halftone data generation processing performed at said comparison step are executed in parallel as pipeline processing in units of pixels, wherein the threshold data selection step selects or sorts all threshold data applied to the scanning line read at the threshold data read step in an arbitrary order responsive to the pixel position of generated halftone and outputs the threshold data.

29. A halftone generation method for comparing pixel data forming a multilevel image with threshold matrix data so as to generate halftone data based on the pixel data of the multilevel image, said halftone generation method comprising:

a threshold data read step of reading all threshold data applied to a scanning line for generating a halftone in batch from threshold matrix data storage means for storing threshold matrix data;

a threshold data selection step of selecting a plurality of threshold data pieces corresponding to positions of a plurality of pixels for which a halftone is to be generated from among the threshold data pieces read at the threshold data read step and outputting the selected threshold data pieces; and a comparison step of performing comparison processing between the pixel data pieces for which a halftone is to be generated and the threshold data pieces selected at the threshold data selection step in parallel and generating a plurality of halftone data pieces at the same time, wherein said threshold data selection step further comprises:

the step of sorting threshold data pieces divided into blocks each consisting of a plurality of threshold data pieces in block units; and the step of selecting or sorting the threshold data pieces sorted into block units in threshold data units and outputting the threshold data.

30. A halftone generation system which simultaneously generates halftone data of a plurality of pixels for each painting object of text and graphics, and then simultaneously writes the halftone data of a plurality of pixels into an output buffer memory, said halftone generation system comprising:

data storage means for storing binary matrix data pieces equal in number to the tone values formed by binarizing all the tone values of a painting object to be processed;

data reading means for reading a predetermined amount of binary matrix data pieces of a scan line under processing from said data storage means in accordance with tone information and pixel position information of a painting object under processing;

data select manes for selecting binary matrix data of a plurality of pixels from the binary matrix data read out of said data reading means in accordance with main-scanning direction pixel position information of a painting object under processing, and outputting the resultant; and means for writing data representative of the result of ANDing the binary matrix data read out of said data select means and mask data indicative of a paint-out area of the painting object into the output buffer memory.

31. The halftone generation system as claimed in claim 30, wherein said data reading means simultaneously reads out all the binary matrix data pieces of a scan line under processing from said data storage means in accordance with sub-scanning direction pixel position information of a painting object under processing.

32. The halftone generation system as claimed in claim 30, wherein said data reading means reads out the binary matrix data pieces of a scan line under processing from said data storage means in accordance with main-scanning and sub-scanning direction pixel position information of a painting object under processing.

33. The halftone generation system as claimed in claim 30, wherein said data select means successively shifts the binary matrix data read out by said data reading means till a halftone data generation process of a scan line under processing ends in execution thereof; in accordance with a shift of a main-scanning direction pixel position of the pointing object to a main-scanning direction pixel position of the binary matrix data.

* * * * *